(12) United States Patent
Xia

(10) Patent No.: US 12,143,209 B2
(45) Date of Patent: *Nov. 12, 2024

(54) NOTIFICATION METHOD AND APPARATUS FOR CHANNEL QUALITY INDICATOR AND MODULATION AND CODING SCHEME

(71) Applicant: HUAWEI TECHNOLOGIES CO., LTD., Shenzhen (CN)

(72) Inventor: Liang Xia, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,457

(22) Filed: Jul. 18, 2023

(65) Prior Publication Data

US 2023/0361912 A1 Nov. 9, 2023

Related U.S. Application Data

(63) Continuation of application No. 16/922,802, filed on Jul. 7, 2020, now Pat. No. 11,764,897, which is a (Continued)

(30) Foreign Application Priority Data

Jun. 8, 2013 (WO) ................ PCT/CN2013/077023

(51) Int. Cl.
*H04L 1/00* (2006.01)
*H04L 5/00* (2006.01)

(52) U.S. Cl.
CPC .......... *H04L 1/0016* (2013.01); *H04L 1/0003* (2013.01); *H04L 1/0009* (2013.01); *H04L 1/0026* (2013.01); *H04L 5/0057* (2013.01)

(58) Field of Classification Search
CPC . H04L 1/0002; H04L 1/20; H04L 5/26; H04L 12/40065; H04L 27/2636;
(Continued)

(56) References Cited

U.S. PATENT DOCUMENTS 6,999,432 B2 2/2006 Zhang et al.
7,864,659 B2 1/2011 Koo et al.
(Continued)

FOREIGN PATENT DOCUMENTS

CN 101243625 A 8/2008
CN 101448284 A 6/2009
(Continued)

OTHER PUBLICATIONS

"256 QAM for Small Cells SI," 3GPP TSG-RAN WG4 Meeting #66bis, Chicago, USA, R4-131742, XP050701911, 3rd Generation Partnership Project, Valbonne, France (Apr. 15-19, 2013).
(Continued)

*Primary Examiner* — Dady Chery
(74) *Attorney, Agent, or Firm* — Leydig, Voit & Mayer, Ltd.

(57) ABSTRACT

A notification method for a CQI and a modulation and coding scheme is provided. The method includes: learning, by a terminal, a first CQI index according to a first CQI table; sending the first CQI index to a base station; receiving, by the base station, the first CQI index sent by the terminal UE; determining a first MCS index according to the first CQI table, a first MCS table, and the received first CQI index; sending the determined first MCS index to the UE; receiving, by the terminal, the first MCS index sent by the base station; and determining a modulation order and a code block size according to the first MCS table and the received first MCS index; where the first CQI table includes entries in which modulation schemes are higher than 64QAM.

20 Claims, 6 Drawing Sheets

Related U.S. Application Data continuation of application No. 16/289,336, filed on Feb. 28, 2019, now Pat. No. 10,721,016, which is a continuation of application No. 15/837,890, filed on Dec. 11, 2017, now Pat. No. 10,250,356, which is a continuation of application No. 14/961,569, filed on Dec. 7, 2015, now Pat. No. 10,079,654, which is a continuation of application No. PCT/CN2013/084346, filed on Sep. 26, 2013.

(58) Field of Classification Search
CPC .......... H04L 27/2643; H04W 36/0083; H04W 36/0088; H04W 36/0094; H04W 28/0257; H04W 28/04; H04W 72/04; H04W 72/12; H04W 76/00; H04W 28/26; H04B 7/2121; H04B 7/2123; H04B 7/2615; H04B 7/2045; H04B 7/208; H04B 7/2621; H04J 2203/0069; H04J 4/00; H04J 3/1694; H04J 1/10; H04J 2011/0016; H04J 2013/0088; H04Q 2213/394

See application file for complete search history.

(56) References Cited

U.S. PATENT DOCUMENTS

| | | | |
|---|---|---|---|
| 8,000,258 B2 | 8/2011 | Ko et al. | |
| 8,040,912 B2 | 10/2011 | Imamura et al. | |
| 8,144,797 B2 | 3/2012 | Mujtaba et al. | |
| 8,284,732 B2 | 10/2012 | Nimbalker et al. | |
| 8,472,548 B2 | 6/2013 | Taoka et al. | |
| 8,483,086 B2 | 7/2013 | Nimbalker et al. | |
| 8,537,750 B2 | 9/2013 | Jin et al. | |
| 9,094,923 B2 | 7/2015 | Futagi et al. | |
| 9,210,693 B2 | 12/2015 | Zhang et al. | |
| 9,220,112 B2 | 12/2015 | Gong et al. | |
| 9,432,168 B2 | 8/2016 | Kim et al. | |
| 9,479,287 B2 | 10/2016 | Yang et al. | |
| 9,544,891 B2 | 1/2017 | Kim et al. | |
| 9,584,254 B2 | 2/2017 | Nan et al. | |
| 9,603,162 B2 | 3/2017 | Wang | |
| 9,642,118 B2 | 5/2017 | Lahetkangas et al. | |
| 9,667,361 B2 | 5/2017 | Nagata et al. | |
| 9,698,960 B2 | 7/2017 | Kim et al. | |
| 9,806,932 B2 | 10/2017 | Zhang et al. | |
| 9,844,036 B2 | 12/2017 | Seo et al. | |
| 9,860,091 B2 | 1/2018 | Larsson et al. | |
| 9,893,853 B2 | 2/2018 | Yi et al. | |
| 9,973,297 B2 | 5/2018 | Marinier et al. | |
| 9,973,298 B2 | 5/2018 | Xia et al. | |
| 10,079,654 B2 | 9/2018 | Xia | |
| 10,097,330 B2 | 10/2018 | Zhang et al. | |
| 10,136,451 B2 | 11/2018 | Nagata et al. | |
| 10,230,562 B2 | 3/2019 | Kim et al. | |
| 10,250,356 B2 | 4/2019 | Xia | |
| 10,693,584 B2 | 6/2020 | Marinier et al. | |
| 10,721,016 B2 | 7/2020 | Xia | |
| 10,980,086 B2 | 4/2021 | Ye et al. | |
| 11,115,098 B2 | 9/2021 | Islam et al. | |
| 2005/0025254 A1 | 2/2005 | Awad et al. | |
| 2007/0206699 A1 | 9/2007 | Yan et al. | |
| 2008/0107161 A1 | 5/2008 | Xu et al. | |
| 2009/0161613 A1 | 6/2009 | Kent et al. | |
| 2009/0245408 A1 | 10/2009 | Mujtaba et al. | |
| 2010/0014500 A1 | 1/2010 | Lee et al. | |
| 2010/0027595 A1 | 2/2010 | Takada et al. | |
| 2010/0074195 A1 | 3/2010 | Cheng et al. | |
| 2010/0080176 A1 | 4/2010 | Maas et al. | |
| 2010/0103920 A1 | 4/2010 | Damnjanovic et al. | |
| 2010/0195614 A1 | 8/2010 | Nimbalker et al. | |
| 2012/0076227 A1 | 3/2012 | Taoka et al. | |
| 2012/0177137 A1 | 7/2012 | Cheng et al. | |
| 2012/0314613 A1 | 12/2012 | Zhang et al. | |
| 2013/0286881 A1 | 10/2013 | Ding et al. | |
| 2013/0329575 A1 | 12/2013 | Yang et al. | |
| 2013/0343215 A1 | 12/2013 | Li et al. | |
| 2014/0169300 A1 | 6/2014 | Kim et al. | |
| 2014/0192732 A1 | 7/2014 | Chen et al. | |
| 2014/0334433 A1 | 11/2014 | Blanz et al. | |
| 2015/0016553 A1 | 1/2015 | Yang et al. | |
| 2015/0103760 A1 | 4/2015 | Zhang et al. | |
| 2015/0163773 A1* | 6/2015 | Wang | H04L 1/0029 370/329 |
| 2015/0173024 A1* | 6/2015 | Seo | H04W 72/0413 370/329 |
| 2015/0358111 A1 | 12/2015 | Marinier et al. | |
| 2015/0372784 A1 | 12/2015 | Xu et al. | |
| 2016/0094310 A1 | 3/2016 | Xia | |
| 2016/0226623 A1 | 8/2016 | Froberg et al. | |
| 2017/0012735 A1 | 1/2017 | Yang et al. | |
| 2017/0180102 A1 | 6/2017 | Kang et al. | |
| 2017/0279586 A1 | 9/2017 | Zhang et al. | |
| 2017/0366298 A1 | 12/2017 | Xu et al. | |
| 2018/0063787 A1 | 3/2018 | Rudolf et al. | |
| 2018/0102872 A1 | 4/2018 | Xia | |
| 2018/0227896 A1 | 8/2018 | Wang et al. | |

FOREIGN PATENT DOCUMENTS

| | | |
|---|---|---|
| CN | 101499877 A | 8/2009 |
| CN | 101568145 A | 10/2009 |
| CN | 101615984 A | 12/2009 |
| CN | 101636995 A | 1/2010 |
| CN | 101651515 A | 2/2010 |
| CN | 101689904 A | 3/2010 |
| CN | 102170647 A | 8/2011 |
| CN | 102196495 A | 9/2011 |
| CN | 102334357 A | 1/2012 |
| CN | 102598572 A | 7/2012 |
| CN | 102611536 A | 7/2012 |
| CN | 102624481 A | 8/2012 |
| CN | 102624501 A | 8/2012 |
| CN | 102684816 A | 9/2012 |
| EP | 2953401 A1 | 12/2015 |
| JP | 2013185184 A | 9/2013 |
| JP | 2014168224 A | 9/2014 |
| JP | 2015530033 A | 10/2015 |
| JP | 2016509787 A | 3/2016 |
| RU | 2417522 C2 | 4/2011 |
| RU | 2420878 C2 | 6/2011 |
| RU | 2010129927 A | 1/2012 |
| WO | 2004051872 A3 | 6/2004 |
| WO | 2009078795 A1 | 6/2009 |
| WO | 2009135574 A1 | 11/2009 |
| WO | 2010036519 A1 | 4/2010 |
| WO | 2012046143 A1 | 4/2012 |
| WO | 2014029108 A1 | 2/2014 |
| WO | 2014110931 A1 | 7/2014 |

OTHER PUBLICATIONS

"Discussion on 256QAM for Downlink in Small Cell Deployments," 3GPP TSG-RAN WG1 Meeting 72bis, Chicago, USA, R1-131328, XP050697188, pp. 1-6, 3rd Generation Partnership Project, Valbonne, France (Apr. 15-19, 2013).

Classon et al., "Channel Coding and Link Adaptation," Chapter 10: LTE—The UMTS Long Term Evolution—From Theory to Practice, XP055254774, pp. 207-241 (Feb. 17, 2009).

"On Small Cell Enhancement for Improved Spectral Efficiency," 3GPP TSG RAN WG1 Meeting #72, St. Julian's, Malta R1-130311, XP050663408, 3rd Generation Partnership Project, Valbonne, France (Jan. 28-Feb. 1, 2013).

"3rd Generation Partnership Project; Technical Specification Group Radio Access Network; Evolved Universal Terrestrial Radio Access (E-UTRA); Physical layer procedures (Release 11)," 3GPP TS 36.213, V11.2.0, pp. 1-173, 3rd Generation Partnership Project, Valbonne, France (Feb. 2013).

"3rd Generation Partnership Project; Technical Specification Group Radio Access Network; Evolved Universal Terrestrial Radio Access (E-UTRA); Multiplexing and channel coding (Release 11)," 3GPP

(56) References Cited

OTHER PUBLICATIONS

TS 36.212, V11.2.0, pp. 1-82, 3rd Generation Partnership Project, Valbonne, France (Feb. 2013).
"3rd Generation Partnership Project; Technical Specification Group Radio Access Network; Evolved Universal Terrestrial Radio Access (E-UTRA); User Equipment (UE) radio access capabilities (Release 11)," 3GPP TS 36.306, V11.3.0, pp. 1-27, 3rd Generation Partnership Project, Valbonne, France (Mar. 2013).
"3rd Generation Partnership Project; Technical Specification Group Radio Access Network; Evolved Universal Terrestrial Radio Access (E-UTRA); User Equipment (UE) radio access capabilities (Release 11)," 3GPP TS 36.306, V11.4.0, pp. 1-27, 3rd Generation Partnership Project, Valbonne, France (Sep. 2013).
"Discussion on 256QAM for Downlink in Small Cell Deployments," 3GPP TSG-RAN WG1 Meeting 73, Fukuoka, Japan, R1-132138, pp. 1-6, 3rd Generation Partnership Project, Valbonne, France (May 20-24, 2013).
"Evaluation on 256QAM in small cell scenario," 3GPP TSG-RAN WG1 #73, Fukuoka, Japan, R1-132266, 3rd Generation Partnership Project, Valbonne, France (May 20-24, 2013).
"Consideration on high order modulation for small cell," 3GPP TSG-RAN WG1 Meeting #72, St. Julian's, Malta, R1-130136, 3rd Generation Partnership Project, Valbonne, France (Jan. 28-Feb. 1, 2013).
U.S. Appl. No. 14/961,569, filed Dec. 7, 2015.
U.S. Appl. No. 15/837,890, filed Dec. 11, 2017.
CN/201711073249.5, Office Action, dated Mar. 16, 2020.
"TBS and MCS Table Generation and Signaling for E-Utra," 3GPP TSG RAN1 #51bis, Sorrento, Italy, R1-080727, pp. 1-7, 3rd Generation Partnership Project, Valbonne, France (Feb. 10-15, 2008).
"Correction of maximum TBS sizes," 3GPP TSG-RAN Meeting #53bis, Warsaw, Poland, R1-082461, pp. 1-11, 3rd Generation Partnership Project, Valbonne, France (Jun. 30-Jul. 4, 2008).
"64-QAM modulation indication and feedback in 1.28Mcps TDD," 3GPP TSG RAN WG1#52, Sorrento, Italy, R1-080760, pp. 1-3, 3rd Generation Partnership Project, Valbonne, France (Feb. 11-15, 2008).
"TBS and MCS Signaling and Tables," 3GPP TSG RAN1 #52bis, Shenzhen, China, R1-081284, pp. 1-10, 3rd Generation Partnership Project, Valbonne, France (Mar. 31-Apr. 4, 2008).
"MCS and TBS tables for NCT PDSCH," 3GPP TSG-RAN WG1 #73, Fukuoka, Japan, R1-132015, pp. 1-5, 3rd Generation Partnership Project, Valbonne, France (May 20-24, 2013).
Ericsson, "CQI Tables for Support of 64QAM for HSDPA," 3GPP TSG-RAN WG1 Meeting #48, St. Louis, MO, USA, Tdoc R1-071083, total 6 pages, 3rd Generation Partnership Project, Valbonne, France (Feb. 12-16, 2007).
"Evaluation of higher order modulation," 3GPP TSG RAN WG1 Meeting #72, St. Julian's, Malta, R1-130021, Total 11 pages, 3rd Generation Partnership Project, Valbonne, France (Jan. 28-Feb. 1, 2013).
He Lifeng et al., "Implementation of 256QAM in LTE-Advanced," Modern Science and Technology of Telecommunications, No. 12, Total 6 pages (Dec. 2012). With an English Abstract.
Pan Shushu et al., "Application Analysis of 64QAM in Enhanced HSPDA," Journal of Guilin College of Aerospace Technology, No. 4, Total 4 pages, China Academic Journal Electronic Publishing House (2006). With an English Abstract.
U.S. Appl. No. 16/922,802, filed Jul. 7, 2020.
U.S. Appl. No. 16/289,336, filed Feb. 28, 2019.

* cited by examiner

NOTIFICATION METHOD AND APPARATUS FOR CHANNEL QUALITY INDICATOR AND MODULATION AND CODING SCHEME

CROSS-REFERENCE TO RELATED APPLICATIONS

This application is a continuation of U.S. patent application Ser. No. 16/922,802, filed on Jul. 7, 2020, now U.S. Pat. No. 11,764,897, which is a continuation of U.S. patent application Ser. No. 16/289,336, filed on Feb. 28, 2019, now U.S. Pat. No. 10,721,016, which is a continuation of U.S. patent application Ser. No. 15/837,890, filed on Dec. 11, 2017, now U.S. Pat. No. 10,250,356, which is a continuation of U.S. patent application Ser. No. 14/961,569, filed on Dec. 7, 2015, now U.S. Pat. No. 10,079,654, which is a continuation of International Application No. PCT/CN2013/084346, filed on Sep. 26, 2013. The International Application claims priority to International Patent Application No. PCT/CN2013/077023, filed on Jun. 8, 2013. All of the afore-mentioned patent applications are hereby incorporated by reference in their entireties.

TECHNICAL FIELD

Embodiments of this application relate to the field of communications, and in particular, to a notification method and apparatus for a channel quality indicator and a modulation and coding scheme.

BACKGROUND

Currently, in a Long Term Evolution (LTE) system, an adaptive procedure for a physical downlink shared channel (PDSCH,) is as follows: User equipment (UE) estimates channel information used for measuring channel state information (CSI); the UE calculates a signal to interference plus noise ratio (SINR) by using the channel information and based on an optimal rank indication (RI) and/or a precoding matrix indication (PMI); and the UE obtains a corresponding channel quality indicator (CQI) according to the SINR, and reports a CQI value to a base station. The base station allocates a modulation and coding scheme (MCS) to the UE according to the CQI value reported by the UE and a network condition, where the MCS is used for indicating a modulation scheme and a coding scheme that are currently used by the PDSCH.

In a hotspot scenario, for example, in a relay (Relay) scenario or an LTE hotspot improvements (LTE-Hi) scenario, UE requires a modulation scheme higher than 64 quadrature amplitude modulation (QAM). However, due to a limitation in the prior art, a maximum CQI value is 15, and a modulation scheme corresponding to the CQI value is 64QAM; as a result, the UE cannot select a modulation scheme higher than 64QAM, thereby affecting system performance. Similarly, a base station cannot allocate a modulation scheme higher than 64QAM to the UE.

SUMMARY

Embodiments of the present invention provide a notification method and apparatus for a channel quality indicator and a modulation and coding scheme, so as to support UE and a base station to select a modulation scheme higher than 64QAM, thereby improving system performance.

To achieve the foregoing objective, the following technical solutions are used in the embodiments of the present invention:

According to a first aspect, a notification method for a CQI is provided, including:
learning a first CQI index according to an acquired first CQI table; and
sending the first CQI index to a base station, so that the base station determines a first modulation and coding scheme MCS index according to the first CQI index;
where the first CQI table includes:
entries in which modulation schemes are higher than 64 quadrature amplitude modulation QAM; and
at least one entry in which a modulation scheme is quadrature phase shift keying QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where
modulation schemes in entries in the second CQI table include only QPSK, 16QAM, and 64QAM.

With reference to the first aspect, in a first possible implementation manner, the at least one entry in which the modulation scheme is QPSK in the second CQI table includes:
some entries in which modulation schemes are QPSK in the second CQI table, where CQI indices corresponding to the some entries are at equal intervals; or
some entries in which modulation schemes are QPSK in the second CQI table, where CQI indices corresponding to the some entries are not at equal intervals; or
some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or
some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

With reference to the first aspect, in a second possible implementation manner, the at least one entry in which the modulation scheme is 16QAM in the second CQI table includes:
all entries in which modulation schemes are 16QAM in the second CQI table; or
at least one entry, except an entry corresponding to a minimum CQI index, of all entries in which modulation schemes are 16QAM in the second CQI table.

With reference to the first aspect or the first two possible implementation manners, in a third possible implementation manner, the first CQI table further includes:
at least one entry in which a modulation scheme is 64QAM in the second CQI table.

With reference to the third possible implementation manner, in a fourth possible implementation manner, the at least one entry in which the modulation scheme is 64QAM includes:
all entries in which modulation schemes are 64QAM in the second CQI table; or
some entries in which modulation schemes are 64QAM in the second CQI table, and at least one entry, except an entry corresponding to a maximum CQI index, of all entries in which modulation schemes are 64QAM in the second CQI table.

With reference to the first aspect, in a fifth possible implementation manner, a spectrum efficiency in an entry that is corresponding to a minimum CQI index and of the entries in which the modulation schemes are higher than 64QAM in the first CQI table is equal to a spectrum efficiency in an entry that is corresponding to a maximum CQI index and of all entries in which modulation schemes are 64QAM in the second CQI table.

With reference to the first aspect, in a sixth possible implementation manner, spectrum efficiencies in X entries that are corresponding to maximum CQI indices and of the entries in which the modulation schemes are higher than 64QAM in the first CQI table are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

With reference to the first aspect, in a seventh possible implementation manner, the entries in which the modulation schemes are higher than 64QAM in the first CQI table include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

With reference to the first aspect, in an eighth possible implementation manner, the first CQI table includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

With reference to any one of the sixth to the eighth possible implementation manners, in a ninth possible implementation manner, the constant is less than or equal to a first threshold.

With reference to the first aspect, in a tenth possible implementation manner, an absolute value of a difference between spectrum efficiencies in any two adjacent entries of X entries that are corresponding to maximum CQI indices and of the entries in which the modulation schemes are higher than 64QAM in the first CQI table is less than or equal to a first threshold; or
the entries in which the modulation schemes are higher than 64QAM in the first CQI table include: at least two entries in which modulation schemes are 256QAM, where an absolute value of a difference between spectrum efficiencies in any two adjacent entries of the at least two entries in which the modulation schemes are 256QAM is less than or equal to a first threshold; or
the first CQI table includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

With reference to the sixth possible implementation manner or the tenth possible implementation manner, in an eleventh possible implementation manner, X=3.

With reference to the ninth possible implementation manner or the tenth possible implementation manner, in a twelfth possible implementation manner, the first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

With reference to the first aspect or any one of the first twelve possible implementation manners, in a thirteenth possible implementation manner, a value range of a CQI index in the first CQI table is the same as a value range of a CQI index in the second CQI table.

With reference to a second aspect, a notification method for an MCS is provided, including:
receiving a first channel quality indicator CQI index sent by terminal UE, where the first CQI index is determined by the UE according to an acquired first CQI table;
determining a first MCS index according to the first CQI table, a first MCS table, and the received first CQI index; and
sending the determined first MCS index to the UE;
where the first CQI table includes:
entries in which modulation schemes are higher than 64QAM; and
at least one entry in which a modulation scheme is QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where
modulation schemes in the second CQI table include only QPSK, 16QAM, and 64QAM; and
the first MCS table includes:
entries in which modulation schemes are higher than 64QAM, and
at least one entry in which a modulation scheme is QPSK in a second MCS table, where the at least one entry in which the modulation scheme is QPSK includes a combination except a second combination of combinations formed by the at least one entry in which the modulation scheme is QPSK in the second MCS table, and the second combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where
modulation schemes in the second MCS table include only QPSK, 16QAM, and 64QAM.

With reference to the second aspect, in a first possible implementation manner, the determining a first MCS index according to the acquired first CQI table, the determined first MCS table, and the received first CQI index includes:

determining a first TBS index and the first MCS index according to the first PRB quantity, the first CQI table, the first MCS table, and the received first CQI index, where:
the first PRB quantity is a PRB quantity allocated by a base station to the UE, or the first PRB quantity is a maximum integer less than or equal to a product of a PRB quantity allocated to the UE and a specific coefficient;
a first TBS table includes at least one PRB quantity corresponding to each TBS index and a transport block size corresponding to each PRB quantity, where the first TBS table is a TBS table corresponding to the first MCS table; and
a value range of a TBS index in the first TBS table is 0 to A, where A is a positive integer less than or equal to 26, or a value range of a TBS index in the first TBS table is 0 to B, where B is a positive integer greater than or equal to 26; a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

With reference to the first possible implementation manner, in a second possible implementation manner, the determining a first TBS index according to the first CQI table, a first PRB quantity, a first TBS table, and the received first CQI index includes:
determining, according to the first CQI table and the received first CQI index, a first modulation scheme and a first spectrum efficiency that correspond to the received first CQI index;
learning, according to the first PRB quantity and the first spectrum efficiency, a first transport block size transmitted to the UE; and
obtaining, according to the first TBS table, the first TBS index that corresponds to the first transport block size and the first PRB quantity in the first TBS table.

With reference to the second aspect or either of the first two possible implementation manners, in a third possible implementation manner, the at least one entry in which the modulation scheme is QPSK in the second CQI table includes:
some entries in which modulation schemes are QPSK in the second CQI table, where CQI indices corresponding to the some entries are at equal intervals; or
some entries in which modulation schemes are QPSK in the second CQI table, where CQI indices corresponding to the some entries are not at equal intervals, or
some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or
some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

With reference to the second aspect or either of the first two possible implementation manners, in a fourth possible implementation manner, the at least one entry in which the modulation scheme is 16QAM in the second CQI table includes:
    all entries in which modulation schemes are 16QAM in the second CQI table; or
    at least one entry, except an entry corresponding to a minimum CQI index, of all entries in which modulation schemes are 16QAM in the second CQI table.

With reference to the second aspect or any one of the first four possible implementation manners, in a fifth possible implementation manner, the first CQI table further includes:
    at least one entry in which a modulation scheme is 64QAM in the second CQI table.

With reference to the fifth possible implementation manner, in a sixth possible implementation manner, the at least one entry in which the modulation scheme is 64QAM includes:
    all entries in which modulation schemes are 64QAM in the second CQI table; or
    some entries in which modulation schemes are 64QAM in the second CQI table, and at least one entry, except an entry corresponding to a maximum CQI index, of all entries in which modulation schemes are 64QAM in the second CQI table.

With reference to the second aspect or any one of the first six possible implementation manners, in a seventh possible implementation manner, a spectrum efficiency in an entry that is corresponding to a minimum CQI index and of the entries in which the modulation schemes are higher than 64QAM in the first CQI table is equal to a spectrum efficiency in an entry that is corresponding to a maximum CQI index and of all the entries in which the modulation schemes are 64QAM in the second CQI table.

With reference to the second aspect, in an eighth possible implementation manner, spectrum efficiencies in X entries that are corresponding to maximum CQI indices and of the entries in which the modulation schemes are higher than 64QAM in the first CQI table are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

With reference to the second aspect, in a ninth possible implementation manner, the entries in which the modulation schemes are higher than 64QAM in the first CQI table include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

With reference to the second aspect, in a tenth possible implementation manner, the first CQI table includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

With reference to any one of the eighth to the tenth possible implementation manners, in an eleventh possible implementation manner, the constant is less than or equal to a first threshold.

With reference to the second aspect, in a twelfth possible implementation manner, an absolute value of a difference between spectrum efficiencies in any two adjacent entries of X entries that are corresponding to maximum CQI indices and of the entries in which the modulation schemes are higher than 64QAM in the first CQI table is less than or equal to a first threshold; or
    the entries in which the modulation schemes are higher than 64QAM in the first CQI table include: at least two entries in which modulation schemes are 256QAM, where an absolute value of a difference between spectrum efficiencies in any two adjacent entries of the at least two entries in which the modulation schemes are 256QAM is less than or equal to a first threshold; or
    the first CQI table includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

With reference to the eighth possible implementation manner or the twelfth possible implementation manner, in a thirteenth possible implementation manner, X=3.

With reference to either of the eleventh and the twelfth possible implementation manners, in a fourteenth possible implementation manner, the first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

With reference to the second aspect or any one of the first fourteen possible implementation manners, in a fifteenth possible implementation manner, a value range of a CQI index in the first CQI table is the same as a value range of a CQI index in the second CQI table.

With reference to the second aspect or either of the first two possible implementation manners, in a sixteenth possible implementation manner, the at least one entry in which the modulation scheme is QPSK in the second MCS table includes:
  some entries in which modulation schemes are QPSK in the second MCS table, where MCS indices corresponding to the some entries are at equal intervals; or
  some entries in which modulation schemes are QPSK in the second MCS table, where MCS indices corresponding to the some entries are not at equal intervals; or
  some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or
  some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

With reference to the second aspect or either of the first two possible implementation manners, in a seventeenth possible implementation manner, the at least one entry in which the modulation scheme is 16QAM in the second MCS table includes:
  all entries in which modulation schemes are 16QAM in the second MCS table, or
  some entries in which modulation schemes are 16QAM in the second MCS table, where MCS indices corresponding to the some entries are at equal intervals; or
  some entries in which modulation schemes are 16QAM in the second MCS table, where MCS indices corresponding to the some entries are not at equal intervals; or
  some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or
  some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or
  some entries in which modulation schemes are 16QAM in the second MCS table, and at least one entry, except an entry with a maximum MCS index and an entry with a minimum MCS index, of all entries in which modulation schemes are 16QAM in the second MCS table.

With reference to the second aspect or any one of the first, the second, the sixteenth, and the seventeenth possible implementation manners, in an eighteenth possible implementation manner, the first MCS table further includes:
  at least one entry in which a modulation scheme is 64QAM in the second MCS table.

With reference to the eighteenth possible implementation manner, in a nineteenth possible implementation manner, the at least one entry in which the modulation scheme is 64QAM in the second MCS table includes:
  all entries in which modulation schemes are 64QAM in the second MCS table, or
  some entries in which modulation schemes are 64QAM in the second MCS table, and at least one entry, except an entry with a minimum MCS index, of all entries in which modulation schemes are 64QAM in the second MCS table.

With reference to the eighteenth or the nineteenth possible implementation manner, in a twentieth possible implementation manner, the at least one entry in which the modulation scheme is 64QAM in the second MCS table includes:
  a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

With reference to any one of the sixteenth to the twentieth possible implementation manners, in a twenty-first possible implementation manner, a value range of an MCS index in the first MCS table is the same as a value range of an MCS index in the second MCS table.

With reference to a third aspect, a notification method for an MCS is provided, including:
  receiving, by a base station, a first CQI index, where the first CQI index is determined by UE according to an acquired first CQI table;
  determining a first MCS index according to the first CQI table, a first MCS table, and the received first CQI index; and
  sending the determined first MCS index to the UE;
  where the first CQI table includes: entries in which modulation schemes are higher than 64QAM, where an entry in the first CQI table refers to one modulation scheme, one code rate, and one spectrum efficiency that correspond to each CQI index in the first CQI table; and the first MCS table includes:
    entries in which modulation schemes are higher than 64QAM, and
    at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where
    modulation schemes in the second MCS table include only QPSK, 16QAM, and 64QAM.

With reference to the third aspect, in a first possible implementation manner, the at least one entry in which the modulation scheme is QPSK in the second MCS table includes:
    some entries in which modulation schemes are QPSK in the second MCS table, where MCS indices corresponding to the some entries are at equal intervals; or
    some entries in which modulation schemes are QPSK in the second MCS table, where MCS indices corresponding to the some entries are not at equal intervals; or
    some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or
    some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

With reference to the third aspect, in a second possible implementation manner, the at least one entry in which the modulation scheme is 16QAM in the second MCS table includes:
    all entries in which modulation schemes are 16QAM in the second MCS table; or
    some entries in which modulation schemes are 16QAM in the second MCS table, where MCS indices corresponding to the some entries are at equal intervals; or
    some entries in which modulation schemes are 16QAM in the second MCS table, where MCS indices corresponding to the some entries are not at equal intervals; or
    some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or
    some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or
    some entries in which modulation schemes are 16QAM in the second MCS table, and at least one entry, except an entry with a maximum MCS index and an entry with a minimum MCS index, of all entries in which modulation schemes are 16QAM in the second MCS table.

With reference to the third aspect or either of the first two possible implementation manners, in a third possible implementation manner, the first MCS table further includes:
    at least one entry in which a modulation scheme is 64QAM in the second MCS table.

With reference to the third possible implementation manner, in a fourth possible implementation manner, the at least one entry in which the modulation scheme is 64QAM in the second MCS table includes:
    all entries in which modulation schemes are 64QAM in the second MCS table; or
    some entries in which modulation schemes are 64QAM in the second MCS table, and at least one entry, except an entry with a minimum MCS index, of all entries in which modulation schemes are 64QAM in the second MCS table.

With reference to the third or the fourth possible implementation manner, in a fifth possible implementation manner, the at least one entry in which the modulation scheme is 64QAM in the second MCS table includes:
    a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

With reference to the third aspect or the first five possible implementation manners, in a sixth possible implementation manner, a value range of an MCS index in the first MCS table is the same as a value range of an MCS index in the second MCS table.

With reference to a fourth aspect, a notification method for an MCS is provided, including:
    receiving a first MCS index sent by a base station, where the first MCS index is determined by the base station according to a first MCS table; and
    determining a modulation order and a code block size according to the first MCS table and the received first MCS index;
    where the first MCS table includes:
    entries in which modulation schemes are higher than 64QAM; and
    at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where
    modulation schemes in the second MCS table include only QPSK, 16QAM, and 64QAM.

With reference to the fourth aspect, in a first possible implementation manner, the determining a modulation order and a code block size according to the first MCS table and the received first MCS index includes:
    determining a first TBS index and the modulation order according to the first MCS table and the received first MCS index; and determining the code block size according to the first TBS index, a first PRB quantity, and a first TBS table, where:
the first PRB quantity is a PRB quantity allocated by the base station to UE, or the first PRB quantity is a maximum integer less than or equal to a product of a PRB quantity allocated to UE and a specific coefficient;
the first TBS table includes at least one PRB quantity corresponding to each TBS index and a transport block size corresponding to each PRB quantity, where the first TBS table is a TBS table corresponding to the first MCS table; and
a value range of a TBS index in the first TBS table is 0 to A, where A is a positive integer less than or equal to 26, or a value range of a TBS index in the first TBS table is 0 to B, where B is a positive integer greater than or equal to 26; a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

With reference to the fourth aspect or the first possible implementation manner, in a second possible implementation manner, the at least one entry in which the modulation scheme is QPSK in the second MCS table includes:
some entries in which modulation schemes are QPSK in the second MCS table, where MCS indices corresponding to the some entries are at equal intervals; or
some entries in which modulation schemes are QPSK in the second MCS table, where MCS indices corresponding to the some entries are not at equal intervals; or
some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or
some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

With reference to the fourth aspect or the first possible implementation manner, in a third possible implementation manner, the at least one entry in which the modulation scheme is 16QAM in the second MCS table includes:
all entries in which modulation schemes are 16QAM in the second MCS table, or
some entries in which modulation schemes are 16QAM in the second MCS table, where MCS indices corresponding to the some entries are at equal intervals; or
some entries in which modulation schemes are 16QAM in the second MCS table, where MCS indices corresponding to the some entries are not at equal intervals; or
some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or
some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or
some entries in which modulation schemes are 16QAM in the second MCS table, and at least one entry, except an entry with a maximum MCS index and an entry with a minimum MCS index, of all entries in which modulation schemes are 16QAM in the second MCS table.

With reference to the fourth aspect or the first three possible implementation manners, in a fourth possible implementation manner, the first MCS table further includes:
at least one entry in which a modulation scheme is 64QAM in the second MCS table.

With reference to the fourth possible implementation manner, in a fifth possible implementation manner, the at least one entry in which the modulation scheme is 64QAM in the second MCS table includes:
all entries in which modulation schemes are 64QAM in the second MCS table; or
some entries in which modulation schemes are 64QAM in the second MCS table, and at least one entry, except an entry with a minimum MCS index, of all entries in which modulation schemes are 64QAM in the second MCS table.

With reference to the fourth or the fifth possible implementation manner, in a sixth possible implementation manner, the at least one entry in which the modulation scheme is 64QAM in the second MCS table includes:
a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

With reference to the fourth aspect or any one of the first six possible implementation manners, in a seventh possible implementation manner, a value range of an MCS index in the first MCS table is the same as a value range of an MCS index in the second MCS table.

With reference to a fifth aspect, a notification apparatus for a CQI is provided, including:
an acquiring module, configured to acquire a first CQI table;
a first acquiring module, configured to learn a first CQI index according to the first CQI table acquired by the acquiring module; and
a sending module, configured to send the first CQI index acquired by the first acquiring module to a base station, so that the base station determines a first modulation and coding scheme MCS index according to the first CQI index;
where the first CQI table acquired by the acquiring module includes:
entries in which modulation schemes are higher than 64 quadrature amplitude modulation QAM; and
at least one entry in which a modulation scheme is quadrature phase shift keying QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where modulation schemes in entries in the second CQI table include only QPSK, 16QAM, and 64QAM.

With reference to the fifth aspect, in a first possible implementation manner, the at least one entry in which the modulation scheme is QPSK in the second CQI table in the first CQI table acquired by the acquiring module includes:

some entries in which modulation schemes are QPSK in the second CQI table, where CQI indices corresponding to the some entries are at equal intervals; or some entries in which modulation schemes are QPSK in the second CQI table, where CQI indices corresponding to the some entries are not at equal intervals, or some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

With reference to the fifth aspect, in a second possible implementation manner, the at least one entry in which the modulation scheme is 16QAM in the second CQI table in the first CQI table acquired by the acquiring module includes.

all entries in which modulation schemes are 16QAM in the second CQI table; or at least one entry, except an entry corresponding to a minimum CQI index, of all entries in which modulation schemes are 16QAM in the second CQI table.

With reference to the fifth aspect or the first two possible implementation manners, in a third possible implementation manner, the first CQI table acquired by the acquiring module further includes:

at least one entry in which a modulation scheme is 64QAM in the second CQI table.

With reference to the third possible implementation manner, in a fourth possible implementation manner, the at least one entry in which the modulation scheme is 64QAM includes:

all entries in which modulation schemes are 64QAM in the second CQI table; or some entries in which modulation schemes are 64QAM in the second CQI table, and at least one entry, except an entry corresponding to a maximum CQI index, of all entries in which modulation schemes are 64QAM in the second CQI table.

With reference to the fifth aspect, in a fifth possible implementation manner, a spectrum efficiency in an entry that is corresponding to a minimum CQI index and of the entries in which the modulation schemes are higher than 64QAM in the first CQI table acquired by the acquiring module is equal to a spectrum efficiency in an entry that is corresponding to a maximum CQI index and of all entries in which modulation schemes are 64QAM in the second CQI table.

With reference to the fifth aspect, in a sixth possible implementation manner, spectrum efficiencies in X entries that are corresponding to maximum CQI indices and of the entries in which the modulation schemes are higher than 64QAM in the first CQI table acquired by the acquiring module are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

With reference to the fifth aspect, in a seventh possible implementation manner, the entries in which the modulation schemes are higher than 64QAM in the first CQI table acquired by the acquiring module include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

With reference to the fifth aspect, in an eighth possible implementation manner, the first CQI table acquired by the acquiring module includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

With reference to any one of the sixth to the eighth possible implementation manners, in a ninth possible implementation manner, the constant is less than or equal to a first threshold.

With reference to the fifth aspect, in a tenth possible implementation manner, an absolute value of a difference between spectrum efficiencies in any two adjacent entries of X entries that are corresponding to maximum CQI indices and of the entries in which the modulation schemes are higher than 64QAM in the first CQI table acquired by the acquiring module is less than or equal to a first threshold; or
the entries in which the modulation schemes are higher than 64QAM in the first CQI table acquired by the acquiring module include: at least two entries in which modulation schemes are 256QAM, where an absolute value of a difference between spectrum efficiencies in any two adjacent entries of the at least two entries in which the modulation schemes are 256QAM is less than or equal to a first threshold; or
the first CQI table acquired by the acquiring module includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

With reference to the sixth possible implementation manner or the tenth possible implementation manner, in an eleventh possible implementation manner, X=3.

With reference to the ninth possible implementation manner or the tenth possible implementation manner, in a twelfth possible implementation manner, the first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

With reference to the fifth aspect or any one of the first twelve possible implementation manners, in a thirteenth possible implementation manner, a value range of a CQI index in the first CQI table acquired by the acquiring module is the same as a value range of a CQI index in the second CQI table.

With reference to a sixth aspect, a notification apparatus for an MCS is provided, including:
an acquiring module, configured to acquire a first CQI table and a first MCS table;
a receiving module, configured to receive a first channel quality indicator CQI index sent by terminal UE, where the first CQI index is determined by the UE according to the first CQI table;
a determining module, configured to determine a first MCS index according to the first CQI table acquired by the acquiring module, the first MCS table acquired by the acquiring module, and the first CQI index received by the receiving module; and
a sending module, configured to send the determined first MCS index to the UE;
where the first CQI table acquired by the acquiring module includes:
entries in which modulation schemes are higher than 64QAM; and
at least one entry in which a modulation scheme is QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where
modulation schemes in the second CQI table include only QPSK, 16QAM, and 64QAM; and
the first MCS table acquired by the acquiring module includes:
entries in which modulation schemes are higher than 64QAM; and
at least one entry in which a modulation scheme is QPSK in a second MCS table, where the at least one entry in which the modulation scheme is QPSK includes a combination except a second combination of combinations formed by the at least one entry in which the modulation scheme is QPSK in the second MCS table, and the second combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where
modulation schemes in the second MCS table include only QPSK, 16QAM, and 64QAM.

With reference to the sixth aspect, in a first possible implementation manner, the determining module is specifically configured to:
determine a first TBS index and the first MCS index according to an acquired first PRB quantity, the first CQI table acquired by the acquiring module, the first MCS table acquired by the acquiring module, and the received first CQI index, where:
the first PRB quantity is a PRB quantity allocated by a base station to the UE, or the first PRB quantity is a maximum integer less than or equal to a product of a PRB quantity allocated to the UE and a specific coefficient;
a first TBS table includes at least one PRB quantity corresponding to each TBS index and a transport block size corresponding to each PRB quantity, where the first TBS table is a TBS table corresponding to the first MCS table, and a value range of a TBS index in the first TBS table is 0 to A, where A is a positive integer less than or equal to 26, or a value range of a TBS index in the first TBS table is 0 to B, where B is a positive integer greater than or equal to 26; a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

With reference to the first possible implementation manner, in a second possible implementation manner, the determining module includes:

a first determining submodule, configured to determine, according to the first CQI table acquired by the acquiring module and the received first CQI index, a first modulation scheme and a first spectrum efficiency that correspond to the received first CQI index; and a second determining submodule, configured to learn, according to the first PRB quantity and the first spectrum efficiency, a first transport block size transmitted to the UE; and obtain, according to the first TBS table, the first TBS index that corresponds to the first transport block size and the first PRB quantity in the first TBS table.

With reference to the sixth aspect or either of the first two possible implementation manners, in a third possible implementation manner, the at least one entry in which the modulation scheme is QPSK in the second CQI table includes:

some entries in which modulation schemes are QPSK in the second CQI table, where CQI indices corresponding to the some entries are at equal intervals; or some entries in which modulation schemes are QPSK in the second CQI table, where CQI indices corresponding to the some entries are not at equal intervals; or some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

With reference to the sixth aspect or either of the first two possible implementation manners, in a fourth possible implementation manner, the at least one entry in which the modulation scheme is 16QAM in the second CQI table in the first CQI table acquired by the acquiring module includes:

all entries in which modulation schemes are 16QAM in the second CQI table; or at least one entry, except an entry corresponding to a minimum CQI index, of all entries in which modulation schemes are 16QAM in the second CQI table.

With reference to the sixth aspect or any one of the first four possible implementation manners, in a fifth possible implementation manner, the first CQI table acquired by the acquiring module further includes:

at least one entry in which a modulation scheme is 64QAM in the second CQI table.

With reference to the fifth possible implementation manner, in a sixth possible implementation manner, the at least one entry in which the modulation scheme is 64QAM includes:

all entries in which modulation schemes are 64QAM in the second CQI table; or some entries in which modulation schemes are 64QAM in the second CQI table, and at least one entry, except an entry corresponding to a maximum CQI index, of all entries in which modulation schemes are 64QAM in the second CQI table.

With reference to the sixth aspect or any one of the first six possible implementation manners, in a seventh possible implementation manner, a spectrum efficiency in an entry that is corresponding to a minimum CQI index and of the entries in which the modulation schemes are higher than 64QAM in the first CQI table acquired by the acquiring module is equal to a spectrum efficiency in an entry corresponding to a maximum CQI index of all the entries in which the modulation schemes are 64QAM in the second CQI table.

With reference to the sixth aspect, in an eighth possible implementation manner, spectrum efficiencies in X entries that are corresponding to maximum CQI indices and of the entries in which the modulation schemes are higher than 64QAM in the first CQI table acquired by the acquiring module are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

With reference to the sixth aspect, in a ninth possible implementation manner, the entries in which the modulation schemes are higher than 64QAM in the first CQI table acquired by the acquiring module include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

With reference to the sixth aspect, in a tenth possible implementation manner, the first CQI table acquired by the acquiring module includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

With reference to any one of the eighth to the tenth possible implementation manners, in an eleventh possible implementation manner, the constant is less than or equal to a first threshold.

With reference to the sixth aspect, in a twelfth possible implementation manner, an absolute value of a difference between spectrum efficiencies in any two adjacent entries of X entries that are corresponding to maximum CQI indices and of the entries in which the modulation schemes are higher than 64QAM in the first CQI table acquired by the acquiring module is less than or equal to a first threshold; or
   the entries in which the modulation schemes are higher than 64QAM in the first CQI table acquired by the acquiring module include: at least two entries in which modulation schemes are 256QAM, where an absolute value of a difference between spectrum efficiencies in any two adjacent entries of the at least two entries in which the modulation schemes are 256QAM is less than or equal to a first threshold; or
   the first CQI table acquired by the acquiring module includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

With reference to the eighth possible implementation manner or the twelfth possible implementation manner, in a thirteenth possible implementation manner, X=3.

With reference to either of the eleventh to the twelfth possible implementation manners, in a fourteenth possible implementation manner, the first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

With reference to the sixth aspect or any one of the first fourteen possible implementation manners, in a fifteenth possible implementation manner, a value range of a CQI index in the first CQI table acquired by the acquiring module is the same as a value range of a CQI index in the second CQI table.

With reference to the sixth aspect or either of the first two possible implementation manners, in a sixteenth possible implementation manner, the at least one entry in which the modulation scheme is QPSK in the second MCS table in the first MCS table acquired by the acquiring module includes:
   some entries in which modulation schemes are QPSK in the second MCS table, where MCS indices corresponding to the some entries are at equal intervals; or
   some entries in which modulation schemes are QPSK in the second MCS table, where MCS indices corresponding to the some entries are not at equal intervals; or
   some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive, or
   some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

With reference to the sixth aspect or either of the first two possible implementation manners, in a seventeenth possible implementation manner, the at least one entry in which the modulation scheme is 16QAM in the second MCS table in the first MCS table acquired by the acquiring module includes:
   all entries in which modulation schemes are 16QAM in the second MCS table; or
   some entries in which modulation schemes are 16QAM in the second MCS table, where MCS indices corresponding to the some entries are at equal intervals, or
   some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or some entries in which modulation schemes are 16QAM in the second MCS table, and at least one entry, except an entry with a maximum MCS index and an entry with a minimum MCS index, of all entries in which modulation schemes are 16QAM in the second MCS table.

With reference to the sixth aspect or any one of the first, the second, the sixteenth, and the seventeenth possible implementation manners, in an eighteenth possible implementation manner, the first MCS table acquired by the acquiring module further includes:

at least one entry in which a modulation scheme is 64QAM in the second MCS table.

With reference to the eighteenth possible implementation manner, in a nineteenth possible implementation manner, the at least one entry in which the modulation scheme is 64QAM in the second MCS table includes:

all entries in which modulation schemes are 64QAM in the second MCS table; or some entries in which modulation schemes are 64QAM in the second MCS table, and at least one entry, except an entry with a minimum MCS index, of all entries in which modulation schemes are 64QAM in the second MCS table.

With reference to the eighteenth or the nineteenth possible implementation manner, in a twentieth possible implementation manner, the at least one entry in which the modulation scheme is 64QAM in the second MCS table includes:

a TBS index in an entry that is corresponding to a minimum MCS index and of all entries in which modulation schemes are higher than 64QAM in the first MCS table acquired by the acquiring module is the same as a TBS index in an entry with a maximum MCS index of all the entries in which the modulation schemes are 64QAM in the second MCS table.

With reference to any one of the sixteenth to the twentieth possible implementation manners, in a twenty-first possible implementation manner, a value range of an MCS index in the first MCS table acquired by the acquiring module is the same as a value range of an MCS index in the second MCS table.

With reference to a seventh aspect, a notification apparatus for an MCS is provided, including:

an acquiring module, configured to acquire a first CQI table and a first MCS table;

a receiving module, configured to receive, by a base station, a first CQI index, where the first CQI index is determined by UE according to the first CQI table;

a determining module, configured to determine a first MCS index according to the first CQI table acquired by the acquiring module, the first MCS table acquired by the acquiring module, and the first CQI index received by the receiving module; and a sending module, configured to send the first MCS index determined by the determining module to the UE;

where the first CQI table acquired by the acquiring module includes: entries in which modulation schemes are higher than 64QAM, where an entry in the first CQI table acquired by the acquiring module refers to one modulation scheme, one code rate, and one spectrum efficiency that correspond to each CQI index in the first CQI table acquired by the acquiring module; and the first MCS table acquired by the acquiring module includes:

entries in which modulation schemes are higher than 64QAM, and at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where modulation schemes in the second MCS table include only QPSK, 16QAM, and 64QAM.

With reference to the seventh aspect, in a first possible implementation manner, the at least one entry in which the modulation scheme is QPSK in the second MCS table includes:

some entries in which modulation schemes are QPSK in the second MCS table, where MCS indices corresponding to the some entries are at equal intervals; or some entries in which modulation schemes are QPSK in the second MCS table, where MCS indices corresponding to the some entries are not at equal intervals; or some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

With reference to the seventh aspect, in a second possible implementation manner, the at least one entry in which the modulation scheme is 16QAM in the second MCS table in the first MCS table acquired by the acquiring module includes:

all entries in which modulation schemes are 16QAM in the second MCS table; or some entries in which modulation schemes are 16QAM in the second MCS table, where MCS indices corresponding to the some entries are at equal intervals; or some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or some entries in which modulation schemes are 16QAM in the second MCS table, and at least one entry, except an entry with a maximum MCS index and an entry with a minimum MCS index, of all entries in which modulation schemes are 16QAM in the second MCS table.

With reference to the seventh aspect or either of the first two possible implementation manners, in a third possible implementation manner, the first MCS table acquired by the acquiring module further includes:
at least one entry in which a modulation scheme is 64QAM in the second MCS table.

With reference to the third possible implementation manner, in a fourth possible implementation manner, the at least one entry in which the modulation scheme is 64QAM in the second MCS table includes:
all entries in which modulation schemes are 64QAM in the second MCS table; or
some entries in which modulation schemes are 64QAM in the second MCS table, and at least one entry, except an entry with a minimum MCS index, of all entries in which modulation schemes are 64QAM in the second MCS table.

With reference to the third or the fourth possible implementation manner, in a fifth possible implementation manner, the at least one entry in which the modulation scheme is 64QAM in the second MCS table includes:
a TBS index in an entry that is corresponding to a minimum MCS index and of all entries in which modulation schemes are higher than 64QAM in the first MCS table acquired by the acquiring module is the same as a TBS index in an entry with a maximum MCS index of all the entries in which the modulation schemes are 64QAM in the second MCS table.

With reference to the seventh aspect or the first five possible implementation manners, in a sixth possible implementation manner, a value range of an MCS index in the first MCS table acquired by the acquiring module is the same as a value range of an MCS index in the second MCS table.

With reference to an eighth aspect, a notification apparatus for an MCS is provided, including:
an acquiring module, configured to acquire a first MCS table;
a receiving module, configured to receive a first MCS index sent by a base station, where the first MCS index is determined by the base station according to the first MCS table acquired by the acquiring module; and
a determining module, configured to determine a modulation order and a code block size according to the first MCS table acquired by the acquiring module and the first MCS index received by the receiving module;
where the first MCS table acquired by the acquiring module includes:
entries in which modulation schemes are higher than 64QAM; and
at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where
modulation schemes in the second MCS table include only QPSK, 16QAM, and 64QAM.

With reference to the eighth aspect, in a first possible implementation manner, the determining module includes:
a first determining submodule, configured to determine a first TBS index and the modulation order according to the first MCS table acquired by the acquiring module and the received first MCS index; and
a second determining submodule, configured to determine the code block size according to the first TBS index, a first PRB quantity, and a first TBS table, where
the first PRB quantity is a PRB quantity allocated by the base station to UE, or the first PRB quantity is a maximum integer less than or equal to a product of a PRB quantity allocated to UE and a specific coefficient;
the first TBS table includes at least one PRB quantity corresponding to each TBS index and a transport block size corresponding to each PRB quantity, where the first TBS table is a TBS table corresponding to the first MCS table; and
a value range of a TBS index in the first TBS table is 0 to A, where A is a positive integer less than or equal to 26, or a value range of a TBS index in the first TBS table is 0 to B, where B is a positive integer greater than or equal to 26, a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

With reference to the eighth aspect or the first possible implementation manner, in a second possible implementation manner, the at least one entry in which the modulation scheme is QPSK in the second MCS table includes:
some entries in which modulation schemes are QPSK in the second MCS table, where MCS indices corresponding to the some entries are at equal intervals; or
some entries in which modulation schemes are QPSK in the second MCS table, where MCS indices corresponding to the some entries are not at equal intervals; or
some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or
some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

With reference to the eighth aspect or the first possible implementation manner, in a third possible implementation manner, the at least one entry in which the modulation scheme is 16QAM in the second MCS table includes:
all entries in which modulation schemes are 16QAM in the second MCS table; or some entries in which modulation schemes are 16QAM in the second MCS table, where MCS indices corresponding to the some entries are at equal intervals; or some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or some entries in which modulation schemes are 16QAM in the second MCS table, and at least one entry, except an entry with a maximum MCS index and an entry with a minimum MCS index, of all entries in which modulation schemes are 16QAM in the second MCS table.

With reference to the eighth aspect or any one of the first three possible implementation manners, in a fourth possible implementation manner, the first MCS table acquired by the acquiring module further includes:

at least one entry in which a modulation scheme is 64QAM in the second MCS table.

With reference to the fourth possible implementation manner, in a fifth possible implementation manner, the at least one entry in which the modulation scheme is 64QAM in the second MCS table includes:

all entries in which modulation schemes are 64QAM in the second MCS table; or some entries in which modulation schemes are 64QAM in the second MCS table, and at least one entry, except an entry with a minimum MCS index, of all entries in which modulation schemes are 64QAM in the second MCS table.

With reference to the fourth or the fifth possible implementation manner, in a sixth possible implementation manner, the at least one entry in which the modulation scheme is 64QAM in the second MCS table includes:

a TBS index in an entry that is corresponding to a minimum MCS index and of all entries in which modulation schemes are higher than 64QAM in the first MCS table acquired by the acquiring module is the same as a TBS index in an entry with a maximum MCS index of all the entries in which the modulation schemes are 64QAM in the second MCS table.

With reference to the eighth aspect or the first six possible implementation manners, in a seventh possible implementation manner, a value range of an MCS index in the first MCS table acquired by the acquiring module is the same as a value range of an MCS index in the second MCS table.

With reference to a ninth aspect, a notification apparatus for a channel quality indicator CQI is provided, including:

a memory and a processor connected to the memory, and further including a transmitter, where the memory stores a set of program code, and the processor is configured to call the program code stored in the memory to perform the method according to the first aspect or any one of the possible implementation manners of the first aspect; and the sender is configured to send a first CQI index that is obtained by calling, by the processor, the program code stored in the memory to perform the method according to the first aspect or any one of the possible implementation manners of the first aspect.

With reference to a tenth aspect, a notification apparatus for a modulation and coding scheme MCS is provided, including:

a memory and a processor connected to the memory, and further including a sender and a receiver, where the memory stores a set of program code, and the processor is configured to call the program code stored in the memory to perform the method according to the second aspect or any one of the possible implementation manners of the second aspect; and the receiver is configured to receive a first CQI index sent by UE; and the sender is configured to send a first MCS index that is obtained by calling, by the processor, the program code stored in the memory to perform the method according to the second aspect or any one of the possible implementation manners of the second aspect.

With reference to an eleventh aspect, a notification apparatus for a modulation and coding scheme MCS is provided, including a memory and a processor connected to the memory, and further including a sender and a receiver, where the memory stores a set of program code, and the processor is configured to call the program code stored in the memory to perform the method according to the third aspect or any one of the possible implementation manners of the third aspect; and the receiver is configured to receive a first CQI index sent by UE; and the sender is configured to send a first MCS index that is obtained by calling, by the processor, the program code stored in the memory to perform the method according to the third aspect or any one of the possible implementation manners of the third aspect.

With reference to a twelfth aspect, a notification apparatus for a modulation and coding scheme MCS is provided, including a memory and a processor connected to the memory, and further including a receiver, where the memory stores a set of program code, and the processor is configured to call the program code stored in the memory to perform the method according to the fourth aspect or any one of the possible implementation manners of the fourth aspect; and the receiver is configured to receive a first MCS index sent by a base station.

The present invention provides a notification method and apparatus for a channel quality indicator and a modulation and coding scheme, which supports UE in selecting a modulation scheme higher than 64QAM and notifying a base station by using a method of sending a CQI index, and meanwhile supports the base station in selecting a modulation scheme higher than 64QAM and notifying the UE by using a method of sending an MCS index. Using the modulation scheme higher than 64QAM can provide higher quantization accuracy for an area with a high signal-to-noise ratio, thereby improving system performance.

The present invention provides a notification method and apparatus for a channel quality indicator and a modulation and coding scheme, which can further support UE in selecting a low spectrum efficiency and notifying a base station by using a method of sending a CQI index, and meanwhile can support the base station in selecting a small transport block size and notifying the UE by using a method of sending an MCS index, so as to ensure that the UE can also adapt to an unexpected low signal-to-noise ratio scenario when the UE uses a high-order modulation scheme, that is, to ensure that the UE can adapt to a dramatic change of a signal-to-noise ratio.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

An adaptive procedure for a physical downlink shared channel (PDSCH) is as follows:

First, user equipment (UE) estimates channel information used for measuring channel state information (CSI); second, the UE calculates a signal to interference plus noise ratio (SINR) by using the channel information and based on an optimal rank indication (RI) and/or a precoding matrix indication (PMI); and then, the UE obtains a corresponding channel quality indicator (CQI) according to the SINR, and reports a CQI value to a base station.

In addition, in the present invention, a modulation order corresponds to a modulation scheme. Exemplarily, if a modulation scheme is quadrature phase shift keying (QPSK), a modulation order is 2; if a modulation scheme is 16QAM, a modulation order is 4; if a modulation scheme is 64QAM, a modulation order is 6; if a modulation scheme is 256QAM, a modulation order is 8.

The following describes in detail a notification method for a CQI provided by an embodiment of the present invention with reference to the accompanying drawings.

Figure 1:
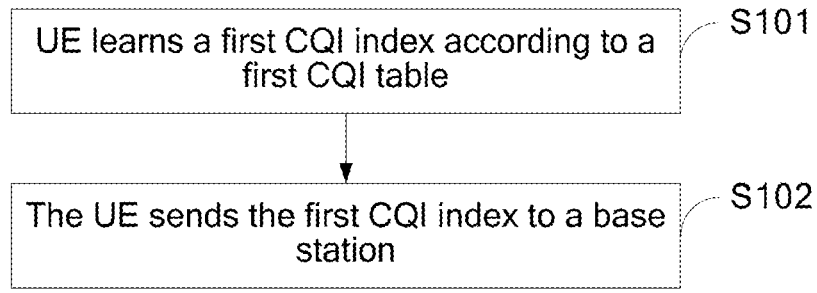
FIG. 1 is a schematic diagram of a notification method for a CQI according to an embodiment of the present invention.

As shown in FIG. 1, steps of the notification method for a CQI are as follows:

S101: UE learns a first CQI index according to an acquired first CQI table.

The first CQI table may be predefined in a protocol, for example, preset by the UE according to protocol specifications, or pre-stored by the UE; or may be selected by the UE from at least two predefined tables according to a downlink channel state; or may be notified by a base station to the UE, and specifically, a method for notifying the UE by the base station may be that the base station selects one of at least two predefined tables according to an uplink channel state or a downlink channel state, and notifies the UE of the table. A first CQI table is used for describing a mapping relationship between a CQI index and an entry. In this embodiment of the present invention, the mapping relationship in the CQI table is merely an example given for the convenience of understanding the present invention, and a representation form of the CQI table in the present invention includes, but is not limited to, the example. That is, the CQI table may have multiple combinations, and the combinations shall fall within the protection scope of the present invention as long as a mapping relationship between a CQI index and an entry can be reflected.

Specifically, the UE determines a first spectrum efficiency according to a measured first SINR, and then acquires, according to the first spectrum efficiency and the first CQI table, a first CQI index corresponding to the first spectrum efficiency, where the first CQI table is pre-stored by the UE.

The first CQI table may include:
entries in which modulation schemes are higher than 64QAM; and
at least one entry in which a modulation scheme is QPSK in a second CQI table, where the at least one entry in which the modulation scheme is QPSK may include a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where
modulation schemes in entries in the second CQI table may include only QPSK, 16QAM, and 64QAM.

That is, the first CQI table includes the entries in which the modulation schemes are higher than 64QAM; the first CQI table may further include the at least one entry in which the modulation scheme is QPSK in the second CQI table, and at least one entry in which modulation schemes are QPSK in the first CQI table cannot only be the N entries that are corresponding to the consecutive maximum CQI indices and of the entries in which the modulation schemes are QPSK in the second CQI table, where N may be equal to 3 or N may be a positive integer less than 4 or N may be a positive integer; and/or the first CQI table further includes the at least one entry in which the modulation scheme is 16QAM in the second CQI table.

Further, values of N are merely several examples given in the present invention, and the present invention includes, but is not limited to, the examples.

The modulation schemes in the entries in the second CQI table include only QPSK, 16QAM, and 64QAM. An entry in the first CQI table may refer to one modulation scheme, one code rate, and one spectrum efficiency that correspond to each CQI index in the first CQI table, and an entry in the second CQI table refers to one modulation scheme, one code rate, and one spectrum efficiency that correspond to each CQI index in the second CQI table. Certainly, an entry in the present invention may be set according to uplink state information or downlink state information, and entries in the first CQI table and the second CQI table are merely examples given in the present invention, and the present invention includes, but is not limited to, the examples.

In addition, the combination is a combination formed by the at least one entry in which the modulation scheme is QPSK in the second CQI table. Using a second CQI table shown in Table 1 as an example, there are in total $2^6-1-63$ combinations formed by at least one entry in which a modulation scheme is QPSK in the second CQI table. For example, the combination may be a combination formed by an entry corresponding to a CQI index 6 in the second CQI table, may be a combination formed by entries corresponding to CQI indices 4, 5, and 6 in the second CQI table, may be a combination formed by entries corresponding to CQI indices 3, 5, and 6 in the second CQI table, or the like.

Specifically, there may be three types of first CQI tables as follows:

a first type of first CQI table: including only entries in which modulation schemes are QPSK and entries in which modulation schemes are higher than 64QAM;

a second type of first CQI table: including only entries in which modulation schemes are 16QAM and entries in which modulation schemes are higher than 64QAM; and a third type of first CQI table: including only entries in which modulation schemes are QPSK, entries in which modulation schemes are 16QAM, and entries in which modulation schemes are higher than 64QAM.

There may be multiple types of first CQI tables in the present invention, the foregoing three types of first CQI tables are merely examples given for ease of understanding the present invention, and the present invention includes, but is not limited to, the examples.

For the convenience of understanding, the following CQI table (that is, the second CQI table) is used as an example for description.

TABLE 1

| CQI index (CQI index) | Modulation scheme (modulation) | Code rate × 1024 (code rate × 1024) | Spectrum efficiency (efficiency) |
|---|---|---|---|
| 0 | Out of range (out of range) | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |

TABLE 1-continued

| CQI index (CQI index) | Modulation scheme (modulation) | Code rate × 1024 (code rate × 1024) | Spectrum efficiency (efficiency) |
|---|---|---|---|
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The first CQI table includes the entries in which the modulation schemes are higher than 64QAM, and exemplarily, a quantity of included entries in which modulation schemes are higher than 64QAM may be one or more.

Exemplarily, a modulation scheme higher than 64QAM and included in the first CQI table may be 128QAM and/or 256QAM. If the first CQI table includes an entry only of one modulation scheme, the modulation scheme in the entry may be any modulation scheme of 128QAM, 256QAM, and another modulation scheme with a higher modulation scheme; if the first CQI table includes entries of multiple modulation schemes, the multiple modulation schemes included in the first CQI table may be any multiple modulation schemes of 128QAM, 256QAM, and another modulation scheme with a higher modulation scheme.

Exemplarily, the entries in which the modulation schemes are higher than 64QAM and that may be included in the first CQI table are shown in the following table.

TABLE 2

| CQI index (CQI index) | Modulation scheme (modulation) | Code rate × 1024 (code rate × 1024) | Spectrum efficiency (efficiency) |
|---|---|---|---|
| 13 | 128QAM | 778 | 6.0800 |
| 14 | 128QAM | 860 | 6.7200 |
| 15 | 256QAM | 942 | 7.3600 |

It should be noted that, in order to reduce a change to the prior art in a specific implementation process, preferably, a range of a CQI index in the first CQI table and a range of a CQI index in the second CQI table may be the same, which may be specifically 0 to 15. Certainly, the range of a CQI index in the first CQI table may also be greater than the range of a CQI index in the second CQI table, and exemplarily, the range of a CQI index in the first CQI table may be 0 to 20. The CQI indices in this embodiment of the present invention are merely examples given for the convenience of understanding the present invention, and the range of a CQI index in the present invention includes, but is not limited to, the examples.

For the first type of first CQI table, the first type of first CQI table includes only the entries in which the modulation schemes are QPSK and the entries in which the modulation schemes are higher than 64QAM.

A quantity of entries in which the modulation schemes are higher than 64QAM and that are included in the first CQI table may be one or more, and each entry in which the modulation scheme is higher than 64QAM includes a modulation scheme, a code rate, and a spectrum efficiency, and has a corresponding CQI index.

The first CQI table may further include some entries in which modulation schemes are QPSK in the second CQI table, that is, some entries of 6 entries in which modulation schemes are QPSK and that correspond to CQI indices 1 to 6 in the second CQI table (that is, in the table 1), and the entries in which the modulation schemes are QPSK in the first CQI table are not N entries that are corresponding to consecutive maximum CQI indices and of the entries in which the modulation schemes are QPSK in the second CQI table, where N is equal to 3. That is, the entries in which the modulation schemes are QPSK in the first CQI table cannot only be the entries corresponding to the CQI indices 4, 5, and 6 in the second CQI table.

Alternatively, the first CQI table may further include some entries in which modulation schemes are QPSK in the second CQI table, that is, some entries of 6 entries in which modulation schemes are QPSK and that correspond to CQI indices 1 to 6 in the second CQI table, and the entries in which the modulation schemes are QPSK in the first CQI table are not N entries with consecutive maximum CQI indices of the entries in which the modulation schemes are QPSK in the second CQI table, where N is a positive integer and N is less than 4, that is, N may be equal to 1, 2, or 3, where
  if N is equal to 1, the entries in which the modulation schemes are QPSK in the first CQI table cannot only be the entry corresponding to the CQI index 6 in the second CQI table; or
  if N is equal to 2, the entries in which the modulation schemes are QPSK in the first CQI table cannot only be the entries corresponding to the CQI indices 5 and 6 in the second CQI table; or
  if N is equal to 3, the entries in which the modulation schemes are QPSK in the first CQI table cannot only be the entries corresponding to the CQI indices 4, 5, and 6 in the second CQI table.

Alternatively, the first CQI table further includes some entries in which modulation schemes are QPSK in the second CQI table, that is, some entries of 6 entries in which modulation schemes are QPSK and that correspond to CQI indices 1 to 6 in the second CQI table, and the entries in which the modulation schemes are QPSK in the first CQI table are not N entries that are corresponding to consecutive maximum CQI indices and of the entries in which the modulation schemes are QPSK in the second CQI table, where N is a positive integer. That is, a value range of N may be 1 to 5, where
  if N is equal to 1, the entries in which the modulation schemes are QPSK in the first CQI table cannot only be the entry corresponding to the CQI index 6 in the second CQI table; or
  if N is equal to 2, the entries in which the modulation schemes are QPSK in the first CQI table cannot only be the entries corresponding to the CQI indices 5 and 6 in the second CQI table; or
  if N is equal to 3, the entries in which the modulation schemes are QPSK in the first CQI table cannot only be the entries corresponding to the CQI indices 4, 5, and 6 in the second CQI table; or
  if N is equal to 4, the entries in which the modulation schemes are QPSK in the first CQI table cannot only be the entries corresponding to the CQI indices 3, 4, 5, and 6 in the second CQI table; or
  if N is equal to 5, the entries in which the modulation schemes are QPSK in the first CQI table cannot only be the entries corresponding to the CQI indices 2, 3, 4, 5, and 6 in the second CQI table.

Further, values of N are merely several examples given in the present invention, and the present invention includes, but is not limited to, the examples.

Alternatively, the entries in which the modulation schemes are QPSK in the first CQI table include some entries in which modulation schemes are QPSK in the second CQI table, where CQI indices corresponding to the some entries are at equal intervals.

Exemplarily, if the entries in which the modulation schemes are QPSK in the first CQI table include 3 entries in which modulation schemes are QPSK in the second CQI table, the entries in which the modulation schemes are QPSK in the first CQI table may include the entries corresponding to the CQI indices 1, 3, and 5 in the second CQI table, or the entries in which the modulation schemes are QPSK in the first CQI table may include the entries corresponding to the CQI indices 2, 4, and 6 in the second CQI table.

Alternatively, the entries in which the modulation schemes are QPSK in the first CQI table include some entries in which modulation schemes are QPSK in the second CQI table, where CQI indices corresponding to the some entries are not at equal intervals.

Exemplarily, if the entries in which the modulation schemes are QPSK in the first CQI table include 3 entries in which modulation schemes are QPSK in the second CQI table, the entries in which the modulation schemes are QPSK in the first CQI table may include the entries corresponding to the CQI indices 1, 4, and 6 in the second CQI table, or the entries in which the modulation schemes are QPSK in the first CQI table may include the entries corresponding to the CQI indices 2, 5, and 6 in the second CQI table; or
  if the entries in which the modulation schemes are QPSK in the first CQI table include 4 entries in which modulation schemes are QPSK in the second CQI table, the entries in which the modulation schemes are QPSK in the first CQI table may include the entries corresponding to the CQI indices 1, 3, 4, and 6 in the second CQI table; or
  if the entries in which the modulation schemes are QPSK in the first CQI table include 5 entries in which modulation schemes are QPSK in the second CQI table, the entries in which the modulation schemes are QPSK in the first CQI table may include the entries corresponding to the CQI indices 1, 2, 3, 4, and 6 in the second CQI table.

Alternatively, the entries in which the modulation schemes are QPSK in the first CQI table include some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive.

Exemplarily, the entries in which the modulation schemes are QPSK in the first CQI table may include the entries corresponding to the CQI indices 1 and 3 in the second CQI table, or the entries in which the modulation schemes are QPSK in the first CQI table may include the entries corresponding to the CQI indices 2, 4, and 5 in the second CQI table.

Alternatively, the entries in which the modulation schemes are QPSK in the first CQI table include some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

Exemplarily, the entries in which the modulation schemes are QPSK in the first CQI table may include the entries corresponding to the CQI indices 2, 3, and 4 in the second CQI table, or the entries in which the modulation schemes are QPSK in the first CQI table may include the entries corresponding to the CQI indices 2, 3, 4, and 5 in the second CQI table.

For the second type of first CQI table, the second type of CQI table includes only the entries in which the modulation schemes are 16QAM and the entries in which the modulation schemes are higher than 64QAM.

A quantity of entries in which the modulation schemes are higher than 64QAM and that are included in the first CQI table may be one or more, and each entry in which the modulation scheme is higher than 64QAM includes a modulation scheme, a code rate, and a spectrum efficiency, and has a corresponding CQI index.

The first CQI table further includes all entries in which modulation schemes are 16QAM in the second CQI table.

Exemplarily, the first CQI table further includes 3 entries in which corresponding modulation schemes are 16QAM and that correspond to CQI indices 7 to 9, of the entries in which the modulation schemes are 16QAM in the second CQI table.

Alternatively, specifically, the first CQI table further includes some entries in which modulation schemes are 16QAM in the second CQI table and at least one entry, except an entry corresponding to a minimum CQI index, of all entries in which modulation schemes are 16QAM in the second CQI table.

Exemplarily, the entries in which the modulation schemes are 16QAM in the first CQI table may further include entries corresponding to CQI indices 8 and 9 in the second CQI table, or the entries in which the modulation schemes are 16QAM in the first CQI table may include an entry corresponding to a CQI index 8 or 9 in the second CQI table.

For the third type of first CQI table, based on the first type of first CQI table, entries in which modulation schemes are 16QAM are added to obtain the third type of first CQI table. The third type of first CQI table includes only the entries in which the modulation schemes are QPSK, the entries in which the modulation schemes are 16QAM, and the entries in which the modulation schemes are higher than 64QAM. An entry in which a modulation scheme is 16QAM and that is included in the third type of first CQI table may be the same as an entry in which a modulation scheme is 16QAM and that is included in the second type of first CQI table.

Specifically, the first CQI table further includes all entries in which modulation schemes are 16QAM in the second CQI table.

Alternatively, specifically, the first CQI table further includes some entries in which modulation schemes are 16QAM in the second CQI table and at least one entry, except an entry corresponding to a minimum CQI index, of all entries in which modulation schemes are 16QAM in the second CQI table.

Further, the first CQI table further includes at least one entry in which a modulation scheme is 64QAM in the second CQI table.

That is, based on the first type of first CQI table, entries in which modulation schemes are 64QAM are added to obtain a fourth type of first CQI table; in this case, the fourth type of first CQI table includes entries in which modulation schemes are QPSK, entries in which modulation schemes are higher than 64QAM, and entries in which modulation schemes are 64QAM.

Alternatively, based on the second type of first CQI table, entries in which modulation schemes are 64QAM are added to obtain a fifth type of first CQI table; in this case, the fifth type of first CQI table includes entries in which modulation schemes are higher than 64QAM, entries in which modulation schemes are 16QAM, and entries in which modulation schemes are 64QAM.

Alternatively, based on the third type of first CQI table, entries in which modulation schemes are 64QAM are added to obtain a sixth type of first CQI table; in this case, the sixth type of first CQI table includes entries in which modulation schemes are higher than 64QAM, and entries in which modulation schemes are QPSK, entries in which modulation schemes are 16QAM, and entries in which modulation schemes are 64QAM.

The entries in which the modulation schemes are 64QAM in the fourth, fifth, and sixth types of first CQI tables are as follows:

Specifically, the first CQI table further includes all entries in which modulation schemes are 64QAM in the second CQI table.

Exemplarily, the first CQI table includes 6 entries in which the modulation schemes are 64QAM in the second CQI table correspond to 6 entries in which modulation schemes are 64QAM and that correspond to second CQI indices 10 to 15.

Alternatively, specifically, the first CQI table further includes some entries in which modulation schemes are 64QAM in the second CQI table, and at least one entry, except an entry corresponding to a maximum CQI index, of all entries in which modulation schemes are 64QAM in the second CQI table.

Exemplarily, the entries in which the modulation schemes are 64QAM in the first CQI table may further include entries corresponding to CQI indices 10 to M in the second CQI table, where M may be 11, 12, 13, or 14; the entries in which the modulation schemes are 64QAM in the first CQI table may further include entries corresponding to CQI indices 10, 12, and 14 in the second CQI table; the entries in which the modulation schemes are 64QAM in the first CQI table may further include entries corresponding to CQI indices 10 and 13 in the second CQI table; or the entries in which the modulation schemes are 64QAM in the first CQI table may further include entries corresponding to CQI indices 10, 13, and 14 in the second CQI table.

Further, in the foregoing six types of first CQI tables, a spectrum efficiency in an entry that is corresponding to a minimum CQI index and of the entries in which the modulation schemes are higher than 64QAM may be equal to a spectrum efficiency in an entry that is corresponding to a maximum CQI index and of all the entries in which the modulation schemes are 64QAM in the second CQI table.

Exemplarily, assume that in the first CQI table, there are 3 entries in which modulation schemes are QPSK, and corresponding CQI indices are 1 to 3; there are 3 entries in which modulation schemes are 16QAM, and corresponding CQI indices are 4 to 6; there are 5 entries in which modulation schemes are 64QAM, and corresponding CQI indices are 7 to 11; and a range of a CQI index in the first CQI table is 0 to 15. Then, there are 4 entries in which modulation schemes are higher than 64QAM in the first CQI table, and corresponding CQI indices are 12 to 15; and an entry with a minimum CQI index is 12. Then specifically, as shown in the following table, an entry corresponding to the CQI index 12 in the first CQI table is the entry corresponding to the CQI index 15 in the second CQI table shown in Table 1.

As can be known from Table 3, entries corresponding to a same CQI index in the first CQI table and in the second CQI table may be the same, for example, when the CQI index is 1; entries corresponding to a same CQI index in the first CQI table and in the second CQI table may be different, for example, when the CQI index is 5, 9, or 10.

TABLE 3

| CQI index in the first CQI table | CQI index in the second CQI table | Modulation | Code rate × 1024 | Efficiency |
|---|---|---|---|---|
| 0 | 0 | | Out of range | |
| 1 | 1 | QPSK | 78 | 0.1523 |
| 2 | 3 | QPSK | 193 | 0.3770 |
| 3 | 5 | QPSK | 449 | 0.8770 |
| 4 | 7 | 16QAM | 378 | 1.4766 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 256QAM | 711 | 5.5547 |
| 13 | — | 256QAM | 778 | 6.0800 |
| 14 | — | 256QAM | 860 | 6.7200 |
| 15 | — | 256QAM | 942 | 7.3600 |

As can be seen, the foregoing six types of first CQI tables all include an entry in which a modulation scheme is higher than 64QAM, so as to support the UE in selecting a modulation scheme higher than 64QAM and notifying the base station by using a method of sending a CQI index, thereby improving system performance. In addition, the sixth type of first CQI table that includes entries in which modulation schemes are QPSK, 16QAM, and 64QAM and entries in which modulation schemes are higher than 64QAM is a preferred first CQI table.

Further, in the foregoing six types of first CQI tables, spectrum efficiencies in X entries that are corresponding to maximum CQI indices and of the entries in which the modulation schemes are higher than 64QAM in the first CQI table are arranged in an arithmetic progression or approximately in an arithmetic progression in ascending order of spectrum efficiency, where X is an integer greater than 2.

Specifically, that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant.

That spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value.

That is, assuming that the spectrum efficiencies in the X entries that are corresponding to the maximum CQI indices and of the entries in which the modulation schemes are higher than 64QAM are $(m_1, m_2, \ldots, m_X)$, starting from the second entry of the X entries, the difference between the spectrum efficiency in each entry and the spectrum efficiency in the previous entry of the entry is calculated and denoted as $t_i$, where $1 \leq i \leq X-1$, that is, $(t_1, t_2, \ldots, t_{X-1})$, and $t_i = m_{i+1} - m_i$.

If all values in $(t_1, t_2, \ldots, t_{X-1})$ are equal (are a constant), the spectrum efficiencies in the X entries that are corresponding to the maximum CQI indices and of the entries in which the modulation schemes are higher than 64QAM in the first CQI table are arranged in an arithmetic progression in ascending order of spectrum efficiency, where the constant is referred to as a common difference of the arithmetic progression.

If there is a constant enabling all absolute values of differences between all the values in $(t_1, t_2, \ldots, t_{X-1})$ and the constant to be within a preset value range, the spectrum efficiencies in the X entries that are corresponding to the maximum CQI indices and of the entries in which the modulation schemes are higher than 64QAM in the first CQI table are arranged approximately in an arithmetic progression in ascending order of spectrum efficiency, which may also be understood as: if an absolute value of a difference between any two adjacent values in $(t_1, t_2, \ldots, t_{X-1})$ is less than a preset value, each value in $(t_1, t_2, \ldots, t_{X-1})$ is approximately equal, and then, the spectrum efficiencies in the X entries that are corresponding to the maximum CQI indices and of the entries in which the modulation schemes are higher than 64QAM in the first CQI table are arranged approximately in an arithmetic progression in ascending order of spectrum efficiency, where the constant is referred to as a common difference of the approximate arithmetic progression.

Preferably, X=3.

Exemplarily, using X=3 as an example, 3 entries that are corresponding to the maximum CQI indices and of the entries in which the modulation schemes are higher than 64QAM in the first CQI table are shown in Table 4.

TABLE 4

| CQI index | Modulation | Code rate × 1024 | Efficiency |
|---|---|---|---|
| 13 | 256QAM | 778 | 6.0800 |
| 14 | 256QAM | 860 | 6.7200 |
| 15 | 256QAM | 942 | 7.3600 |

As shown in Table 4, spectrum efficiencies corresponding to entries with CQI indices 13 to 15 are 6.08, 6.72, and 7.36 respectively; starting from the second entry (that is, from the entry with the CQI index 14), a difference between a spectrum efficiency in each entry and a spectrum efficiency in a previous entry of the entry is equal to 0.64, and then, the spectrum efficiencies in the 3 entries that are corresponding to the maximum CQI indices and of the entries in which the modulation schemes are higher than 64QAM in the first CQI table are arranged in an arithmetic progression in ascending order of spectrum efficiency.

Exemplarily, using X=3 as an example, 3 entries that are corresponding to the maximum CQI indices and of the entries in which the modulation schemes are higher than 64QAM in the first COI table are shown in Table 5.

TABLE 5

| CQI index | Modulation | Code rate × 1024 | Efficiency |
|---|---|---|---|
| 13 | 256QAM | 778 | 6.0781 |
| 14 | 256QAM | 860 | 6.7188 |
| 15 | 256QAM | 942 | 7.3594 |

As shown in Table 5, spectrum efficiencies corresponding to the entries with the CQI indices 13 to 15 are 6.0781, 6.7188, and 7.3594 respectively; starting from the second entry (that is, from the entry with the CQI index 14), a difference between a spectrum efficiency in each entry and a spectrum efficiency in a previous entry of the entry is equal to 0.6407 and 0.6406 separately. Assuming that the preset value is 0.001, because an absolute value of a difference between 0.6407 and 0.6406 is equal to 0.0001, which is less than 0.001, 0.6407 is approximately equal to 0.6406, and then, the spectrum efficiencies in the 3 entries that are corresponding to the maximum CQI indices and of the entries in which the modulation schemes are higher than 64QAM in the first CQI table are arranged approximately in an arithmetic progression in ascending order of spectrum efficiency.

Alternatively, as shown in Table 5, spectrum efficiencies corresponding to the entries with the CQI indices 13 to 15 are 6.0781, 6.7188, and 7.3594 respectively; assuming that the preset value is 0.001, starting from the second entry (that is, from the entry with the CQI index 14), a difference between a spectrum efficiency in each entry and a spectrum efficiency in a previous entry is within a range from 0.64 minus 0.001 to 0.64 plus 0.001, and then, the spectrum efficiencies in the 3 entries that are corresponding to the maximum CQI indices and of the entries in which the modulation schemes are higher than 64QAM in the first CQI table are arranged approximately in an arithmetic progression in ascending order of spectrum efficiency.

Further, in the foregoing six types of first CQI tables, the entries in which the modulation schemes are higher than 64QAM in the first CQI table include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency.

That spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant.

That spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

That is, assuming that the spectrum efficiencies in the at least three entries in which the modulation schemes are 256QAM are $(m_1, m_2, \ldots, m_Y)$, where the subscript Y indicates spectrum efficiencies in Y entries in which modulation schemes are 256QAM, and $Y \geq 3$ starting from a second entry of the Y entries, a difference between a spectrum efficiency in each entry and a spectrum efficiency in a previous entry of the entry is calculated and denoted as $t_j$, where $1 \leq j \leq Y-1$, that is, $(t_1, t_2, \ldots, t_{Y-1})$, and $t_j = m_{j+1} - m_j$.

If all values in $(t_1, t_2, \ldots, t_{Y-1})$ are equal (are a constant), the spectrum efficiencies in the at least three entries in which the modulation schemes are 256QAM are arranged in an arithmetic progression in ascending order of spectrum efficiency, where the constant is referred to as a common difference of the arithmetic progression.

If there is a constant enabling all absolute values of differences between all the values in $(t_1, t_2, \ldots, t_{Y-1})$ and the constant to be within a preset value range, the spectrum efficiencies in the at least three entries in which the modulation schemes are 256QAM are arranged approximately in an arithmetic progression in ascending order of spectrum efficiency, which may also be understood as: if an absolute value of a difference between any two adjacent values in $(t_1, t_2, \ldots, t_{Y-1})$ is less than a preset value, each value in $(t_1, t_2, \ldots, t_{Y-1})$ is approximately equal, and then, the spectrum efficiencies in the at least three entries in which the modulation schemes are 256QAM of the entries in which the modulation schemes are higher than 64QAM in the first CQI table are arranged approximately in an arithmetic progression in ascending order of spectrum efficiency, where the constant is referred to as a common difference of the approximate arithmetic progression.

Exemplarily, the entries in which the modulation schemes are 256QAM of the entries in which the modulation schemes are higher than 64QAM in the first CQI table are shown in Table 6.

TABLE 6

| CQI index | Modulation | Code rate × 1024 | Efficiency |
|---|---|---|---|
| 12 | 256QAM | 696 | 5.4400 |
| 13 | 256QAM | 778 | 6.0800 |
| 14 | 256QAM | 860 | 6.7200 |
| 15 | 256QAM | 942 | 7.3600 |

As shown in Table 6, spectrum efficiencies corresponding to the entries in which the modulation schemes are 256QAM are 5.44, 6.08, 6.72, and 7.36; starting from the second entry (that is, from the entry with the CQI index 13), a difference between a spectrum efficiency in each entry and a spectrum efficiency in a previous entry of the entry is equal to 0.64, and then, the spectrum efficiencies corresponding to the entries in which the modulation schemes are 256QAM in Table 6 are arranged in an arithmetic progression in ascending order of spectrum efficiency.

Exemplarily, the entries in which the modulation schemes are 256QAM of the entries in which the modulation schemes are higher than 64QAM in the first CQI table are shown in Table 7.

TABLE 7

| CQI index | Modulation | Code rate × 1024 | Efficiency |
|---|---|---|---|
| 12 | 256QAM | 696 | 5.4375 |
| 13 | 256QAM | 778 | 6.0781 |
| 14 | 256QAM | 860 | 6.7188 |
| 15 | 256QAM | 942 | 7.3594 |

As shown in Table 7, spectrum efficiencies corresponding to the entries in which the modulation schemes are 256QAM are 5.4375, 6.0781, 6.7188, and 7.3594; starting from the second entry (that is, from the entry with the CQI index 13), a difference between a spectrum efficiency in each entry and a spectrum efficiency in a previous entry of the entry is equal to 0.6406, 0.6407, and 0.6406 separately. Assuming that the preset value is 0.001, because an absolute value of a difference between 0.6407 and 0.6406 is equal to 0.0001, which is less than 0.001, 0.6407 is approximately equal to 0.6406, and then, the spectrum efficiencies corresponding to the entries in which the modulation schemes are 256QAM in Table 7 are arranged approximately in an arithmetic progression in ascending order of spectrum efficiency.

Alternatively, as shown in Table 7, spectrum efficiencies corresponding to the entries in which the modulation schemes are 256QAM are 5.4375, 6.0781, 6.7188, and 7.3594; assuming that the preset value is 0.001, starting from the second entry (that is, from the entry with the CQI index 13), a difference between a spectrum efficiency in each entry and a spectrum efficiency in a previous entry is within a range from 0.64 minus 0.001 to 0.64 plus 0.001, and then, the spectrum efficiencies corresponding to the entries in which the modulation schemes are 256QAM in Table 7 are arranged approximately in an arithmetic progression in ascending order of spectrum efficiency.

Further, in the foregoing six types of first CQI tables, the first CQI table includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency.

Specifically, that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant.

That spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

That is, assuming that the spectrum efficiencies in the at least three entries in which the modulation schemes are higher than 64QAM are $(m_1, m_2, \ldots, m_Z)$, where the subscript Z indicates spectrum efficiencies in Z entries in which modulation schemes are higher than 64QAM, and Z≥3, starting from a second entry of the Z entries, a difference between a spectrum efficiency in each entry and a spectrum efficiency in a previous entry of the entry is calculated and denoted as $t_k$, where $1 \leq k \leq Z-1$, that is, $(t_1, t_2, \ldots, t_{Z-1})$, and $t_k = m_{k+1} - M_k$.

If all values in $(t_1, t_2, \ldots, t_{Z-1})$ are equal (are a constant), the spectrum efficiencies in the at least three entries in which the modulation schemes are higher than 64QAM are arranged in an arithmetic progression in ascending order of spectrum efficiency, where the constant is referred to as a common difference of the arithmetic progression.

If there is a constant enabling all absolute values of differences between all the values in $(t_1, t_2, \ldots, t_{Z-1})$ and the constant to be within a preset value range, the spectrum efficiencies in the at least three entries in which the modulation schemes are higher than 64QAM are arranged approximately in an arithmetic progression in ascending order of spectrum efficiency, which may also be understood as: if an absolute value of a difference between any two adjacent values in $(t_1, t_2, \ldots, t_{Z-1})$ is less than a preset value, each value in $(t_1, t_2, \ldots, t_{Z-1})$ is approximately equal, and then, the spectrum efficiencies in the at least three entries in which the modulation schemes are higher than 64QAM are arranged approximately in an arithmetic progression in ascending order of spectrum efficiency, where the constant is referred to as a common difference of the approximate arithmetic progression.

Exemplarily, entries in which modulation schemes are 256QAM of the entries in which the modulation schemes are higher than 64QAM in the first CQI table are shown in Table 8.

TABLE 8

| CQI index | Modulation | Code rate × 1024 | Efficiency |
|---|---|---|---|
| 12 | 256QAM | 696 | 5.4400 |
| 13 | 256QAM | 778 | 6.0800 |
| 14 | 256QAM | 860 | 6.7200 |
| 15 | 256QAM | 942 | 7.3600 |

As shown in Table 8, spectrum efficiencies corresponding to the entries in which the modulation schemes are higher than 64QAM are 5.44, 6.08, 6.72, and 7.36; starting from the second entry (that is, from the entry with the CQI index 13), a difference between a spectrum efficiency in each entry and a spectrum efficiency in a previous entry of the entry is equal to 0.64, and then, the spectrum efficiencies in the entries in which the modulation schemes are higher than 64QAM in Table 8 are arranged in an arithmetic progression in ascending order of spectrum efficiency.

Exemplarily, entries in which modulation schemes are 256QAM of the entries in which the modulation schemes are higher than 64QAM in the first CQI table are shown in Table 9.

TABLE 9

| CQI index | Modulation | Code rate × 1024 | Efficiency |
|---|---|---|---|
| 12 | 256QAM | 696 | 5.4375 |
| 13 | 256QAM | 778 | 6.0781 |
| 14 | 256QAM | 860 | 6.7188 |
| 15 | 256QAM | 942 | 7.3594 |

As shown in Table 9, spectrum efficiencies corresponding to the entries in which the modulation schemes are higher than 64QAM are 5.4375, 6.0781, 6.7188, and 7.3594; starting from the second entry (that is, from the entry with the CQI index 13), a difference between a spectrum efficiency in each entry and a spectrum efficiency in a previous entry of the entry is equal to 0.6406, 0.6407, and 0.6406 separately. Assuming that the preset value is 0.001, because an absolute value of a difference between 0.6407 and 0.6406 is equal to 0.0001, which is less than 0.001, 0.6407 is approximately equal to 0.6406, and then, the spectrum efficiencies corresponding to the entries in which the modulation schemes are higher than 64QAM in Table 9 are arranged approximately in an arithmetic progression in ascending order of spectrum efficiency.

Alternatively, as shown in Table 9, spectrum efficiencies corresponding to the entries in which the modulation schemes are higher than 64QAM are 5.4375, 6.0781, 6.7188, and 7.3594; assuming that the preset value is 0.001, starting from the second entry (that is, from the entry with the CQI index 13), a difference between a spectrum efficiency in each entry and a spectrum efficiency in a previous entry is within a range from 0.64 minus 0.001 to 0.64 plus 0.001, and then, the spectrum efficiencies corresponding to the entries in which the modulation schemes are higher than 64QAM in Table 9 are arranged approximately in an arithmetic progression in ascending order of spectrum efficiency.

Further, the common difference of the arithmetic progression or the common difference of the approximate arithmetic progression is less than or equal to a first threshold. The first threshold may be any preset threshold, or may be a minimum value of an absolute value of a difference between spectrum efficiencies in any two adjacent entries in which modulation schemes are lower than or equal to 64QAM in the first CQI table, or may be a minimum value of an absolute value of a difference between spectrum efficiencies in any two adjacent entries in which modulation schemes are the same and the modulation schemes are lower than or equal to 64QAM in the first CQI table, or may be a minimum value of an absolute value of a difference between spectrum efficiencies in any two adjacent entries in which modulation schemes are equal to 64QAM in the first CQI table, or may be a minimum value of an absolute value of a difference between spectrum efficiencies in any two adjacent entries in which modulation schemes are equal to 16QAM in the first CQI table, or may be a minimum value of an absolute value of a difference between spectrum efficiencies in any two adjacent entries in which modulation schemes are equal to QPSK in the first CQI table.

Exemplarily, the first CQI table in Table 3 is used as an example to obtain the following Table 10. A difference between spectrum efficiencies in adjacent entries in Table 10 is a difference between a spectrum efficiency in each entry and a spectrum efficiency in a previous entry of the entry starting from a second entry of modulation schemes with consecutive CQI indices (that is, from the entry with the CQI index 2 in the first CQI table).

As shown in Table 10, a minimum value of an absolute value of a difference between spectrum efficiencies corresponding to any two adjacent entries in which modulation schemes are 256QAM is 0.3594, and a minimum value of an absolute value of a difference between spectrum efficiencies corresponding to any two adjacent entries in which modulation schemes are QPSK or 16QAM or 64QAM is 0.4375; therefore, in Table 10, the minimum value of the absolute value of the difference between the spectrum efficiencies corresponding to the any two adjacent entries in which the modulation schemes are 256QAM is less than the minimum value of the absolute value of the difference between the spectrum efficiencies corresponding to the any two entries in which the modulation schemes are QPSK or 16QAM or 64QAM.

Further, in the foregoing six types of first CQI tables, an absolute value of a difference between spectrum efficiencies in any two adjacent entries of X entries that are corresponding to maximum CQI indices and of the entries in which the modulation schemes are higher than 64QAM in the first CQI table is less than or equal to a first threshold; or the entries in which the modulation schemes are higher than 64QAM in the first CQI table include: at least two entries in which modulation schemes are 256QAM, where an absolute value of a difference between spectrum efficiencies in any two adjacent entries of the at least two entries in which the modulation schemes are 256QAM is less than or equal to a first threshold; or the first CQI table includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

Preferably, X=3.

The first threshold may be any preset threshold, or may be a minimum value of an absolute value of a difference between spectrum efficiencies in any two adjacent entries in which modulation schemes are lower than or equal to 64QAM in the first CQI table, or may be a minimum value of an absolute value of a difference between spectrum efficiencies in any two adjacent entries in which modulation schemes are the same and the modulation schemes are lower than or equal to 64QAM in the first CQI table, or may be a minimum value of an absolute value of a difference between

TABLE 10

| CQI index in the first CQI table | CQI index in the second CQI table | Modulation | Code rate × 1024 | Efficiency | Difference between spectrum efficiencies in adjacent entries |
| --- | --- | --- | --- | --- | --- |
| 0 | 0 | Out of range | | | |
| 1 | 2 | QPSK | 120 | 0.2344 | — |
| 2 | 5 | QPSK | 449 | 0.877 | 0.6426 |
| 3 | 7 | 16QAM | 378 | 1.4766 | 0.5996 |
| 4 | 8 | 16QAM | 490 | 1.9141 | 0.4375 |
| 5 | 9 | 16QAM | 616 | 2.4063 | 0.4922 |
| 6 | 11 | 64QAM | 567 | 3.3223 | 0.916 |
| 7 | 12 | 64QAM | 666 | 3.9023 | 0.58 |
| 8 | 13 | 64QAM | 772 | 4.5234 | 0.6211 |
| 9 | 14 | 64QAM | 873 | 5.1152 | 0.5918 |
| 10 | 15 | 256QAM | 711 | 5.5547 | 0.4395 |
| 11 | — | 256QAM | 757 | 5.9141 | 0.3594 |
| 12 | — | 256QAM | 803 | 6.2734 | 0.3594 |
| 13 | — | 256QAM | 849 | 6.6328 | 0.3594 |
| 14 | — | 256QAM | 895 | 6.9922 | 0.3594 |
| 15 | — | 256QAM | 941 | 7.3516 | 0.3594 | spectrum efficiencies in any two adjacent entries in which modulation schemes are equal to 64QAM in the first CQI table, or may be a minimum value of an absolute value of a difference between spectrum efficiencies in any two adjacent entries in which modulation schemes are equal to 16QAM in the first CQI table, or may be a minimum value of an absolute value of a difference between spectrum efficiencies in any two adjacent entries in which modulation schemes are equal to QPSK in the first CQI table.

Exemplarily, the first CQI table in Table 3 is used as an example to obtain the following Table 11. A difference between spectrum efficiencies in adjacent entries in Table 11 is a difference between a spectrum efficiency in each entry and a spectrum efficiency in a previous entry of the entry starting from a second entry of modulation schemes with consecutive CQI indices (that is, from the entry with the CQI index 2 in the first CQI table).

TABLE 11

| CQI index in the first CQI table | CQI index in the second CQI table | Modulation | Code rate × 1024 | Efficiency | Difference between spectrum efficiencies in adjacent entries |
|---|---|---|---|---|---|
| 0 | 0 | Out of range | | | |
| 1 | 2 | QPSK | 120 | 0.2344 | — |
| 2 | 5 | QPSK | 449 | 0.877 | 0.6426 |
| 3 | 7 | 16QAM | 378 | 1.4766 | 0.5996 |
| 4 | 8 | 16QAM | 490 | 1.9141 | 0.4375 |
| 5 | 9 | 16QAM | 616 | 2.4063 | 0.4922 |
| 6 | 11 | 64QAM | 567 | 3.3223 | 0.916 |
| 7 | 12 | 64QAM | 666 | 3.9023 | 0.58 |
| 8 | 13 | 64QAM | 772 | 4.5234 | 0.6211 |
| 9 | 14 | 64QAM | 873 | 5.1152 | 0.5918 |
| 10 | 15 | 256QAM | 711 | 5.5547 | 0.4395 |
| 11 | | 256QAM | 757 | 5.9141 | 0.3594 |
| 12 | | 256QAM | 803 | 6.2734 | 0.3594 |
| 13 | — | 256QAM | 849 | 6.6328 | 0.3594 |
| 14 | — | 256QAM | 895 | 6.9922 | 0.3594 |
| 15 | — | 256QAM | 941 | 7.3516 | 0.3594 |

As shown in Table 11, a minimum value of an absolute value of a difference between spectrum efficiencies corresponding to any two adjacent entries in which modulation schemes are 256QAM is 0.3594, and a minimum value of an absolute value of a difference between spectrum efficiencies corresponding to any two adjacent entries in which modulation schemes are QPSK or 16QAM or 64QAM is 0.4375; therefore, in Table 11, the minimum value of the absolute value of the difference between the spectrum efficiencies corresponding to the any two adjacent entries in which the modulation schemes are 256QAM is less than the minimum value of the absolute value of the difference between the spectrum efficiencies corresponding to the any two adjacent entries in which the modulation schemes are QPSK or 16QAM or 64QAM.

Further, it should be noted that the first CQI table is used for describing a mapping relationship between a CQI index and an entry. In this embodiment of the present invention, the mapping relationship in the first CQI table is merely an example given for the convenience of understanding the present invention, and a representation form of the first CQI table in the present invention includes, but is not limited to, the example. That is, the first CQI table may have multiple combinations, and the combinations shall fall within the protection scope of the present invention as long as a mapping relationship between a first CQI index and an entry can be reflected.

S102: The UE sends the first CQI index to a base station.

The present invention provides a notification method for a channel quality indicator and a modulation and coding scheme, which supports UE in selecting a modulation scheme higher than 64QAM and notifying a base station by using a method of sending a CQI index, and meanwhile supports the base station in selecting a modulation scheme higher than 64QAM and notifying the UE by using a method of sending an MCS index, thereby improving system performance. Further, using the modulation scheme higher than 64QAM can provide higher quantization accuracy for an area with a high signal-to-noise ratio, thereby improving the system performance.

The following describes in detail a notification method for an MCS provided by an embodiment of the present invention with reference to the accompanying drawings.

Figure 2:
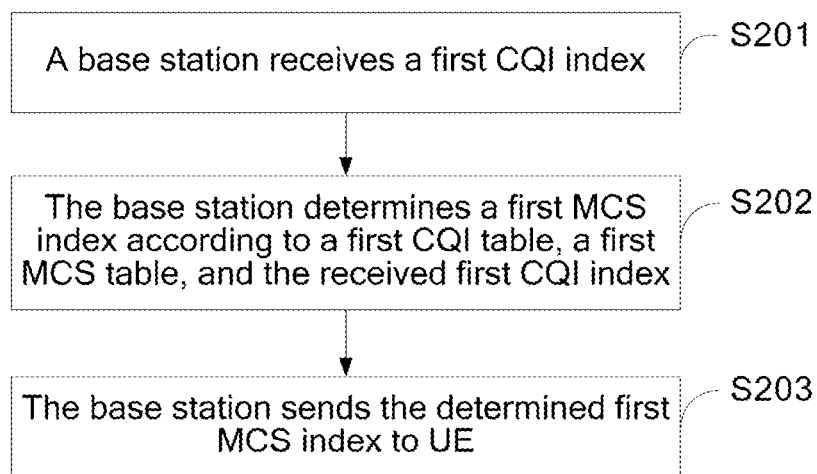
FIG. 2 is a schematic diagram of a notification method for an MCS according to an embodiment of the present invention.

As shown in FIG. 2, steps of the notification method for an MCS are as follows:

S201: A base station receives a first CQI index.

The first CQI index is determined by UE according to an acquired first CQI table. The first CQI table in this embodiment may be any one of the foregoing first CQI tables in the foregoing embodiment, and details are not described herein again.

S202: The base station determines a first MCS index according to a first CQI table, a first MCS table, and the received first CQI index.

The first CQI table may be predefined in a protocol, for example, preset by the UE according to protocol specifications, or pre-stored by the UE; or may be selected by the UE from at least two predefined tables according to a downlink channel state; or may be notified by the base station to the UE, and specifically, a method for notifying the UE by the base station may be that the base station selects one of at least two predefined tables according to an uplink channel state or a downlink channel state, and notifies the UE of the table. A CQI table is used for describing a mapping relationship between a CQI index and an entry. In this embodiment of the present invention, the mapping relationship in the CQI table is merely an example given for the convenience of understanding the present invention, and a representation form of the CQI table in the present invention includes, but is not limited to, the example. That is, the CQI table may have multiple combinations, and the combinations shall fall within the protection scope of the present invention as long as a mapping relationship between a CQI index and an entry can be reflected.

The first MCS table may be predefined in a protocol, for example, preset by the UE according to protocol specifications, or pre-stored by the UE; or may be selected by the UE from at least two predefined tables according to a downlink channel state; or may be notified by the base station to the UE, and specifically, a method for notifying the UE by the base station may be that the base station selects one of at least two predefined tables according to an uplink channel state or a downlink channel state, and notifies the UE of the table. An MCS table is used for describing a mapping relationship between an MCS index and an entry. In this embodiment of the present invention, the mapping relationship in the MCS table is merely an example given for the convenience of understanding the present invention, and a representation form of the MCS table in the present invention includes, but is not limited to, the example. That is, the MCS table may have multiple combinations, and the combinations shall fall within the protection scope of the present invention as long as a mapping relationship between an MCS index and an entry can be reflected.

The first CQI table may include:
entries in which modulation schemes are higher than 64QAM; and
at least one entry in which a modulation scheme is QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where
modulation schemes in the second CQI table include only QPSK, 16QAM, and 64QAM.

That is, the first CQI table includes the entries in which the modulation schemes are higher than 64QAM; the first CQI table further includes the at least one entry in which the modulation scheme is QPSK in the second CQI table, and entries in which modulation schemes are QPSK in the first CQI table cannot only be the N entries that are corresponding to the consecutive maximum CQI indices and of the entries in which the modulation schemes are QPSK in the second CQI table, where N is equal to 3 or Nis a positive integer less than 4 or N is a positive integer; and/or the first CQI table further includes the at least one entry in which the modulation scheme is 16QAM in the second CQI table, where modulation schemes in entries in the second CQI table include only QPSK, 16QAM, and 64QAM. An entry in the first CQI table refers to one modulation scheme, one code rate, and one spectrum efficiency that correspond to each CQI index in the first CQI table; an entry in the second CQI table refers to one modulation scheme, one code rate, and one spectrum efficiency that correspond to each CQI index in the second CQI table.

The first MCS table may include:
entries in which modulation schemes are higher than 64QAM; and
at least one entry in which a modulation scheme is QPSK in a second MCS table, where the at least one entry in which the modulation scheme is QPSK includes a combination except a second combination of combinations formed by the at least one entry in which the modulation scheme is QPSK in the second MCS table, and the second combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where
modulation schemes in the second MCS table include only QPSK, 16QAM, and 64QAM.

That is, the first MCS table further includes the at least one entry in which the modulation scheme is QPSK in the second MCS table; entries in which modulation schemes are QPSK in the first MCS table cannot only be the K entries that are corresponding to the consecutive maximum MCS indices and of the entries in which the modulation schemes are QPSK in the second MCS table indices, where K is equal to 4 or K is a positive integer less than 5 or K is a positive integer; and/or the first MCS table further includes the at least one entry in which the modulation scheme is 16QAM in the second MCS table, where modulation schemes in entries in the second MCS table include only QPSK, 16QAM, and 64QAM. An entry in the first MCS table refers to one modulation scheme and one TBS index that correspond to each MCS index in the first MCS table, and an entry in the second MCS table refers to one modulation scheme and one TBS index that correspond to each MCS index in the second MCS table.

The combination is a combination formed by the at least one entry in which the modulation scheme is QPSK in the second MCS table. Using a second MCS table shown in Table 14 as an example, there are in total 210−1=1023 combinations formed by at least one entry in which a modulation scheme is QPSK in the second MCS table. For example, the combination may be a combination formed by an entry corresponding to a MCS index 6 in the second MCS table, may be a combination formed by entries corresponding to MCS indices 6, 7, 8, and 9 in the second MCS table, may be a combination formed by entries corresponding to MCS indices 3, 6, 7, 8, and 9 in the second MCS table, or the like.

Specifically, there may be three types of first MCS tables:
a first type of first MCS table: including only entries in which modulation schemes are QPSK and entries in which modulation schemes are higher than 64QAM;
a second type of first MCS table: including only entries in which modulation schemes are 16QAM and entries in which modulation schemes are higher than 64QAM; and
a third type of first MCS table: including only entries in which modulation schemes are QPSK, entries in which modulation schemes are 16QAM, and entries in which modulation schemes are higher than 64QAM.

There may be multiple types of first MCS tables in the present invention, and the foregoing three types of first MCS tables are merely examples given for ease of understanding the present invention, and the present invention includes, but is not limited to, the examples.

Specifically, the determining a first MCS index according to an acquired first CQI table, an acquired first MCS table, and the received first CQI index includes:

determining a first TBS index and the first MCS index according to an acquired first PRB quantity, the first CQI table, the first MCS table, and the received first CQI index.

The first PRB quantity is a PRB quantity allocated by the base station to the UE, or the first PRB quantity is a maximum integer less than or equal to a product of a PRB quantity allocated to the UE and a specific coefficient, where the specific coefficient is a pre-stored value or is a value notified by the base station to the UE.

Specifically, when a first modulation scheme is 256QAM and the PRB quantity allocated to the UE is less than or equal to a specific threshold Q, the first PRB quantity is a maximum integer not greater than a product of the PRB quantity allocated to the UE and a specific coefficient P. A product of P and Q is not greater than a maximum PRB quantity, and in an LTE system, the maximum PRB quantity is 110. Preferably, when Q=82, and P=1.33, where P×Q=109 06<110, if the PRB quantity allocated by the base station to the UE is 50, the first PRB quantity is a maximum integer less than or equal to 50*1.33=66.5, that is, the first PRB quantity is 66.

A first TBS table includes at least one PRB quantity corresponding to each TBS index and a transport block size corresponding to each PRB quantity, where the first TBS table is a TBS table corresponding to the first MCS table.

A value range of a TBS index in the first TBS table is 0 to A, where A is a positive integer less than or equal to 26; or a value range of a TBS index in the first TBS table is 0 to B, where B is a positive integer greater than or equal to 26; a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

Further specifically, the determining a first TBS index according to the first CQI table, a first PRB quantity, a first MCS table, and the received first CQI index includes:

first, determining, according to the received first CQI index and the first CQI table, a first modulation scheme and a first spectrum efficiency that correspond to the received first CQI index;

second, learning, according to the first PRB quantity and the first spectrum efficiency, a first transport block size transmitted to the UE; and then obtaining, according to the first TBS table, the first TBS index that corresponds to the first transport block size and the first PRB quantity in the first TBS table.

It should be noted that the first CQI table, the first MCS table, and the first TBS table may be pre-stored by the base station.

For the convenience of understanding, a TBS table in an existing protocol (that is, the second TBS table) is shown as follows:

TABLE 12

| Second TBS index | PRB quantity | | | | | | | | | |
|---|---|---|---|---|---|---|---|---|---|---|
| | 1 | 2 | 3 | 4 | ... | 106 | 107 | 108 | 109 | 110 |
| 0 | 16 | 32 | 56 | 88 | ... | 2984 | 2984 | 2984 | 2984 | 3112 |
| 1 | 24 | 56 | 88 | 144 | ... | 3880 | 3880 | 4008 | 4008 | 4008 |
| 2 | 32 | 72 | 144 | 176 | ... | 4776 | 4776 | 4776 | 4968 | 4968 |
| 3 | 40 | 104 | 176 | 208 | ... | 6200 | 6200 | 6200 | 6456 | 6456 |
| 4 | 56 | 120 | 208 | 256 | ... | 7480 | 7736 | 7736 | 7736 | 7992 |
| 5 | 72 | 144 | 224 | 328 | ... | 9528 | 9528 | 9528 | 9528 | 9528 |
| 6 | 328 | 176 | 256 | 392 | ... | 11064 | 11064 | 11448 | 11448 | 11448 |
| 7 | 104 | 224 | 328 | 472 | ... | 12960 | 12960 | 12960 | 13536 | 13536 |
| 8 | 120 | 256 | 392 | 536 | ... | 14688 | 15264 | 15264 | 15264 | 15264 |
| 9 | 136 | 296 | 456 | 616 | ... | 16992 | 16992 | 16992 | 16992 | 17568 |
| 10 | 144 | 328 | 504 | 680 | ... | 18336 | 19080 | 19080 | 19080 | 19080 |
| 11 | 176 | 376 | 584 | 776 | ... | 21384 | 21384 | 22152 | 22152 | 22152 |
| 12 | 208 | 440 | 680 | 904 | ... | 24496 | 24496 | 24496 | 24496 | 25456 |
| 13 | 224 | 488 | 744 | 1000 | ... | 27376 | 27376 | 27376 | 28336 | 28336 |
| 14 | 256 | 552 | 840 | 1128 | ... | 30576 | 30576 | 30576 | 31704 | 31704 |
| 15 | 280 | 600 | 904 | 1224 | ... | 32856 | 32856 | 32856 | 34008 | 34008 |
| 16 | 328 | 632 | 968 | 1288 | ... | 34008 | 35160 | 35160 | 35160 | 35160 |
| 17 | 336 | 696 | 1064 | 1416 | ... | 37888 | 39232 | 39232 | 39232 | 39232 |
| 18 | 376 | 776 | 1160 | 1544 | ... | 42368 | 42368 | 42368 | 43816 | 43816 |
| 19 | 408 | 840 | 1288 | 1736 | ... | 45352 | 46888 | 46888 | 46888 | 46888 |
| 20 | 440 | 904 | 1384 | 1864 | ... | 48936 | 48936 | 51024 | 51024 | 51024 |
| 21 | 488 | 1000 | 1480 | 1992 | ... | 52752 | 52752 | 55056 | 55056 | 55056 |
| 22 | 520 | 1064 | 1608 | 2152 | ... | 57336 | 57336 | 59256 | 59256 | 59256 |
| 23 | 552 | 1128 | 1736 | 2280 | ... | 61664 | 61664 | 61664 | 61664 | 63776 |
| 24 | 584 | 1192 | 1800 | 2408 | ... | 63776 | 66592 | 66592 | 66592 | 66592 |
| 25 | 616 | 1256 | 1864 | 2536 | ... | 66592 | 68808 | 68808 | 68808 | 71112 |
| 26 | 712 | 1480 | 2216 | 2984 | ... | 75376 | 75376 | 75376 | 75376 | 75376 |

Exemplarily, when B=32, a range of the first TBS index is 0 to 32 (as shown in Table 13) in the first TBS table, where xxx shown in Table 13 indicates a transport block size, and a specific value may be set according to a simulation result.

TABLE 13

| First TBS index | PRB quantity | | | | | | | | | |
|---|---|---|---|---|---|---|---|---|---|---|
| | 1 | 2 | 3 | 4 | ... | 106 | 107 | 108 | 109 | 110 |
| 0 | 16 | 32 | 56 | 88 | ... | 2984 | 2984 | 2984 | 2984 | 3112 |
| 1 | 24 | 56 | 88 | 144 | ... | 3880 | 3880 | 4008 | 4008 | 4008 |
| 2 | 32 | 72 | 144 | 176 | ... | 4776 | 4776 | 4776 | 4968 | 4968 |
| 3 | 40 | 104 | 176 | 208 | ... | 6200 | 6200 | 6200 | 6456 | 6456 |
| 4 | 56 | 120 | 208 | 256 | ... | 7480 | 7736 | 7736 | 7736 | 7992 |
| 5 | 72 | 144 | 224 | 328 | ... | 9528 | 9528 | 9528 | 9528 | 9528 |
| 6 | 328 | 176 | 256 | 392 | ... | 11064 | 11064 | 11448 | 11448 | 11448 |
| 7 | 104 | 224 | 328 | 472 | ... | 12960 | 12960 | 12960 | 13536 | 13536 |
| 8 | 120 | 256 | 392 | 536 | ... | 14688 | 15264 | 15264 | 15264 | 15264 |
| 9 | 136 | 296 | 456 | 616 | ... | 16992 | 16992 | 16992 | 16992 | 17568 |
| 10 | 144 | 328 | 504 | 680 | ... | 18336 | 19080 | 19080 | 19080 | 19080 |
| 11 | 176 | 376 | 584 | 776 | ... | 21384 | 21384 | 22152 | 22152 | 22152 |
| 12 | 208 | 440 | 680 | 904 | ... | 24496 | 24496 | 24496 | 24496 | 25456 |
| 13 | 224 | 488 | 744 | 1000 | ... | 27376 | 27376 | 27376 | 28336 | 28336 |
| 14 | 256 | 552 | 840 | 1128 | ... | 30576 | 30576 | 30576 | 31704 | 31704 |
| 15 | 280 | 600 | 904 | 1224 | ... | 32856 | 32856 | 32856 | 34008 | 34008 |
| 16 | 328 | 632 | 968 | 1288 | ... | 34008 | 35160 | 35160 | 35160 | 35160 |
| 17 | 336 | 696 | 1064 | 1416 | ... | 37888 | 39232 | 39232 | 39232 | 39232 |
| 18 | 376 | 776 | 1160 | 1544 | ... | 42368 | 42368 | 42368 | 43816 | 43816 |
| 19 | 408 | 840 | 1288 | 1736 | ... | 45352 | 46888 | 46888 | 46888 | 46888 |
| 20 | 440 | 904 | 1384 | 1864 | ... | 48936 | 48936 | 51024 | 51024 | 51024 |
| 21 | 488 | 1000 | 1480 | 1992 | ... | 52752 | 52752 | 55056 | 55056 | 55056 |
| 22 | 520 | 1064 | 1608 | 2152 | ... | 57336 | 57336 | 59256 | 59256 | 59256 |
| 23 | 552 | 1128 | 1736 | 2280 | ... | 61664 | 61664 | 61664 | 61664 | 63776 |
| 24 | 584 | 1192 | 1800 | 2408 | ... | 63776 | 66592 | 66592 | 66592 | 66592 |
| 25 | 616 | 1256 | 1864 | 2536 | ... | 66592 | 68808 | 68808 | 68808 | 71112 |
| 26 | 712 | 1480 | 2216 | 2984 | ... | 75376 | 75376 | 75376 | 75376 | 75376 |
| 27 | xxx | xxx | xxx | xxx | xxx | xxx | xxx | xxx | xxx | xxx |
| 28 | xxx | xxx | xxx | xxx | xxx | xxx | xxx | xxx | xxx | xxx |
| 29 | xxx | xxx | xxx | xxx | xxx | xxx | xxx | xxx | xxx | xxx |
| 30 | xxx | xxx | xxx | xxx | xxx | xxx | xxx | xxx | xxx | xxx |
| 31 | xxx | xxx | xxx | xxx | xxx | xxx | xxx | xxx | xxx | xxx |
| 32 | xxx | xxx | xxx | xxx | xxx | xxx | xxx | xxx | xxx | xxx |

Finally, the first MCS index corresponding to the first TBS index is learned according to the first MCS table, the first modulation scheme, and the first TBS index.

The first CQI table in this embodiment may be the same as the first CQI table in the foregoing embodiment, and details are not described herein again. The following describes the first MCS table in this embodiment in detail.

For the convenience of understanding, the following MCS table (that is, the second MCS table) is used an example for description.

TABLE 14

| MCS index in the second MCS table | Modulation order | TBS index in the second MCS table |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |

TABLE 14-continued

| MCS index in the second MCS table | Modulation order | TBS index in the second MCS table |
|---|---|---|
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

In Table 14, a modulation order corresponds to a modulation scheme. Exemplarily, if a modulation scheme is QPSK, a modulation order is 2; if a modulation scheme is 16QAM, a modulation order is 4; if a modulation scheme is 64QAM, a modulation order is 6; if a modulation scheme is 256QAM, a modulation order is 8.

In Table 14, entries with MCS indices 29, 30, and 31 are reserved entries.

It should be noted that, in order to reduce a change to the prior art in a specific implementation process, preferably, a range of an MCS index in the first MCS table and a range of an MCS index in the second MCS table may be the same, which is 0 to 31. Certainly, the range of an MCS index in the first MCS table may also be greater than the range of an MCS index in the second MCS table, and exemplarily, the range of an MCS index in the first MCS table is 0 to 40.

For the first type of first MCS table, the first type of first MCS table includes only the entries in which the modulation schemes are QPSK and the entries in which the modulation schemes are higher than 64QAM.

A quantity of entries in which the modulation schemes are higher than 64QAM and that are included in the first MCS table may be one or more, and each entry in which the modulation scheme is higher than 64QAM includes a modulation order and a first TBS index, and has a corresponding MCS index.

TABLE 15

| MCS index in the second MCS table | Modulation order | TBS index in the second MCS table |
|---|---|---|
| 21 | 8 | 26 |
| 22 | 8 | 27 |
| 23 | 8 | 28 |

The first MCS table further includes the at least one entry in which the modulation scheme is QPSK in the second MCS table, where the at least one entry in which the modulation scheme is QPSK includes the combination except the second combination of the combinations formed by the at least one entry in which the modulation scheme is QPSK in the second MCS table. That is, the first MCS table further includes the at least one entry in which the modulation scheme is QPSK in the second MCS table, and MCS indices, corresponding to the entries in which the modulation schemes are QPSK, in the first MCS table are not the K entries that are corresponding to the consecutive maximum MCS indices of the entries in which the modulation schemes are QPSK in the second MCS table, where K is 6. That is, some entries of 9 entries in which modulation schemes are QPSK and that correspond to indices 0 to 9 in the second MCS table (that is, in Table 14) are included, and the entries in which the modulation schemes are QPSK in the first MCS table are not 6 entries with consecutive maximum MCS indices of the entries in which the modulation schemes are QPSK in the second MCS table.

That is, the entries in which the modulation schemes are QPSK in the first MCS table cannot only be the entries corresponding to the MCS indices 4, 5, 6, 7, 8, and 9 in the second MCS table.

Alternatively, the first MCS table further includes the at least one entry in which the modulation scheme is QPSK in the second MCS table, where MCS indices, corresponding to the entries in which the modulation schemes are QPSK, in the second MCS table are not entries corresponding to K consecutive maximum MCS indices, where K is a positive integer. That is, some entries of 9 entries in which modulation schemes are QPSK and that correspond to MCS indices 0 to 9 in the second MCS table are included, and the entries in which the modulation schemes are QPSK in the first MCS table are not the K entries with the consecutive maximum MCS indices of the entries in which the modulation schemes are QPSK in the second MCS table, where specifically, a value range of K may be 1 to 8, that is:

the entries in which the modulation schemes are QPSK in the first MCS table cannot only be the entry corresponding to the MCS index 9 in the second MCS table; or the entries in which the modulation schemes are QPSK in the first MCS table cannot only be the entries corresponding to the MCS indices 8 and 9 in the second MCS table; or the entries in which the modulation schemes are QPSK in the first MCS table cannot only be the entries corresponding to the MCS indices 7, 8 and 9 in the second MCS table; or the entries in which the modulation schemes are QPSK in the first MCS table cannot only be the entries corresponding to the MCS indices 6, 7, 8 and 9 in the second MCS table; or the entries in which the modulation schemes are QPSK in the first MCS table cannot only be the entries corresponding to the MCS indices 5, 6, 7, 8 and 9 in the second MCS table; or the entries in which the modulation schemes are QPSK in the first MCS table cannot only be the entries corresponding to the MCS indices 4, 5, 6, 7, 8 and 9 in the second MCS table; or the entries in which the modulation schemes are QPSK in the first MCS table cannot only be the entries corresponding to the MCS indices 3, 4, 5, 6, 7, 8 and 9 in the second MCS table; or the entries in which the modulation schemes are QPSK in the first MCS table cannot only be the entries corresponding to the MCS indices 2, 3, 4, 5, 6, 7, 8, and 9 in the second MCS table.

Alternatively, the first MCS table includes some entries in which modulation schemes are QPSK in the second MCS table, where MCS indices corresponding to the some entries are at equal intervals.

Exemplarily, if the entries in which the modulation schemes are QPSK in the first MCS table include 3 entries in which modulation schemes are QPSK in the second MCS table, the entries in which the modulation schemes are QPSK in the first MCS table may include the entries corresponding to the MCS indices 0, 3, and 6 in the second MCS table, or the entries in which the modulation schemes are QPSK in the first MCS table may include the entries corresponding to the CQI indices 2, 5, and 8 in the second MCS table, or the entries in which the modulation schemes are QPSK in the first MCS table may include the entries corresponding to the CQI indices 3, 6, and 9 in the second MCS table, or the entries in which the modulation schemes are QPSK in the first MCS table may include the entries corresponding to the CQI indices 0, 4, and 8 in the second MCS table, or the entries in which the modulation schemes are QPSK in the first MCS table may include the entries corresponding to the CQI indices 1, 5, and 9 in the second MCS table;

if the entries in which the modulation schemes are QPSK in the first MCS table include 4 entries in which modulation schemes are QPSK in the second MCS table, the entries in which the modulation schemes are QPSK in the first MCS table may include the entries corresponding to the MCS indices 0, 3, 6, and 9 in the second MCS table; or if the entries in which the modulation schemes are QPSK in the first MCS table include 5 entries in which modulation schemes are QPSK in the second MCS table, the entries in which the modulation schemes are QPSK in the first MCS table may include the entries corresponding to the MCS indices 1, 3, 5, 7, and 9 in the second MCS table, or the entries in which the modulation schemes are QPSK in the first MCS table may include the entries corresponding to the MCS indices 0, 2, 4, 6, and 8 in the second MCS table.

Alternatively, the first MCS table includes some entries in which modulation schemes are QPSK in the second MCS table, where MCS indices corresponding to the some entries are not at equal intervals.

Exemplarily, the entries in which the modulation schemes are QPSK in the first MCS table include M entries in which modulation schemes are QPSK in the second MCS table, where a value of M may be 3, 4, 5, 6, 7, 8 or 9. If M=5, the entries in which the modulation schemes are QPSK in the first MCS table include 5 entries in which modulation schemes are QPSK in the MCS table, and in this case, the entries in which the modulation schemes are QPSK in the first MCS table may include the entries corresponding to the MCS indices 1, 4, 7, 8, and 9 in the second MCS table.

Alternatively, the first MCS table includes some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive. That is, the some entries in which the modulation schemes are QPSK in the second MCS table and that are included in the first MCS table do not include the entry with the maximum MCS index of all the entries in which the modulation schemes are QPSK in the second MCS table.

Exemplarily, the entries in which the modulation schemes are QPSK in the first MCS table include M entries in which modulation schemes are QPSK in the second MCS table, where a value of M may be 1, 2, 3, 4, 5, 6, 7, 8, or 9. If M=8, the entries in which the modulation schemes are QPSK in the first MCS table include 8 entries in which modulation schemes are QPSK in the second MCS table, and in this case, the entries in which the modulation schemes are QPSK in the first MCS table may include the entries corresponding to the MCS indices 0, 1, 2, 3, 4, 5, 6, and 8 in the second MCS table.

Alternatively, the first MCS table includes some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive. That is, the some entries in which the modulation schemes are QPSK in the second MCS table and that are included in the first MCS table do not include the entry with the maximum MCS index of all the entries in which the modulation schemes are QPSK in the second MCS table.

Exemplarily, the entries in which the modulation schemes are QPSK in the first MCS table include M entries in which modulation schemes are QPSK in the second MCS table, where a value of M may be 1, 2, 3, 4, 5, 6, 7, 8, or 9. If M=8, the entries in which the modulation schemes are QPSK in the first MCS table include 8 entries in which modulation schemes are QPSK in the second MCS table, and in this case, the entries in which the modulation schemes are QPSK in the first MCS table may include the entries corresponding to the MCS indices 0, 1, 2, 3, 4, 5, 6, and 7 in the second MCS table.

For the second type of first MCS table, the second type of first MCS table includes only the entries in which the modulation schemes are 16QAM and the entries in which the modulation schemes are higher than 64QAM.

A quantity of entries in which the modulation schemes are higher than 64QAM and that are included in the first MCS table may be one or more, and each entry in which the modulation scheme is higher than 64QAM includes a modulation order and a first TBS index, and has a corresponding MCS index.

The first MCS table further includes the at least one entry in which the modulation scheme is 16QAM in the second MCS table.

Specifically, the first MCS table further includes all entries in which modulation schemes are 16QAM in the second MCS table.

Exemplarily, the first MCS table further includes 6 entries in which corresponding modulation schemes are 16QAM and that correspond to MCS indices 10 to 16, of the entries in which the modulation schemes are 16QAM in the second MCS table.

Alternatively, the first MCS table further includes some entries in which modulation schemes are 16QAM in the second MCS table, where MCS indices corresponding to the some entries are at equal intervals.

Exemplarily, if the entries in which the modulation schemes are 16QAM in the first MCS table include 3 entries in which modulation schemes are 16QAM in the second MCS table, the entries in which the modulation schemes are 16QAM in the first MCS table may include entries corresponding to MCS indices 10, 13, and 16 in the second MCS table, or the entries in which the modulation schemes are 16QAM in the first MCS table may include entries corresponding to MCS indices 10, 12, and 14 in the second MCS table, or the entries in which the modulation schemes are 16QAM in the first MCS table may include entries corresponding to MCS indices 11, 13, and 15 in the second MCS table, or the entries in which the modulation schemes are 16QAM in the first MCS table may include entries corresponding to MCS indices 12, 14, and 16 in the second MCS table; or if the entries in which the modulation schemes are 16QAM in the first MCS table include 4 entries in which modulation schemes are 16QAM in the second MCS table, the entries in which the modulation schemes are 16QAM in the first MCS table may include entries corresponding to MCS indices 10, 12, 14, and 16 in the second MCS table.

Alternatively, the first MCS table further includes entries in which modulation schemes are 16QAM in the second MCS table, where MCS indices corresponding to the some entries are not at equal intervals.

Exemplarily, the entries in which the modulation schemes are 16QAM in the first MCS table include M entries in which modulation schemes are 16QAM in the second MCS table, where a value of M may be 3, 4, 5, and 6. If M=5, the some entries in which the modulation schemes are 16QAM in the first MCS table may include entries corresponding to MCS indices 10, 12, 14, 15, and 16 in the second MCS table.

Alternatively, the first MCS table further includes some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive. That is, the first MCS table further includes the some entries in which the modulation schemes are 16QAM in the second MCS table, where the MCS indices corresponding to the some entries are inconsecutive, and the some entries do not include the entry with the maximum MCS index of all the entries in which the modulation schemes are 16QAM in the second MCS table.

Exemplarily, the entries in which the modulation schemes are 16QAM in the first MCS table include M entries in which modulation schemes are 16QAM in the second MCS table, where a value of M may be 1, 2, 3, 4, 5, or 6. If M=5, the entries in which the modulation schemes are 16QAM in the first MCS table may include entries corresponding to MCS indices 10, 11, 12, 13, and 15 in the second MCS table.

Alternatively, the first MCS table further includes some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive. That is, the first MCS table further includes the some entries in which the modulation schemes are 16QAM in the second MCS table, and the some entries do not include the entry with the maximum MCS index of all the entries in which the modulation schemes are 16QAM in the second MCS table.

Exemplarily, the entries in which the modulation schemes are 16QAM in the first MCS table include M entries in which modulation schemes are 16QAM in the second MCS table, where a value of M may be 1, 2, 3, 4, 5, or 6. If M=6, the entries in which the modulation schemes are 16QAM in the first MCS table may include entries corresponding to MCS indices 10, 11, 12, 13, 14, and 15 in the second MCS table.

Alternatively, the first MCS table further includes some entries in which modulation schemes are 16QAM in the second MCS table, and at least one entry, except an entry with a maximum MCS index and an entry with a minimum MCS index, of all entries in which modulation schemes are 16QAM in the second MCS table. That is, the first MCS table further includes the some entries in which the modulation schemes are 16QAM in the second MCS table, and the some entries do not include the entry with the maximum MCS index and the entry with the minimum MCS index of all the entries in which the modulation schemes are 16QAM in the second MCS table.

Exemplarily, the entries in which the modulation schemes are 16QAM in the first MCS table include M entries in which modulation schemes are 16QAM in the second MCS table, where a value of M may be 1, 2, 3, 4, or 5. If M=5, the entries in which the modulation schemes are 16QAM in the first MCS table may include entries corresponding to MCS indices 11, 12, 13, 14, and 15 in the second MCS table; or
   if M=4, the entries in which the modulation schemes are 16QAM in the first MCS table may include entries corresponding to MCS indices 11, 12, 13, and 14 in the second MCS table, or the entries in which the modulation schemes are 16QAM in the first MCS table may include entries corresponding to MCS indices 11, 13, 14, and 15 in the second MCS table.

For the third type of first MCS table, based on the first type of first MCS table, entries in which modulation schemes are 16QAM are added to obtain the third type of first MCS table. The third type of first MCS table includes only the entries in which the modulation schemes are QPSK, the entries in which the modulation schemes are 16QAM, and the entries in which the modulation schemes are higher than 64QAM. Specifically, an entry in which a modulation scheme is 16QAM and that is included in the third type of first MCS table may be the same as an entry in which a modulation scheme in the modulation schemes included in the second type of first MCS table is 16QAM, reference may be made to description of an entry in which a modulation scheme is 16QAM in the second type of first MCS table, and details are not described herein again.

Further, the first MCS table further includes at least one entry in which a modulation scheme is 64QAM in the second MCS table.

That is, based on the first type of first MCS table, a table to which entries in which modulation schemes are 64QAM are added is a fourth type of first MCS table; in this case, the fourth type of first MCS table includes entries in which modulation schemes are QPSK, entries in which modulation schemes are higher than 64QAM, and entries in which modulation schemes are 16QAM.

Alternatively, based on the second type of first MCS table, a table to which entries in which modulation schemes are 64QAM are added is a fifth type of first MCS table; in this case, the fifth type of first MCS table includes entries in which modulation schemes are 16QAM, entries in which modulation schemes are higher than 64QAM, and entries in which modulation schemes are 64QAM.

Alternatively, based on the third type of first MCS table, a table to which entries in which modulation schemes are 64QAM are added is a sixth type of first MCS table; in this case, the sixth type of first MCS table includes entries in which modulation schemes are QPSK, entries in which modulation schemes are 16QAM, entries in which modulation schemes are higher than 64QAM, and entries in which modulation schemes are 64QAM.

The entries in which the modulation schemes are 64QAM in the fourth, fifth, and sixth types of first MCS tables are as follows:

Specifically, the first MCS table further includes all entries in which modulation schemes are 64QAM in the second MCS table.

Exemplarily, the first MCS table further includes 12 entries in which corresponding modulation schemes are 16QAM and that correspond to MCS indices 17 to 28, of the entries in which the modulation schemes are 16QAM in the second MCS table.

Alternatively, the first MCS table further includes some entries in which modulation schemes are 64QAM in the second MCS table, and at least one entry, except an entry with a minimum MCS index, of all entries in which modulation schemes are 64QAM in the second MCS table. That is, the some entries in which the modulation schemes are 64QAM in the second MCS table are included, and the some entries do not include the entry with the minimum MCS index of all the entries in which the modulation schemes are 64QAM in the second MCS table.

Exemplarily, the first MCS table further includes M entries in which modulation schemes are 64QAM in the second MCS table, where a value range of M is 1 to 11, and M is an integer. If M=5, the entries in which the modulation schemes are 64QAM in the first MCS table may include entries corresponding to MCS indices 18, 19, 20, 21, and 23 in the second MCS table, or the entries in which the modulation schemes are 64QAM in the first MCS table may include entries corresponding to MCS indices 18, 20, 21, 24, and 25 in the second MCS table; or
   if M=7, the entries in which the modulation schemes are 64QAM in the first MCS table may include entries corresponding to MCS indices 18, 19, 20, 21, 23, 25, and 26 in the second MCS table, or the entries in which the modulation schemes are 64QAM in the first MCS table may include entries corresponding to MCS indices 19, 20, 21, 24, 25, 27, and 28 in the second MCS table.

Further, in the foregoing six types of first MCS tables, a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

Exemplarily, assume that in the first MCS table, there are 5 entries in which modulation schemes are QPSK, and corresponding MCS indices are 0 to 4; there are 5 entries in which modulation schemes are 16QAM, and corresponding MCS indices are 5 to 9; there are 11 entries in which modulation schemes are 64QAM, and corresponding MCS indices are 10 to 20; and a range of an MCS index in the first MCS table is 0 to 31, where there are 7 entries (including 3 reserved entries, and MCS indices corresponding to the entries are 28, 29, 30, and 31) in which modulation schemes are higher than 64QAM in the first MCS table, corresponding MCS indices are 21 to 28, and an entry with a minimum index is 21. Then specifically, as shown in the following Table 16, a TBS index in an entry with the MCS index 21 in the first MCS table is 26, which is equal to a TBS index in an entry corresponding to the MCS index 28 in the second MCS table shown in Table 14.

TABLE 16

| MCS index in the first MCS table | MCS index in the second MCS table | Modulation order | TBS index in the first MCS table |
|---|---|---|---|
| 0 | 0 | 2 | 0 |
| 1 | 2 | 2 | 2 |
| 2 | 4 | 2 | 4 |
| 3 | 6 | 2 | 6 |
| 4 | 8 | 2 | 8 |
| 5 | 10 | 4 | 9 |
| 6 | 12 | 4 | 11 |
| 7 | 14 | 4 | 13 |
| 8 | 15 | 4 | 14 |
| 9 | 16 | 4 | 15 |
| 10 | 18 | 6 | 16 |
| 11 | 19 | 6 | 17 |
| 12 | 20 | 6 | 18 |
| 13 | 21 | 6 | 19 |
| 14 | 22 | 6 | 20 |
| 15 | 23 | 6 | 21 |
| 16 | 24 | 6 | 22 |
| 17 | 25 | 6 | 23 |
| 18 | 26 | 6 | 24 |
| 19 | 27 | 6 | 25 |
| 20 | 28 | 6 | 26 |
| 21 | — | 8 | 26 |
| 22 | — | 8 | 27 |
| 23 | — | 8 | 28 |
| 24 | — | 8 | 29 |
| 25 | — | 8 | 30 |
| 26 | — | 8 | 31 |
| 27 | — | 8 | 32 |
| 28 | 29 | 2 | Reserved |
| 29 | 30 | 4 | |
| 30 | 31 | 6 | |
| 31 | | 8 | |

As can be seen, the foregoing six types of first MCS tables all include an entry in which a modulation scheme is higher than 64QAM, so as to support the base station in selecting a modulation scheme higher than 64QAM and notifying the UE by using a method of sending an MCS index, thereby improving system performance. In addition, the sixth type of first MCS table that includes entries in which modulation schemes are QPSK, 16QAM, and 64QAM and entries in which modulation schemes are higher than 64QAM is a preferred first MCS table.

S203: The base station sends the determined first MCS index to UE.

The present invention provides a notification method for a channel quality indicator and a modulation and coding scheme, which supports UE in selecting a modulation scheme higher than 64QAM and notifying a base station by using a method of sending a CQI index, and meanwhile supports the base station in selecting a modulation scheme higher than 64QAM and notifying the UE by using a method of sending an MCS index, thereby improving system performance. Further, using the modulation scheme higher than 64QAM can provide higher quantization accuracy for an area with a high signal-to-noise ratio, thereby improving the system performance.

Figure 3:
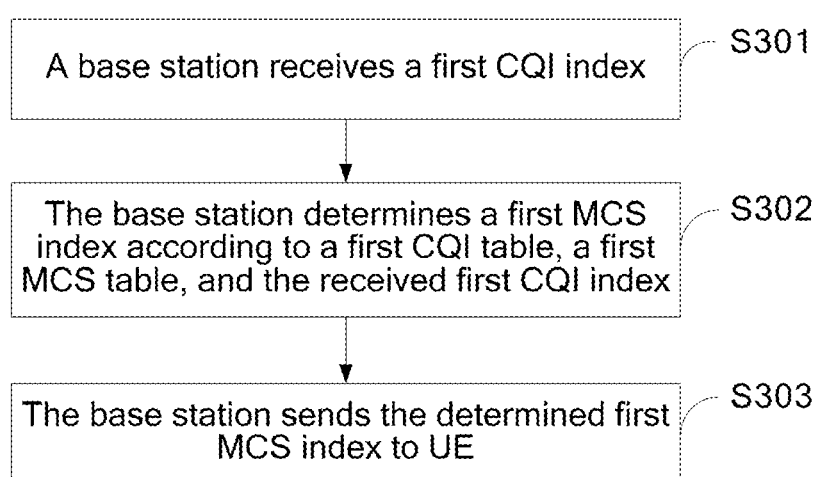
FIG. 3 is a schematic diagram of another notification method for an MCS according to an embodiment of the present invention.

As shown in FIG. 3, the present invention further provides another notification method for an MCS. The method includes the following steps:

A first CQI table in this embodiment may be the same as or may be different from any one of the first CQI tables in the foregoing embodiment; however, a common point of the two is that an entry in which a modulation scheme is higher than 64QAM is included. A first MCS table in this embodiment may be any one of the MCS tables in the foregoing embodiment.

The first CQI table may be predefined in a protocol, and preset by UE according to protocol specifications, or pre-stored by the UE; or may be selected by UE from at least two predefined tables according to a downlink channel state; or may be notified by a base station to UE, and specifically, a method for notifying the UE by the base station may be that the base station selects one of at least two predefined tables according to an uplink channel state or a downlink channel state, and notifies the UE of the table. A CQI table is used for describing a mapping relationship between a CQI index and an entry. In this embodiment of the present invention, the mapping relationship in the CQI table is merely an example given for the convenience of understanding the present invention, and a representation form of the CQI table in the present invention includes, but is not limited to, the example. That is, the CQI table may have multiple combinations, and the combinations shall fall within the protection scope of the present invention as long as a mapping relationship between a CQI index and an entry can be reflected.

The first MCS table may be predefined in a protocol, for example, preset by the UE according to protocol specifications, or pre-stored by the UE; or may be selected by the UE from at least two predefined tables according to a downlink channel state; or may be notified by the base station to the UE, and specifically, a method for notifying the UE by the base station may be that the base station selects one of at least two predefined tables according to an uplink channel state or a downlink channel state, and notifies the UE of the table. An MCS table is used for describing a mapping relationship between an MCS index and an entry. In this embodiment of the present invention, the mapping relationship in the MCS table is merely an example given for the convenience of understanding the present invention, and a representation form of the MCS table in the present invention includes, but is not limited to, the example. That is, the MCS table may have multiple combinations, and the combinations shall fall within the protection scope of the present invention as long as a mapping relationship between an MCS index and an entry can be reflected.

S301: A base station receives a first CQI index.

The first CQI index is determined by the base station according to an acquired first CQI table.

S302: The base station determines a first MCS index according to a first CQI table, a first MCS table, and the received first CQI index.

The first CQI table includes: entries in which modulation schemes are higher than 64QAM, where an entry in the first CQI table refers to one modulation scheme, one code rate, and one spectrum efficiency that correspond to each CQI index in the first CQI table.

The first MCS table includes:
entries in which modulation schemes are higher than 64QAM; and
at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where
modulation schemes in the second MCS table include only QPSK, 16QAM, and 64QAM.

That is, the first MCS table includes the entries in which the modulation schemes are higher than 64QAM; and the first MCS table further includes the at least one entry in which the modulation scheme is QPSK in the second MCS table, and MCS indices, corresponding to entries in which modulation schemes are QPSK, in the second MCS table cannot only be entries corresponding to K consecutive maximum MCS indices, where K is equal to 4 or K is a positive integer less than 5 or K is a positive integer; and/or the first MCS table further includes the at least one entry in which the modulation scheme is 16QAM in the second MCS table. Modulation schemes in entries in the second MCS table include only QPSK, 16QAM, and 64QAM. An entry in the first MCS table refers to one modulation scheme and one TBS index that correspond to each MCS index in the first MCS table, and an entry in the second MCS table refers to one modulation scheme and one TBS index that correspond to each MCS index in the second MCS table.

The combination is a combination formed by the at least one entry in which the modulation scheme is QPSK in the second MCS table. Using the second MCS table shown in Table 6 as an example, there are in total 210−1=1023 combinations formed by the at least one entry in which the modulation scheme is QPSK in the second MCS table. For example, the combination may be a combination formed by an entry corresponding to a CQI index 6 in the second MCS table, may be a combination formed by entries corresponding to MCS indices 6, 7, 8, and 9 in the second MCS table, may be a combination formed by entries corresponding to CQI indices 3, 6, 7, 8, and 9 in the second CQI table, or the like.

It should be noted that a method for determining, by the base station, a first MCS index according to the received first CQI index, a first CQI table, and a first MCS table is the same as the method described in the foregoing embodiment, and details are not described herein again.

In addition, the first MCS table in this embodiment may be any one of the six types of first MCS tables in the foregoing embodiment, and details are not described herein again.

S303: The base station sends the determined first MCS index to UE.

The present invention provides a notification method for a channel quality indicator and a modulation and coding scheme, which supports UE in selecting a modulation scheme higher than 64QAM and notifying a base station by using a method of sending a CQI index, and meanwhile supports the base station in selecting a modulation scheme higher than 64QAM and notifying the UE by using a method of sending an MCS index, thereby improving system performance. Further, using the modulation scheme higher than 64QAM can provide higher quantization accuracy for an area with a high signal-to-noise ratio, thereby improving the system performance.

Figure 4:
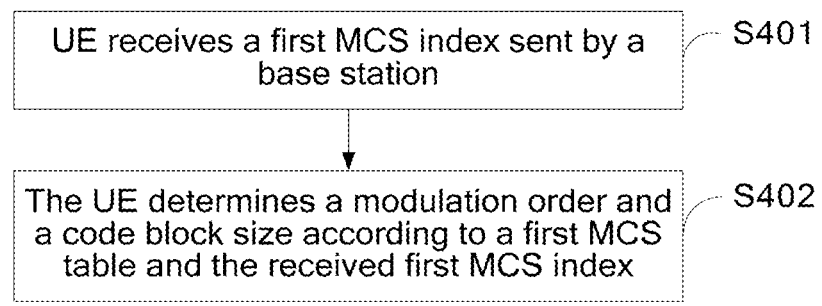
FIG. 4 is a schematic diagram of another notification method for an MCS according to an embodiment of the present invention.

As shown in FIG. 4, the present invention further provides another notification method for an MCS. A first MCS table in this embodiment may be any one of the first MCS tables in the foregoing embodiment.

In this embodiment, the first MCS table may be predefined in a protocol, and preset by UE according to protocol specifications, or pre-stored by UE; or may be selected by UE from at least two predefined tables according to a downlink channel state; or may be notified by a base station to UE, and specifically, a method for notifying the UE by the base station may be that the base station selects one of at least two predefined tables according to an uplink channel state or a downlink channel state, and notifies the UE of the table. An MCS table is used for describing a mapping relationship between an MCS index and an entry. In this embodiment of the present invention, the mapping relationship in the MCS table is merely an example given for the convenience of understanding the present invention, and a representation form of the MCS table in the present invention includes, but is not limited to, the example. That is, the MCS table may have multiple combinations, and the combinations shall fall within the protection scope of the present invention as long as a mapping relationship between an MCS index and an entry can be reflected.

The method includes the following steps:

S401: UE receives a first MCS index sent by a base station.

The first MCS index is determined by the base station according to an acquired first MCS table.

S402: The UE determines a modulation order and a code block size according to a first MCS table and the received first MCS index.

The first MCS table includes:
entries in which modulation schemes are higher than 64QAM; and
at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than S or K is a positive integer; and/or at least one entry in which a modulation scheme is 16QAM in the second MCS table, where
modulation schemes in the second MCS table include only QPSK, 16QAM, and 64QAM.

The first MCS table includes the entries in which the modulation schemes are higher than 64QAM; and the first MCS table further includes the at least one entry in which the modulation scheme is QPSK in the second MCS table, and MCS indices, corresponding to entries in which modulation schemes are QPSK, in the second MCS table cannot only be entries corresponding to K consecutive maximum MCS indices, where K is equal to 4 or K is a positive integer less than 5 or K is a positive integer; and/or the first MCS table further includes the at least one entry in which the modulation scheme is 16QAM in the second MCS table.

Modulation schemes in entries in the second MCS table include only QPSK, 16QAM, and 64QAM. An entry in the first MCS table refers to one modulation scheme and one TBS index that correspond to each MCS index in the first MCS table, and an entry in the second MCS table refers to one modulation scheme and one TBS index that correspond to each MCS index in the second MCS table.

The combination is a combination formed by the at least one entry in which the modulation scheme is QPSK in the second MCS table. Using the second MCS table shown in Table 6 as an example, there are in total $2^{10}-1=1023$ combinations formed by the at least one entry in which the modulation scheme is QPSK in the second MCS table. For example, the combination may be a combination formed by an entry corresponding to a CQI index 6 in the second MCS table, may be a combination formed by entries corresponding to MCS indices 6, 7, 8, and 9 in the second MCS table, may be a combination formed by entries corresponding to CQI indices 3, 6, 7, 8, and 9 in the second CQI table, or the like.

It should be noted that the first MCS table in this embodiment may be any one of the six types of first MCS tables in the foregoing embodiment, and details are not described herein again.

Specifically, the determining a modulation order and a code block size according to a first MCS table and the received first MCS index includes:

determining a first TBS index and the modulation order according to the first MCS table and the received first MCS index; and determining the code block size according to the first TBS index, a first PRB quantity, and a first TBS table.

The first PRB quantity is a PRB quantity allocated by the base station to the UE, or the first PRB quantity is a maximum integer less than or equal to a product of a PRB quantity allocated to the UE and a specific coefficient.

The first TBS table includes at least one PRB quantity corresponding to each TBS index and a transport block size corresponding to each PRB quantity, where the first TBS table is a TBS table corresponding to the first MCS table.

A value range of a TBS index in the first TBS table is 0 to A, where A is a positive integer less than or equal to 26; or a value range of a TBS index in the first TBS table is 0 to B, where B is a positive integer greater than or equal to 26, a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

Further, the UE receives a PDSCH according to the modulation order and the code block size.

The present invention provides a notification method for a channel quality indicator and a modulation and coding scheme, which supports UE in selecting a modulation scheme higher than 64QAM and notifying a base station by using a method of sending a CQI index, and meanwhile supports the base station in selecting a modulation scheme higher than 64QAM and notifying the UE by using a method of sending an MCS index, thereby improving system performance. Further, using the modulation scheme higher than 64QAM can provide higher quantization accuracy for an area with a high signal-to-noise ratio, thereby improving the system performance.

Figure 5:
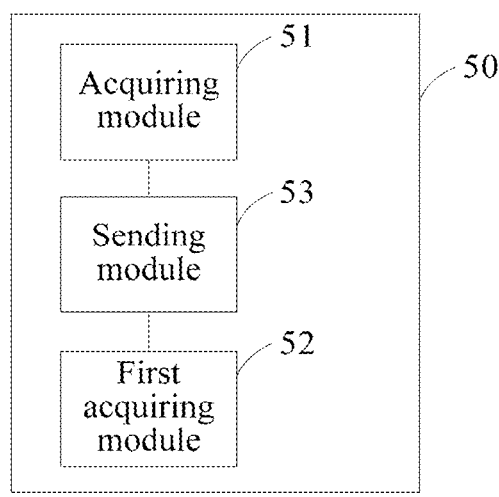
FIG. 5 is a schematic diagram of a notification apparatus for a CQI according to an embodiment of the present invention.

As shown in FIG. 5, an embodiment of the present invention provides a notification apparatus 50 for a CQI. The apparatus 50 includes:

an acquiring module 51, configured to acquire a first CQI table, where the first CQI table may be predefined by UE, or may be notified by a base station to UE, or is selected by UE from at least two predefined tables according to a downlink channel state, where specifically, a method for notifying the UE by the base station may be that the base station selects one of at least two predefined tables according to a uplink channel state or a downlink channel state, and reports the table to the UE; and the CQI table is used for describing a mapping relationship between a CQI index and an entry, that is, the mapping relationship is not limited to being indicated by using a table, and may be indicated by using an expression;

a first acquiring module 52, configured to learn a first CQI index according to the first CQI table acquired by the acquiring module 51; and a sending module 53, configured to send the first CQI index learned by the first acquiring module 52 to a base station, so that the base station determines a first modulation and coding scheme MCS index according to the first CQI index;

where the first CQI table acquired by the acquiring module 51 includes:

entries in which modulation schemes are higher than 64 quadrature amplitude modulation QAM; and at least one entry in which a modulation scheme is quadrature phase shift keying QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where modulation schemes in entries in the second CQI table include only QPSK, 16QAM, and 64QAM.

The at least one entry in which the modulation scheme is QPSK in the second CQI table in the first CQI table acquired by the acquiring module includes:

some entries in which modulation schemes are QPSK in the second CQI table, where CQI indices corresponding to the some entries are at equal intervals; or some entries in which modulation schemes are QPSK in the second CQI table, where CQI indices corresponding to the some entries are not at equal intervals; or some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

The at least one entry in which the modulation scheme is 16QAM in the second CQI table in the first CQI table acquired by the acquiring module includes:
  all entries in which modulation schemes are 16QAM in the second CQI table; or
  at least one entry, except an entry corresponding to a minimum CQI index, of all entries in which modulation schemes are 16QAM in the second CQI table.

Further, the first CQI table acquired by the acquiring module 51 further includes: at least one entry in which a modulation scheme is 64QAM in the second CQI table.

Specifically, the at least one entry in which the modulation scheme is 64QAM in the first CQI table acquired by the acquiring module includes:
  all entries in which modulation schemes are 64QAM in the second CQI table; or
  some entries in which modulation schemes are 64QAM in the second CQI table, and at least one entry, except an entry corresponding to a maximum CQI index, of all entries in which modulation schemes are 64QAM in the second CQI table.

Further, a spectrum efficiency in an entry that is corresponding to a minimum CQI index and of the entries in which the modulation schemes are higher than 64QAM in the first CQI table acquired by the acquiring module 51 is equal to a spectrum efficiency in an entry that is corresponding to a maximum CQI index and of all entries in which modulation schemes are 64QAM in the second CQI table.

Further, spectrum efficiencies in X entries that are corresponding to maximum CQI indices and of the entries in which the modulation schemes are higher than 64QAM in the first CQI table acquired by the acquiring module 51 are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

Further, the entries in which the modulation schemes are higher than 64QAM in the first CQI table acquired by the acquiring module 51 include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

Further, the first CQI table acquired by the acquiring module 51 includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

Further, the constant is less than or equal to a first threshold.

Further, an absolute value of a difference between spectrum efficiencies in any two adjacent entries of X entries that are corresponding to maximum CQI indices and of the entries in which the modulation schemes are higher than 64QAM in the first CQI table acquired by the acquiring module 51 is less than or equal to a first threshold; or
  the entries in which the modulation schemes are higher than 64QAM in the first CQI table acquired by the acquiring module include: at least two entries in which modulation schemes are 256QAM, where an absolute value of a difference between spectrum efficiencies in any two adjacent entries of the at least two entries in which the modulation schemes are 256QAM is less than or equal to a first threshold; or
  the first CQI table acquired by the acquiring module includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

Further, X=3.

Further, the first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

Further, a value range of a CQI index in the first CQI table acquired by the acquiring module 51 is the same as a value range of a CQI index in the second CQI table.

The notification apparatus for a CQI shown in FIG. 5 can perform corresponding steps in the foregoing method embodiments For details, reference may be made to descriptions of the foregoing method embodiments, and for effects achieved by the apparatus, reference may also be made to the descriptions of the foregoing method embodiments.

Figure 6:
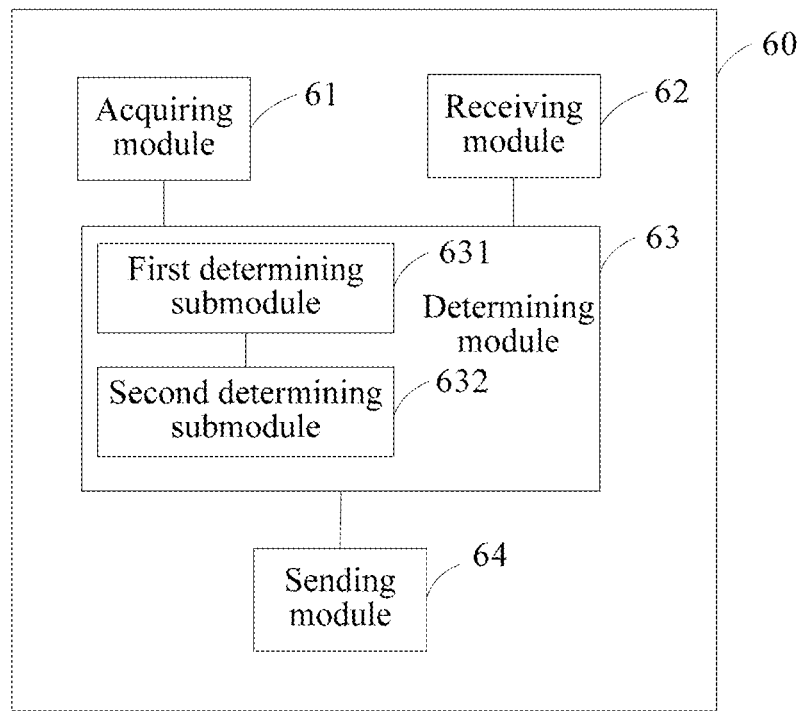
FIG. 6 is a schematic diagram of a notification apparatus for an MCS according to an embodiment of the present invention.

As shown in FIG. 6, an embodiment of the present invention further provides a notification apparatus 60 for an MCS. The apparatus 60 includes:

an acquiring module 61, configured to acquire a first CQI table and a first MCS table, where the first CQI table may be predefined in a protocol, and preset by UE according to protocol specifications, or pre-stored by UE, or may be selected by UE from at least two predefined tables according to a downlink channel state, or may be notified by a base station to UE, and specifically, a method for notifying the UE by the base station may be that the base station selects one of at least two predefined tables according to an uplink channel state or a downlink channel state, and notifies the UE of the table; a CQI table is used for describing a mapping relationship between a CQI index and an entry; in this embodiment of the present invention, the mapping relationship in the CQI table is merely an example given for the convenience of understanding the present invention; a representation form of the CQI table in the present invention includes, but is not limited to, the example, that is, the CQI table may have multiple combinations, and the combinations shall fall within the protection scope of the present invention as long as a mapping relationship between a CQI index and an entry can be reflected; and the first MCS table may be predefined in a protocol, for example preset by the UE according to protocol specifications, or pre-stored by the UE, or may be selected by the UE from at least two predefined tables according to a downlink channel state, or may be notified by the base station to the UE, and specifically, a method for notifying the UE by the base station may be that the base station selects one of at least two predefined tables according to an uplink channel state or a downlink channel state, and notifies the UE of the table; an MCS table is used for describing a mapping relationship between an MCS index and an entry; in this embodiment of the present invention, the mapping relationship in the MCS table is merely an example given for the convenience of understanding the present invention; a representation form of the MCS table in the present invention includes, but is not limited to, the example, that is, the MCS table may have multiple combinations, and the combinations shall fall within the protection scope of the present invention as long as a mapping relationship between an MCS index and an entry can be reflected;

a receiving module 62, configured to receive a first CQI index sent by the terminal UE, where the first CQI index is determined by the UE according to the first CQI table;

a determining module 63, configured to determine a first MCS index according to the first CQI table acquired by the acquiring module 61, the first MCS table acquired by the acquiring module 61, and the first CQI index received by the receiving module 62; and a sending module 64, configured to send the determined first MCS index to the UE;

where the first CQI table acquired by the acquiring module 61 includes:

entries in which modulation schemes are higher than 64QAM; and at least one entry in which a modulation scheme is QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where modulation schemes in the second CQI table include only QPSK, 16QAM, and 64QAM.

The first MCS table acquired by the acquiring module 61 includes:

entries in which modulation schemes are higher than 64QAM; and at least one entry in which a modulation scheme is QPSK in a second MCS table, where the at least one entry in which the modulation scheme is QPSK includes a combination except a second combination of combinations formed by the at least one entry in which the modulation scheme is QPSK in the second MCS table, and the second combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where modulation schemes in the second MCS table include only QPSK, 16QAM, and 64QAM.

The determining module 63 is specifically configured to:

determine a first TBS index and the first MCS index according to a first PRB quantity acquired by the acquiring module 61, the first CQI table acquired by the acquiring module 61, the first MCS table acquired by the acquiring module 61, and the received first CQI index, where:

the first PRB quantity is a PRB quantity allocated by the base station to the UE, or the first PRB quantity is a maximum integer less than or equal to a product of a PRB quantity allocated to the UE and a specific coefficient;

a first TBS table includes at least one PRB quantity corresponding to each TBS index and a transport block size corresponding to each PRB quantity, where the first TBS table is a TBS table corresponding to the first MCS table; and a value range of a TBS index in the first TBS table is 0 to A, where A is a positive integer less than or equal to 26, or a value range of a TBS index in the first TBS table is 0 to B, where B is a positive integer greater than or equal to 26; a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

The determining module 63 includes:

a first determining submodule 631, configured to determine, according to the first CQI table acquired by the acquiring module 61 and the first CQI index received by the receiving module, a first modulation scheme and a first spectrum efficiency that correspond to the received first CQI index; and a second determining submodule 632, configured to learn, according to the acquired first PRB quantity and the first spectrum efficiency determined by the first determining submodule, a first transport block size transmitted to the UE; and obtain, according to the first TBS table, the first TBS index that corresponds to the first transport block size determined by the second determining submodule and the first PRB quantity in the first TBS table.

The at least one entry in which the modulation scheme is QPSK in the second CQI table in the first CQI table acquired by the acquiring module 61 includes:

some entries in which modulation schemes are QPSK in the second CQI table, where CQI indices corresponding to the some entries are at equal intervals; or some entries in which modulation schemes are QPSK in the second CQI table, where CQI indices corresponding to the some entries are not at equal intervals; or some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

The at least one entry in which the modulation scheme is 16QAM in the second CQI table in the first CQI table acquired by the acquiring module 61 includes:

all entries in which modulation schemes are 16QAM in the second CQI table; or at least one entry, except an entry corresponding to a minimum CQI index, of all entries in which modulation schemes are 16QAM in the second CQI table.

Further, the first CQI table acquired by the acquiring module 61 may further include:

at least one entry in which a modulation scheme is 64QAM in the second CQI table.

Specifically, the at least one entry in which the modulation scheme is 64QAM in the second CQI table in the first CQI table acquired by the acquiring module 61 includes:

all entries in which modulation schemes are 64QAM in the second CQI table; or some entries in which modulation schemes are 64QAM in the second CQI table, and at least one entry, except an entry corresponding to a maximum CQI index, of all entries in which modulation schemes are 64QAM in the second CQI table.

Further, a spectrum efficiency in an entry that is corresponding to a minimum CQI index and of the entries in which the modulation schemes are higher than 64QAM in the first CQI table acquired by the acquiring module 61 is equal to a spectrum efficiency in an entry that is corresponding to a maximum CQI index and of all entries in which modulation schemes are 64QAM in the second CQI table.

Further, spectrum efficiencies in X entries that are corresponding to maximum CQI indices and of the entries in which the modulation schemes are higher than 64QAM in the first CQI table acquired by the acquiring module 61 are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

Further, the entries in which the modulation schemes are higher than 64QAM in the first CQI table acquired by the acquiring module 61 include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

Further, the first CQI table acquired by the acquiring module 61 includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

Further, the constant is less than or equal to a first threshold.

Further, an absolute value of a difference between spectrum efficiencies in any two adjacent entries of X entries that are corresponding to maximum CQI indices and of the entries in which the modulation schemes are higher than 64QAM in the first CQI table acquired by
  the acquiring module 61 is less than or equal to a first threshold; or the entries in which the modulation schemes are higher than 64QAM in the first CQI table acquired by the acquiring module 61 include: at least two entries in which modulation schemes are 256QAM, where an absolute value of a difference between spectrum efficiencies in any two adjacent entries of the at least two entries in which the modulation schemes are 256QAM is less than or equal to a first threshold; or
  the first CQI table acquired by the acquiring module 61 includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

Further, X=3.

Further, the first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

Further, a value range of a CQI index in the first CQI table acquired by the acquiring module 61 is the same as a value range of a CQI index in the second CQI table.

The at least one entry in which the modulation scheme is QPSK in the second MCS table in the first CQI table acquired by the acquiring module 61 includes:
  some entries in which modulation schemes are QPSK in the second MCS table, where MCS indices corresponding to the some entries are at equal intervals; or
  some entries in which modulation schemes are QPSK in the second MCS table, where MCS indices corresponding to the some entries are not at equal intervals; or
  some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or
  some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

The at least one entry in which the modulation scheme is 16QAM in the second MCS table in the first CQI table acquired by the acquiring module 61 includes:
  all entries in which modulation schemes are 16QAM in the second MCS table; or
  some entries in which modulation schemes are 16QAM in the second MCS table, where MCS indices corresponding to the some entries are at equal intervals; or
  some entries in which modulation schemes are 16QAM in the second MCS table, where MCS indices corresponding to the some entries are not at equal intervals; or
  some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or
  some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive, or
  some entries in which modulation schemes are 16QAM in the second MCS table, and at least one entry, except an entry with a maximum MCS index and an entry with a minimum MCS index, of all entries in which modulation schemes are 16QAM in the second MCS table.

Further, the first MCS table acquired by the acquiring module 61 further includes: at least one entry in which a modulation scheme is 64QAM in the second MCS table.

Specifically, the at least one entry in which the modulation scheme is 64QAM in the second MCS table in the first CQI table acquired by the acquiring module 61 includes:

all entries in which modulation schemes are 64QAM in the second MCS table, or some entries in which modulation schemes are 64QAM in the second MCS table, and at least one entry, except an entry with a minimum MCS index, of all entries in which modulation schemes are 64QAM in the second MCS table.

Further, the at least one entry in which the modulation scheme is 64QAM in the second MCS table includes: a TBS index in an entry that is corresponding to a minimum MCS index and of all entries in which modulation schemes are higher than 64QAM in the first MCS table acquired by the acquiring module 61 is the same as a TBS index in an entry with a maximum MCS index of all the entries in which the modulation schemes are 64QAM in the second MCS table.

Further, a value range of an MCS index in the first MCS table acquired by the acquiring module 61 is the same as a value range of an MCS index in the second MCS table.

The notification apparatus for an MCS shown in FIG. 6 can perform corresponding steps in the foregoing method embodiments. For details, reference may be made to descriptions of the foregoing method embodiments, and for effects achieved by the apparatus, reference may also be made to the descriptions of the foregoing method embodiments.

Figure 7:
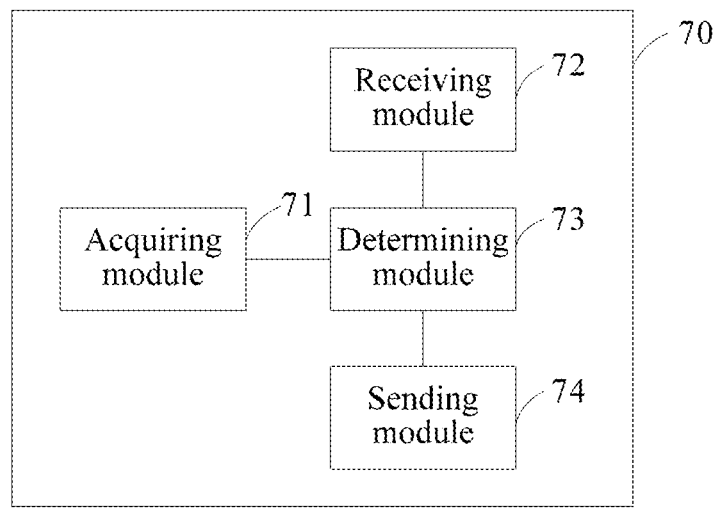
FIG. 7 is a schematic diagram of another notification apparatus for an MCS according to an embodiment of the present invention.

As shown in FIG. 7, an embodiment of the present invention further provides a notification apparatus 70 for an MCS. The apparatus 70 includes:

an acquiring module 71, configured to acquire a first CQI table and a first MCS table, where the first CQI table may be predefined in a protocol, and preset by UE according to protocol specifications, or pre-stored by UE, or may be selected by UE from at least two predefined tables according to a downlink channel state, or may be notified by a base station to UE, and specifically, a method for notifying the UE by the base station may be that the base station selects one of at least two predefined tables according to an uplink channel state or a downlink channel state, and notifies the UE of the table; a CQI table is used for describing a mapping relationship between a CQI index and an entry; in this embodiment of the present invention, the mapping relationship in the CQI table is merely an example given for the convenience of understanding the present invention; a representation form of the CQI table in the present invention includes, but is not limited to, the example, that is, the CQI table may have multiple combinations, and the combinations shall fall within the protection scope of the present invention as long as a mapping relationship between a CQI index and an entry can be reflected; and the first MCS table may be predefined in a protocol, for example, preset by the UE according to protocol specifications, or pre-stored by the UE, or may be selected by the UE from at least two predefined tables according to a downlink channel state, or may be notified by the base station to the UE, and specifically, a method for notifying the UE by the base station may be that the base station selects one of at least two predefined tables according to an uplink channel state or a downlink channel state, and notifies the UE of the table; an MCS table is used for describing a mapping relationship between an MCS index and an entry; in this embodiment of the present invention, the mapping relationship in the MCS table is merely an example given for the convenience of understanding the present invention, a representation form of the MCS table in the present invention includes, but is not limited to, the example, that is, the MCS table may have multiple combinations, and the combinations shall fall within the protection scope of the present invention as long as a mapping relationship between an MCS index and an entry can be reflected;

a receiving module 72, configured to receive, by the base station, a first CQI index, where the first CQI index is determined by the UE according to the first CQI table;

a determining module 73, configured to determine a first MCS index according to the first CQI table acquired by the acquiring module 71, the first MCS table acquired by the acquiring module 71, and the first CQI index received by the receiving module 72, and a sending module 74, configured to send the first MCS index determined by the determining module 73 to the UE;

where the first CQI table acquired by the acquiring module 71 includes: entries in which modulation schemes are higher than 64QAM, where an entry in the first CQI table refers to one modulation scheme, one code rate, and one spectrum efficiency that correspond to each CQI index in the first CQI table; and the first MCS table acquired by the acquiring module 71 includes:

entries in which modulation schemes are higher than 64QAM; and at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where modulation schemes in the second MCS table include only QPSK, 16QAM, and 64QAM.

The at least one entry in which the modulation scheme is QPSK in the second MCS table in the first MCS table acquired by the acquiring module 71 includes:

some entries in which modulation schemes are QPSK in the second MCS table, where MCS indices corresponding to the some entries are at equal intervals; or some entries in which modulation schemes are QPSK in the second MCS table, where MCS indices corresponding to the some entries are not at equal intervals; or some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

The at least one entry in which the modulation scheme is 16QAM in the second MCS table in the first MCS table acquired by the acquiring module 71 includes:

all entries in which modulation schemes are 16QAM in the second MCS table, or some entries in which modulation schemes are 16QAM in the second MCS table, where MCS indices corresponding to the some entries are at equal intervals; or some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or some entries in which modulation schemes are 16QAM in the second MCS table, and at least one entry, except an entry with a maximum MCS index and an entry with a minimum MCS index, of all entries in which modulation schemes are 16QAM in the second MCS table.

Further, the first MCS table acquired by the acquiring module 71 further includes: at least one entry in which a modulation scheme is 64QAM in the second MCS table.

Specifically, the at least one entry in which the modulation scheme is 64QAM in the second MCS table in the first MCS table acquired by the acquiring module 71 includes:

all entries in which modulation schemes are 64QAM in the second MCS table; or some entries in which modulation schemes are 64QAM in the second MCS table, and at least one entry, except an entry with a minimum MCS index, of all entries in which modulation schemes are 64QAM in the second MCS table.

Further, the at least one entry in which the modulation scheme is 64QAM in the second MCS table in the first MCS table acquired by the acquiring module 71 includes:

a TBS index in an entry that is corresponding to a minimum MCS index and of all entries in which modulation schemes are higher than 64QAM in the first MCS table acquired by the acquiring module 71 is the same as a TBS index in an entry with a maximum MCS index of all the entries in which the modulation schemes are 64QAM in the second MCS table.

Further, a value range of an MCS index in the first MCS table acquired by the acquiring module 71 is the same as a value range of an MCS index in the second MCS table.

The notification apparatus for an MCS shown in FIG. 7 can perform corresponding steps in the foregoing method embodiments. For details, reference may be made to descriptions of the foregoing method embodiments, and for effects achieved by the apparatus, reference may also be made to the descriptions of the foregoing method embodiments.

Figure 8:
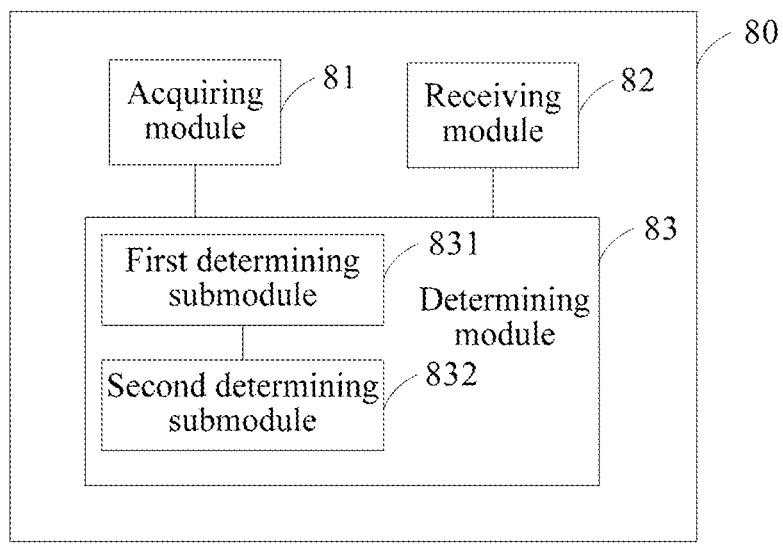
FIG. 8 is a schematic diagram of another notification apparatus for an MCS according to an embodiment of the present invention.

As shown in FIG. 8, an embodiment of the present invention further provides a notification apparatus 80 for an MCS. The apparatus 80 includes:

an acquiring module 81, configured to acquire a first MCS table, where the first MCS table may be predefined in a protocol, and preset by UE according to protocol specifications, or pre-stored by UE, or may be selected by UE from at least two predefined tables according to a downlink channel state, or may be notified by a base station to UE, and specifically, a method for notifying the UE by the base station may be that the base station selects one of at least two predefined tables according to an uplink channel state or a downlink channel state, and notifies the UE of the table; an MCS table is used for describing a mapping relationship between an MCS index and an entry; in this embodiment of the present invention, the mapping relationship in the MCS table is merely an example given for the convenience of understanding the present invention; a representation form of the MCS table in the present invention includes, but is not limited to, the example, that is, the MCS table may have multiple combinations, and the combinations shall fall within the protection scope of the present invention as long as a mapping relationship between an MCS index and an entry can be reflected;

a receiving module 82, configured to receive a first MCS index sent by a base station, where the first MCS index is determined by the base station according to the first MCS table; and a determining module 83, configured to determine a modulation order and a code block size according to the first MCS table and the first MCS index received by the receiving module 82;

where the first MCS table acquired by the acquiring module 81 includes:

entries in which modulation schemes are higher than 64QAM; and at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where modulation schemes in the second MCS table include only QPSK, 16QAM, and 64QAM.

The determining module 83 includes:

a first determining submodule 831, configured to determine a first TBS index and the modulation order according to the first MCS table acquired by the acquiring module 81 and the received first MCS index; and a second determining submodule 832, configured to determine the code block size according to the first TBS index, a first PRB quantity, and a first TBS table, where the first PRB quantity is a PRB quantity allocated by the base station to the UE, or the first PRB quantity is a maximum integer less than or equal to a product of a PRB quantity allocated to the UE and a specific coefficient;

the first TBS table includes at least one PRB quantity corresponding to each TBS index and a transport block size corresponding to each PRB quantity, where the first TBS table is a TBS table corresponding to the first MCS table; and a value range of a TBS index in the first TBS table is 0 to A, where A is a positive integer less than or equal to 26, or a value range of a TBS index in the first TBS table is 0 to B, where B is a positive integer greater than or equal to 26; a transport block size corresponding to a TBS index whose value range is 0 to 26 in the first TBS table is the same as a transport block size corresponding to a TBS index whose value range is 0 to 26 in a second TBS table, a value range of a TBS index in the second TBS table is 0 to 26; and the second TBS table includes at least one PRB quantity corresponding to each TBS index and a transport block size corresponding to each PRB quantity.

The at least one entry in which the modulation scheme is QPSK in the second MCS table in the first MCS table acquired by the acquiring module 81 includes:

some entries in which modulation schemes are QPSK in the second MCS table, where MCS indices corresponding to the some entries are at equal intervals; or some entries in which modulation schemes are QPSK in the second MCS table, where MCS indices corresponding to the some entries are not at equal intervals; or some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

The at least one entry in which the modulation scheme is 16QAM in the second MCS table in the first MCS table acquired by the acquiring module 81 includes:

all entries in which modulation schemes are 16QAM in the second MCS table; or some entries in which modulation schemes are 16QAM in the second MCS table, where MCS indices corresponding to the some entries are at equal intervals; or some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or some entries in which modulation schemes are 16QAM in the second MCS table, and at least one entry, except an entry with a maximum MCS index and an entry with a minimum MCS index, of all entries in which modulation schemes are 16QAM in the second MCS table.

Further, the first MCS table acquired by the acquiring module 81 further includes: at least one entry in which a modulation scheme is 64QAM in the second MCS table.

Specifically, the at least one entry in which the modulation scheme is 64QAM in the second MCS table in the first MCS table acquired by the acquiring module 81 includes:

all entries in which modulation schemes are 64QAM in the second MCS table; or some entries in which modulation schemes are 64QAM in the second MCS table, and at least one entry, except an entry with a minimum MCS index, of all entries in which modulation schemes are 64QAM in the second MCS table.

Further, the at least one entry in which the modulation scheme is 64QAM in the second MCS table in the first MCS table acquired by the acquiring module 81 includes:

a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

Further, a value range of an MCS index in the first MCS table acquired by the acquiring module 81 is the same as a value range of an MCS index in the second MCS table.

The notification apparatus for an MCS shown in FIG. 8 can perform corresponding steps in the foregoing method embodiments. For details, reference may be made to descriptions of the foregoing method embodiments, and for effects achieved by the apparatus, reference may also be made to the descriptions of the foregoing method embodiments.

Figure 9:
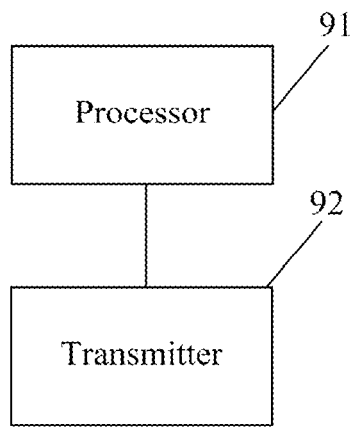
FIG. 9 is a schematic diagram of another notification apparatus for a CQI according to an embodiment of the present invention.

As shown in FIG. 9, an embodiment of the present invention further provides a notification apparatus 90 for a channel quality indicator CQI, including a processor 91 and a transmitter 92, where the processor 91 is configured to acquire a first CQI table; and configured to learn a first CQI index according to the first CQI table, and the transmitter 92 is configured to send the first CQI index learned by the processor 91 to a base station, so that the base station determines a first modulation and coding scheme MCS index according to the first CQI index;

where the first CQI table acquired by the processor 91 includes:

entries in which modulation schemes are higher than 64 quadrature amplitude modulation QAM; and at least one entry in which a modulation scheme is quadrature phase shift keying QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where modulation schemes in entries in the second CQI table include only QPSK, 16QAM, and 64QAM.

The at least one entry in which the modulation scheme is QPSK in the second CQI table in the first CQI table acquired by the processor 91 includes:
  some entries in which modulation schemes are QPSK in the second CQI table, where CQI indices corresponding to the some entries are at equal intervals; or
  some entries in which modulation schemes are QPSK in the second CQI table, where CQI indices corresponding to the some entries are not at equal intervals; or
  some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or
  some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

The at least one entry in which the modulation scheme is 16QAM in the second CQI table in the first CQI table acquired by the processor 91 includes:
  all entries in which modulation schemes are 16QAM in the second CQI table; or
  at least one entry, except an entry corresponding to a minimum CQI index, of all entries in which modulation schemes are 16QAM in the second CQI table.

The first CQI table acquired by the processor 91 further includes:
  at least one entry in which a modulation scheme is 64QAM in the second CQI table.

The at least one entry in which the modulation scheme is 64QAM in the first CQI table acquired by the processor 91 includes:
  all entries in which modulation schemes are 64QAM in the second CQI table; or
  some entries in which modulation schemes are 64QAM in the second CQI table, and at least one entry, except an entry corresponding to a maximum CQI index, of all entries in which modulation schemes are 64QAM in the second CQI table.

Further, a spectrum efficiency in an entry that is corresponding to a minimum CQI index and of the entries in which the modulation schemes are higher than 64QAM in the first CQI table acquired by the processor 91 is equal to a spectrum efficiency in an entry that is corresponding to a maximum CQI index and of all entries in which modulation schemes are 64QAM in the second CQI table.

Spectrum efficiencies in X entries that are corresponding to maximum CQI indices and of the entries in which the modulation schemes are higher than 64QAM in the first CQI table acquired by the processor 91 are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

The entries in which the modulation schemes are higher than 64QAM in the first CQI table acquired by the processor 91 include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

The first CQI table acquired by the processor 91 includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

The constant is less than or equal to a first threshold.

An absolute value of a difference between spectrum efficiencies in any two adjacent entries of X entries that are corresponding to maximum CQI indices and of the entries in which the modulation schemes are higher than 64QAM in the first CQI table acquired by the processor 91 is less than or equal to a first threshold; or the entries in which the modulation schemes are higher than 64QAM in the first CQI table acquired by the processor 91 include: at least two entries in which modulation schemes are 256QAM, where an absolute value of a difference between spectrum efficiencies in any two adjacent entries of the at least two entries in which the modulation schemes are 256QAM is less than or equal to a first threshold; or the first CQI table acquired by the processor 91 includes: at least two entries in which the modulation schemes are higher than 64QAM, where an absolute value of a difference between spectrum efficiencies in any two adjacent entries of the at least two entries in which the modulation schemes are higher than 64QAM is less than or equal to a first threshold.

X=3.

The first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

A value range of a CQI index in the first CQI table acquired by the processor 91 is the same as a value range of a CQI index in the second CQI table.

Figure 10:
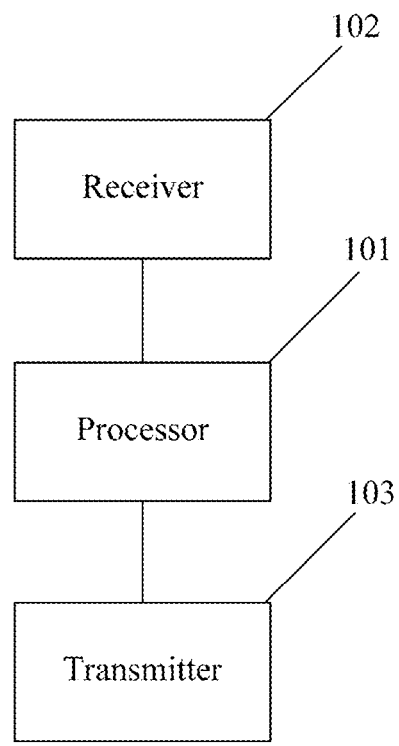
FIG. 10 is a schematic diagram of another notification apparatus for an MCS according to an embodiment of the present invention.

As shown in FIG. 10, an embodiment of the present invention further provides a notification apparatus 10 for a modulation and coding scheme MCS, including:

a processor 101, configured to acquire a first CQI table and a first MCS table;

a receiver 102, configured to receive a first channel quality indicator CQI index sent by terminal UE, where the first CQI index is determined by the UE according to the first CQI table, where the processor 101 is configured to determine a first MCS index according to the first CQI table acquired by the processor 101, the first MCS table acquired by the processor 101, and the first CQI index received by the receiver, and a transmitter 103, configured to send the first MCS index determined by the processor 101 to the UE;

where the first CQI table acquired by the processor 101 includes:

entries in which modulation schemes are higher than 64QAM; and at least one entry in which a modulation scheme is QPSK in a second CQI table, where the at least one entry in which the modulation scheme is QPSK includes a combination except a first combination of combinations formed by the at least one entry in which the modulation scheme is QPSK in the second CQI table, and the first combination is N entries with consecutive maximum CQI indices corresponding to QPSK in the second CQI table, where N is equal to 3 or N is a positive integer less than 4 or N is a positive integer; and/or at least one entry in which a modulation scheme is 16QAM in the second CQI table, where modulation schemes in the second CQI table include only QPSK, 16QAM, and 64QAM.

The first MCS table acquired by the processor 101 includes:

entries in which modulation schemes are higher than 64QAM; and at least one entry in which a modulation scheme is QPSK in a second MCS table, where the at least one entry in which the modulation scheme is QPSK includes a combination except a second combination of combinations formed by the at least one entry in which the modulation scheme is QPSK in the second MCS table, and the second combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where modulation schemes in the second MCS table include only QPSK, 16QAM, and 64QAM.

The processor 101 is specifically configured to:

determine a first TBS index and the first MCS index according to an acquired first PRB quantity, the first CQI table acquired by the processor 101, the first MCS table acquired by the processor 101, and the received first CQI index, where:

the first PRB quantity is a PRB quantity allocated by a base station to the UE, or the first PRB quantity is a maximum integer less than or equal to a product of a PRB quantity allocated to the UE and a specific coefficient;

a first TBS table includes at least one PRB quantity corresponding to each TBS index and a transport block size corresponding to each PRB quantity, where the first TBS table is a TBS table corresponding to the first MCS table; and a value range of a TBS index in the first TBS table is 0 to A, where A is a positive integer less than or equal to 26, or a value range of a TBS index in the first TBS table is 0 to B, where B is a positive integer greater than or equal to 26; a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

The processor 101 is specifically configured to:

determine, according to the first CQI table acquired by the processor 101 and the first CQI index received by the receiver 102, a first modulation scheme and a first spectrum efficiency that correspond to the received first CQI index;

learn, according to the first PRB quantity and the determined first spectrum efficiency, a first transport block size transmitted to the UE; and obtain, according to the first TBS table, the first TBS index that corresponds to the determined first transport block size and the first PRB quantity in the first TBS table.

The at least one entry in which the modulation scheme is QPSK in the second CQI table in the first CQI table acquired by the processor 101 includes:
  some entries in which modulation schemes are QPSK in the second CQI table, where CQI indices corresponding to the some entries are at equal intervals; or
  some entries in which modulation schemes are QPSK in the second CQI table, where CQI indices corresponding to the some entries are not at equal intervals; or
  some entries in which modulation schemes are QPSK in the second CQI table, and at least one entry, except an entry corresponding to a maximum CQI index, of all entries in which modulation schemes are QPSK in the second CQI table, where CQI indices corresponding to the some entries are inconsecutive; or
  some entries in which modulation schemes are QPSK in the second CQI table, and at least one entry, except an entry corresponding to a maximum CQI index, of all entries in which modulation schemes are QPSK in the CQI table, where CQI indices corresponding to the some entries are consecutive.

The at least one entry in which the modulation scheme is 16QAM in the second CQI table in the first CQI table acquired by the processor 101 includes:
  all entries in which modulation schemes are 16QAM in the second CQI table; or
  at least one entry, except an entry corresponding to a minimum CQI index, of all entries in which modulation schemes are 16QAM in the second CQI table.

The first CQI table acquired by the processor 101 further includes:
  at least one entry in which a modulation scheme is 64QAM in the second CQI table.

The at least one entry in which the modulation scheme is 64QAM in the second CQI table in the first CQI table acquired by the processor 101 includes.
  all entries in which modulation schemes are 64QAM in the second CQI table; or
  some entries in which modulation schemes are 64QAM in the second CQI table, and at least one entry, except an entry corresponding to a maximum CQI index, of all entries in which modulation schemes are 64QAM in the second CQI table.

A spectrum efficiency in an entry that is corresponding to a minimum CQI index and of the entries in which the modulation schemes are higher than 64QAM in the first CQI table acquired by the processor 101 is equal to a spectrum efficiency in an entry that is corresponding to a maximum CQI index and of all entries in which modulation schemes are 64QAM in the second CQI table.

Spectrum efficiencies in X entries that are corresponding to maximum CQI indices and of the entries in which the modulation schemes are higher than 64QAM in the first CQI table acquired by the processor 101 are arranged in an arithmetic progression or approximately in an arithmetic progression in ascending order of spectrum efficiency, where: that spectrum efficiencies in X entries that are corresponding to maximum CQI indices and of the entries in which the modulation schemes are higher than 64QAM are arranged in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is equal to a same constant; and that spectrum efficiencies in X entries that are corresponding to maximum CQI indices and of the entries in which the modulation schemes are higher than 64QAM are arranged approximately in an arithmetic progression in ascending order of spectrum efficiency indicates that, in ascending order of spectrum efficiency and starting from a second entry of the X entries, a difference between a spectrum efficiency in each entry and a spectrum efficiency in a previous entry of the entry is within a range from a constant minus a preset value to the constant plus the preset value, where X is an integer greater than 2.

The entries in which the modulation schemes are higher than 64QAM in the first CQI table acquired by the processor 101 include: at least three entries in which modulation schemes are 256QAM, where spectrum efficiencies in the at least three entries in which the modulation schemes are 256QAM are arranged in an arithmetic progression or approximately in an arithmetic progression in ascending order of spectrum efficiency, where: that spectrum efficiencies in the at least three entries in which the modulation schemes are 256QAM are arranged in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is equal to a same constant; and that spectrum efficiencies in the at least three entries in which the modulation schemes are 256QAM are arranged approximately in an arithmetic progression in ascending order of spectrum efficiency indicates that, in ascending order of spectrum efficiency and starting from a second entry of the at least three entries in which the modulation schemes are 256QAM, a difference between a spectrum efficiency in each entry and a spectrum efficiency in a previous entry of the entry is within a range from a constant minus a preset value to the constant plus the preset value.

The first CQI table acquired by the processor 101 includes: at least three entries in which modulation schemes are higher than 64QAM, where spectrum efficiencies in the at least three entries in which the modulation schemes are higher than 64QAM are arranged in an arithmetic progression or approximately in an arithmetic progression in ascending order of spectrum efficiency, where: that spectrum efficiencies in the at least three entries in which the modulation schemes are higher than 64QAM are arranged in an arithmetic progression or approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is equal to a same constant; and that spectrum efficiencies in the at least three entries in which the modulation schemes are higher than 64QAM are arranged approximately in an arithmetic progression in ascending order of spectrum efficiency indicates that, in ascending order of spectrum efficiency and starting from a second entry of the at least three entries in which the modulation schemes are higher than 64QAM, a difference between a spectrum efficiency in each entry and a spectrum efficiency in a previous entry of the entry is within a range from a constant minus a preset value to the constant plus the preset value.

The constant is less than or equal to a first threshold.

An absolute value of a difference between spectrum efficiencies in any two adjacent entries of X entries that are corresponding to maximum CQI indices and of the entries in which the modulation schemes are higher than 64QAM in the first CQI table acquired by the processor 101 is less than or equal to a first threshold; or the entries in which the modulation schemes are higher than 64QAM in the first CQI table acquired by the processor 101 include: at least two entries in which modulation schemes are 256QAM, where an absolute value of a difference between spectrum efficiencies in any two adjacent entries of the at least two entries in which the modulation schemes are 256QAM is less than or equal to a first threshold; or the first CQI table acquired by the processor 101 includes: at least two entries in which modulation schemes are higher than 64QAM, where an absolute value of a difference between spectrum efficiencies in any two adjacent entries of the at least two entries in which the modulation schemes are higher than 64QAM is less than or equal to a first threshold.

X=3.

The first threshold is a minimum value of an absolute value of a difference between spectrum efficiencies in any two adjacent entries in which modulation schemes are lower than or equal to 64QAM in the first CQI table, or is a minimum value of an absolute value of a difference between spectrum efficiencies in any two adjacent entries in which modulation schemes are the same and the modulation schemes are lower than or equal to 64QAM in the first CQI table, or is a minimum value of an absolute value of a difference between spectrum efficiencies in any two adjacent entries in which modulation schemes are equal to 64QAM in the first CQI table, or is a minimum value of an absolute value of a difference between spectrum efficiencies in any two adjacent entries in which modulation schemes are equal to 16QAM in the first CQI table, or is a minimum value of an absolute value of a difference between spectrum efficiencies in any two adjacent entries in which modulation schemes are equal to QPSK in the first CQI table.

A value range of a CQI index in the first CQI table acquired by the processor 101 is the same as a value range of a CQI index in the second CQI table.

The at least one entry in which the modulation scheme is QPSK in the second MCS table in the first CQI table acquired by the processor 101 includes:

some entries in which modulation schemes are QPSK in the second MCS table, where MCS indices corresponding to the some entries are at equal intervals; or some entries in which modulation schemes are QPSK in the second MCS table, where MCS indices corresponding to the some entries are not at equal intervals; or some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

The at least one entry in which the modulation scheme is 16QAM in the second MCS table in the first CQI table acquired by the processor 101 includes:

all entries in which modulation schemes are 16QAM in the second MCS table; or some entries in which modulation schemes are 16QAM in the second MCS table, where MCS indices corresponding to the some entries are at equal intervals, or some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or some entries in which modulation schemes are 16QAM in the second MCS table, and at least one entry, except an entry with a maximum MCS index and an entry with a minimum MCS index, of all entries in which modulation schemes are 16QAM in the second MCS table.

The first MCS table acquired by the processor 101 further includes:

at least one entry in which a modulation scheme is 64QAM in the second MCS table.

The at least one entry in which the modulation scheme is 64QAM in the second MCS table in the first CQI table acquired by the processor 101 includes:

all entries in which modulation schemes are 64QAM in the second MCS table; or some entries in which modulation schemes are 64QAM in the second MCS table, and at least one entry, except an entry with a minimum MCS index, of all entries in which modulation schemes are 64QAM in the second MCS table.

The at least one entry in which the modulation scheme is 64QAM in the second MCS table in the first CQI table acquired by the processor 101 includes:

a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

A value range of an MCS index in the first MCS table acquired by the processor 101 is the same as a value range of an MCS index in the second MCS table.

Figure 11:
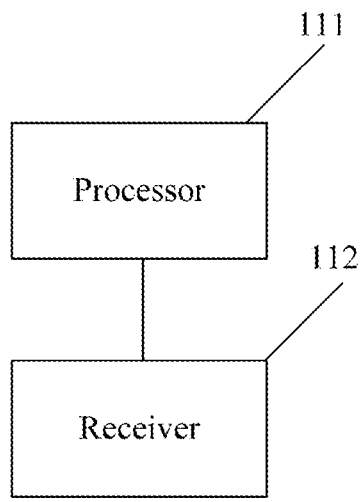
FIG. 11 is a schematic diagram of another notification apparatus for an MCS according to an embodiment of the present invention.

As shown in FIG. 11, an embodiment of the present invention further provides a notification apparatus 11 for a modulation and coding scheme MCS, including:

a processor 111, configured to acquire a first MCS table; and a receiver 112, configured to receive a first MCS index sent by a base station, where the first MCS index is determined by the base station according to the first MCS table acquired by the processor 111, where the processor 111 is configured to determine a modulation order and a code block size according to the first MCS table acquired by the processor and the first MCS index received by the receiver;

where the first MCS table acquired by the processor 111 includes:

entries in which modulation schemes are higher than 64QAM; and at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where modulation schemes in the second MCS table include only QPSK, 16QAM, and 64QAM.

The processor 111 is specifically configured to:

determine a first TBS index and the modulation order according to the first MCS table acquired by the processor 111 and the received first MCS index; and determine the code block size according to the first TBS index, a first PRB quantity, and a first TBS table, where.

the first PRB quantity is a PRB quantity allocated by the base station to UE, or the first PRB quantity is a maximum integer less than or equal to a product of a PRB quantity allocated to UE and a specific coefficient;

the first TBS table includes at least one PRB quantity corresponding to each TBS index and a transport block size corresponding to each PRB quantity, where the first TBS table is a TBS table corresponding to the first MCS table; and a value range of a TBS index in the first TBS table is 0 to A, where A is a positive integer less than or equal to 26, or a value range of a TBS index in the first TBS table is 0 to B, where B is a positive integer greater than or equal to 26, a transport block size corresponding to a TBS index whose value range is 0 to 26 in the first TBS table is the same as a transport block size corresponding to a TBS index whose value range is 0 to 26 in a second TBS table; a value range of a TBS index in the second TBS table is 0 to 26; and the second TBS table includes at least one PRB quantity corresponding to each TBS index and a transport block size corresponding to each PRB quantity.

The at least one entry in which the modulation scheme is QPSK in the second MCS table in the first MCS table acquired by the processor 111 includes:

some entries in which modulation schemes are QPSK in the second MCS table, where MCS indices corresponding to the some entries are at equal intervals; or some entries in which modulation schemes are QPSK in the second MCS table, where MCS indices corresponding to the some entries are not at equal intervals; or some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

The at least one entry in which the modulation scheme is 16QAM in the second MCS table in the first MCS table acquired by the processor 111 includes:

all entries in which modulation schemes are 16QAM in the second MCS table; or some entries in which modulation schemes are 16QAM in the second MCS table, where MCS indices corresponding to the some entries are at equal intervals; or some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive, or some entries in which modulation schemes are 16QAM in the second MCS table, and at least one entry, except an entry with a maximum MCS index and an entry with a minimum MCS index, of all entries in which modulation schemes are 16QAM in the second MCS table.

The first MCS table acquired by the processor 111 further includes:

at least one entry in which a modulation scheme is 64QAM in the second MCS table.

The at least one entry in which the modulation scheme is 64QAM in the second MCS table in the first MCS table acquired by the processor 111 includes.

all entries in which modulation schemes are 64QAM in the second MCS table; or some entries in which modulation schemes are 64QAM in the second MCS table, and at least one entry, except an entry with a minimum MCS index, of all entries in which modulation schemes are 64QAM in the second MCS table.

The at least one entry in which the modulation scheme is 64QAM in the second MCS table in the first MCS table acquired by the processor 111 includes:

a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

A value range of an MCS index in the first MCS table acquired by the processor 111 is the same as a value range of an MCS index in the second MCS table.

Figure 12:
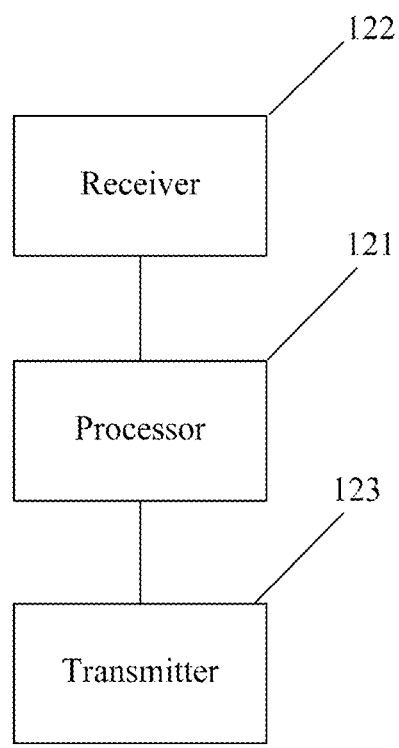
FIG. 12 is a schematic diagram of another notification apparatus for an MCS according to an embodiment of the present invention.

As shown in FIG. 12, the present invention provides a notification apparatus for a modulation and coding scheme MCS, including:

a processor 121, configured to acquire a first CQI table and a first MCS table;

a receiver 122, configured to receive a first CQI index, where the first CQI index is determined by UE according to the first CQI table, where the processor 121 is configured to determine a first MCS index according to the acquired first CQI table, the acquired first MCS table, and the first CQI index received by the receiver; and a transmitter 123, configured to send the first MCS index determined by the processor 121 to the UE;

where the first CQI table acquired by the processor 121 includes: entries in which modulation schemes are higher than 64QAM, where an entry in the first CQI table acquired by the processor 121 refers to one modulation scheme, one code rate, and one spectrum efficiency that correspond to each CQI index in the first CQI table acquired by the processor 121; and the first MCS table acquired by the processor 121 includes:

entries in which modulation schemes are higher than 64QAM; and at least one entry in which a modulation scheme is QPSK in a second MCS table, where the at least one entry in which the modulation scheme is QPSK includes a combination except a first combination of combinations formed by the at least one entry in which the modulation scheme is QPSK in the second MCS table, and the first combination is K entries with consecutive maximum MCS indices corresponding to QPSK in the second MCS table, where K is equal to 4 or K is a positive integer less than 5 or K is a positive integer; and/or at least one entry in which a modulation scheme is 16QAM in the second MCS table, where modulation schemes in the second MCS table include only QPSK, 16QAM, and 64QAM.

The at least one entry in which the modulation scheme is QPSK in the second MCS table in the first MCS table acquired by the processor 121 includes:

some entries in which modulation schemes are QPSK in the second MCS table, where MCS indices corresponding to the some entries are at equal intervals; or some entries in which modulation schemes are QPSK in the second MCS table, where MCS indices corresponding to the some entries are not at equal intervals; or some entries in which modulation schemes are QPSK in the second MCS table, and at least one entry, except an entry with a maximum MCS index, of all entries in which modulation schemes are QPSK in the second MCS table, where MCS indices corresponding to the some entries are inconsecutive; or some entries in which modulation schemes are QPSK in the second MCS table, and at least one entry, except an entry with a maximum MCS index, of all entries in which modulation schemes are QPSK in the second MCS table, where MCS indices corresponding to the some entries are consecutive.

The at least one entry in which the modulation scheme is 16QAM in the second MCS table in the first MCS table acquired by the processor 121 includes:

all entries in which modulation schemes are 16QAM in the second MCS table; or some entries in which modulation schemes are 16QAM in the second MCS table, where MCS indices corresponding to the some entries are at equal intervals; or some entries in which modulation schemes are 16QAM in the second MCS table, where MCS indices corresponding to the some entries are not at equal intervals; or some entries in which modulation schemes are 16QAM in the second MCS table, and at least one entry, except an entry with a maximum second MCS index, of all entries in which modulation schemes are 16QAM in the second MCS table, where MCS indices corresponding to the some entries are inconsecutive; or some entries in which modulation schemes are 16QAM in the second MCS table, and at least one entry, except an entry with a maximum MCS index, of all entries in which modulation schemes are 16QAM in the second MCS table, where MCS indices corresponding to the some entries are consecutive; or some entries in which modulation schemes are 16QAM in the second MCS table, and at least one entry, except an entry with a maximum MCS index and an entry with a minimum MCS index, of all entries in which modulation schemes are 16QAM in the second MCS table.

The first MCS table acquired by the processor 121 further includes:

at least one entry in which a modulation scheme is 64QAM in the second MCS table.

The at least one entry in which the modulation scheme is 64QAM in the second MCS table in the first MCS table acquired by the processor 121 includes:

all entries in which modulation schemes are 64QAM in the second MCS table; or some entries in which modulation schemes are 64QAM in the second MCS table, and at least one entry, except an entry with a minimum MCS index, of all entries in which modulation schemes are 64QAM in the second MCS table.

The at least one entry in which the modulation scheme is 64QAM in the second MCS table in the first MCS table acquired by the processor 121 includes:

a TBS index in an entry that is corresponding to a minimum MCS index and of all entries in which modulation schemes are higher than 64QAM in the first MCS table is the same as a TBS index in an entry with a maximum MCS index of all the entries in which the modulation schemes are 64QAM in the second MCS table.

A value range of an MCS index in the first MCS table acquired by the processor 121 is the same as a value range of an MCS index in the second MCS table.

It should be noted that the apparatuses shown in FIG. 9 to FIG. 12 can separately implement the methods provided in the foregoing method embodiments. For details, reference may be made to descriptions of the foregoing embodiments, and for effects achieved by the apparatuses, reference may also be made to the descriptions of the foregoing embodiments.

It may be clearly understood by persons skilled in the art that, for the purpose of convenient and brief description, division of the foregoing functional modules is merely used as an example for description. In actual applications, the foregoing functions can be allocated to different functional modules and implemented according to a requirement, that is, the inner structure of the apparatus is divided into different functional modules to implement all or some of the functions described above. For a detailed working process of the foregoing system, apparatus, and unit, reference may be made to a corresponding process in the foregoing method embodiments, and details are not provided herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A communication method comprising:
receiving a channel quality indicator (CQI) index of a first CQI table; and
determining a first modulation scheme according to the CQI index of the first CQI table,
wherein the first CQI table at least comprises the following mapping relationship among the CQI index, a modulation scheme and a spectrum efficiency:

| CQI index | Modulation scheme | Spectrum efficiency |
| --- | --- | --- |
| 0 | out of range | |
| 1 | QPSK | 0.1523 |
| 2 | QPSK | 0.3770 |
| 3 | QPSK | 0.8770 |
| 4 | 16QAM | 1.4766 |
| 5 | 16QAM | 1.9141 |
| 6 | 16QAM | 2.4063 |
| 7 | 64QAM | 2.7305 |
| 8 | 64QAM | 3.3223 |
| 9 | 64QAM | 3.9023 |
| 10 | 64QAM | 4.5234 |
| 11 | 64QAM | 5.1152 |
| 12 | 256QAM | 5.5547. |

2. The method according to claim 1, wherein the first CQI table further consists of 3 entries corresponding to 3 CQI indices ranging from 13 to 15, and wherein CQI indices 13 to 15 correspond to 3 entries in which the modulation schemes are 256QAM.

3. The method according to claim 1, wherein the first CQI table further comprises a code rate, and the mapping relationship of the first CQI table further comprises:

| CQI index | Modulation scheme | Code rate × 1024 | Spectrum efficiency |
| --- | --- | --- | --- |
| 0 | | Out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547. |

4. The method according to claim 1, wherein,
a value range of a CQI index in the first CQI table is from 0 to 15, and is the same as a value range of a CQI index in a second CQI table;
an entry in the first CQI table at least comprises a CQI index, a modulation scheme and spectrum efficiency; and
an entry in the second table at least comprises a CQI index, a modulation scheme and spectrum efficiency.

5. The method according to claim 4, wherein the spectrum efficiency 5.5547 in an entry that is corresponding to CQI index 12 and 256QAM in the first CQI table is equal to a spectrum efficiency in an entry that is corresponding to CQI index 15 and 64QAM in the second CQI table.

6. The method according to claim 4, wherein the second CQI table at least comprises the following mapping relationship among the CQI index, the modulation scheme and the spectrum efficiency:

| CQI index | Modulation scheme | Spectrum efficiency |
| --- | --- | --- |
| 0 | out of range | |
| 1 | QPSK | 0.1523 |
| 2 | QPSK | 0.2344 |
| 3 | QPSK | 0.3770 |
| 4 | QPSK | 0.6016 |
| 5 | QPSK | 0.8770 |
| 6 | QPSK | 1.1758 |
| 7 | 16QAM | 1.4766 |
| 8 | 16QAM | 1.9141 |
| 9 | 16QAM | 2.4063 |
| 10 | 64QAM | 2.7305 |
| 11 | 64QAM | 3.3223 |
| 12 | 64QAM | 3.9023 |
| 13 | 64QAM | 4.5234 |
| 14 | 64QAM | 5.1152 |
| 15 | 64QAM | 5.5547. |

7. The method according to claim 4, wherein the first CQI table and the second CQI table meet at least one of the following relations:
values of the modulation scheme and the spectrum efficiency in entries corresponding to CQI indices 1, 2 and 3 in the first CQI table are the same with values of the modulation scheme and the spectrum efficiency in entries corresponding to CQI indices 1, 3 and 5 in the second CQI table respectively;

values of the modulation scheme and the spectrum efficiency in entries corresponding to CQI indices 4, 5 and 6 in the first table are the same with values of the modulation scheme and the spectrum efficiency in entries corresponding to CQI indices 7, 8 and 9 in the second CQI table respectively; and values of the modulation scheme and the spectrum efficiency in entries corresponding to CQI indices 7, 8, 9,10 and 11 in the first table are the same with values of the modulation scheme and the spectrum efficiency in entries corresponding to CQI indices 10, 11, 12, 13 and 14 and 64QAM in the second CQI table respectively.

8. The method according to claim 1, wherein the method further comprises:

sending a first modulation and coding scheme (MCS) index of a first MCS table, wherein the first MCS index indicates the first modulation scheme, wherein the first MCS table at least comprises the following mapping relationship between the MCS index and modulation order,

| MCS Index | Modulation Order |
|---|---|
| 0 | 2 |
| 1 | 2 |
| 2 | 2 |
| 3 | 2 |
| 4 | 2 |
| 5 | 4 |
| 6 | 4 |
| 7 | 4 |
| 8 | 4 |
| 9 | 4 |
| 10 | 4 |
| 11 | 6 |
| 12 | 6 |
| 13 | 6 |
| 14 | 6 |
| 15 | 6 |
| 16 | 6 |
| 17 | 6 |
| 18 | 6 |
| 19 | 6 |
| 20 | 8 |
| 21 | 8 |
| 22 | 8 |
| 23 | 8 |
| 24 | 8 |
| 25 | 8 |
| 26 | 8 |
| 27 | 8 |
| 28 | 2 |
| 29 | 4 |
| 30 | 6 |
| 31 | 8 | and wherein the modulation scheme quadrature phase shift keying (QPSK) corresponds to the modulation order 2, the modulation scheme 16 quadrature amplitude modulation (QAM) corresponds to the modulation order 4, the modulation scheme 64 QAM corresponds to the modulation order 6, and the modulation scheme 256QAM corresponds to the modulation order 8.

9. The method according to claim 8, wherein a value range of a MCS index in the first MCS table is from 0 to 31, and is the same as a value range of a MCS index in a second MCS table.

10. The method according to claim 9, wherein the first MCS table and the second MCS table meet at least one of the following relations:

value of the modulation order in an entry corresponding to MCS indices 1 to 5 in the first MCS table are the same with value of the modulation order in an entry corresponding to MCS indices 0, 2, 4, 6 and 8 in the second MCS table respectively;

value of the modulation order in an entry corresponding to MCS indices 5 to 9 in the first MCS table are the same with value of the modulation order in an entry corresponding to MCS indices 10, 12 and 14 to 16 in the second MCS table respectively; and value of the modulation order in an entry corresponding to MCS indices 10 to 20 in the first MCS table are the same with value of the modulation order in an entry corresponding to MCS indices 18 to 28 in the second MCS table respectively.

11. A communication apparatus comprising:

a receiver configured to cooperate with a processor to receive a channel quality indicator (CQI) index of a first CQI table; and the processor configured to determine a first modulation scheme according to the CQI index of the first CQI table, wherein the first CQI table at least comprises the following mapping relationship among the CQI index, a modulation scheme and a spectrum efficiency:

| CQI index | Modulation scheme | Spectrum efficiency |
|---|---|---|
| 0 | out of range | |
| 1 | QPSK | 0.1523 |
| 2 | QPSK | 0.3770 |
| 3 | QPSK | 0.8770 |
| 4 | 16QAM | 1.4766 |
| 5 | 16QAM | 1.9141 |
| 6 | 16QAM | 2.4063 |
| 7 | 64QAM | 2.7305 |
| 8 | 64QAM | 3.3223 |
| 9 | 64QAM | 3.9023 |
| 10 | 64QAM | 4.5234 |
| 11 | 64QAM | 5.1152 |
| 12 | 256QAM | 5.5547. |

12. The apparatus according to claim 11, wherein the first CQI table further consists of 3 entries corresponding to 3 CQI indices ranging from 13 to 15, and wherein CQI indices 13 to 15 correspond to 3 entries in which the modulation schemes are 256QAM.

13. The apparatus according to claim 11, wherein the first CQI table further comprises a code rate, and the mapping relationship of the first CQI table further comprises:

| CQI index | Modulation scheme | Code rate × 1024 | Spectrum efficiency |
|---|---|---|---|
| 0 | Out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547. |

14. The apparatus according to claim 11, wherein, a value range of a CQI index in the first CQI table is from 0 to 15, and is the same as a value range of a CQI index in a second CQI table;

an entry in the first CQI table at least comprises a CQI index, a modulation scheme and spectrum efficiency; and an entry in the second table at least comprises a CQI index, a modulation scheme and spectrum efficiency.

15. The apparatus according to claim 14, wherein the spectrum efficiency 5.5547 in an entry that is corresponding to CQI index 12 and 256QAM in the first CQI table is equal to a spectrum efficiency in an entry that is corresponding to CQI index 15 and 64QAM in the second CQI table.

16. The apparatus according to claim 14, wherein the second CQI table at least comprises the following mapping relationship among the CQI index, the modulation scheme and the spectrum efficiency:

| CQI index | Modulation scheme | Spectrum efficiency |
|---|---|---|
| 0 | out of range | |
| 1 | QPSK | 0.1523 |
| 2 | QPSK | 0.2344 |
| 3 | QPSK | 0.3770 |
| 4 | QPSK | 0.6016 |
| 5 | QPSK | 0.8770 |
| 6 | QPSK | 1.1758 |
| 7 | 16QAM | 1.4766 |
| 8 | 16QAM | 1.9141 |
| 9 | 16QAM | 2.4063 |
| 10 | 64QAM | 2.7305 |
| 11 | 64QAM | 3.3223 |
| 12 | 64QAM | 3.9023 |
| 13 | 64QAM | 4.5234 |
| 14 | 64QAM | 5.1152 |
| 15 | 64QAM | 5.5547. |

17. The apparatus according to claim 14, wherein the first CQI table and the second CQI table meet at least one of the following relations:

values of the modulation scheme and the spectrum efficiency in entries corresponding to CQI indices 1, 2 and 3 in the first CQI table are the same with values of the modulation scheme and the spectrum efficiency in entries corresponding to CQI indices 1, 3 and 5 in the second CQI table respectively;

values of the modulation scheme and the spectrum efficiency in entries corresponding to CQI indices 4, 5 and 6 in the first table are the same with values of the modulation scheme and the spectrum efficiency in entries corresponding to CQI indices 7, 8 and 9 in the second CQI table respectively; and values of the modulation scheme and the spectrum efficiency in entries corresponding to CQI indices 7, 8, 9,10 and 11 in the first table are the same with values of the modulation scheme and the spectrum efficiency in entries corresponding to CQI indices 10, 11, 12, 13 and 14 and 64QAM in the second CQI table respectively.

18. The apparatus according to claim 11, further comprising:

a transmitter configured to cooperate with the processor to send a first modulation and coding scheme (MCS) index of a first MCS table, wherein the first MCS index indicates the first modulation scheme, wherein the first MCS table at least comprises the following mapping relationship between the MCS index and modulation order:

| MCS Index | Modulation Order |
|---|---|
| 0 | 2 |
| 1 | 2 |
| 2 | 2 |
| 3 | 2 |
| 4 | 2 |
| 5 | 4 |
| 6 | 4 |
| 7 | 4 |
| 8 | 4 |
| 9 | 4 |
| 10 | 4 |
| 11 | 6 |
| 12 | 6 |
| 13 | 6 |
| 14 | 6 |
| 15 | 6 |
| 16 | 6 |
| 17 | 6 |
| 18 | 6 |
| 19 | 6 |
| 20 | 8 |
| 21 | 8 |
| 22 | 8 |
| 23 | 8 |
| 24 | 8 |
| 25 | 8 |
| 26 | 8 |
| 27 | 8 |
| 28 | 2 |
| 29 | 4 |
| 30 | 6 |
| 31 | 8 | and wherein the modulation scheme quadrature phase shift keying (QPSK) corresponds to the modulation order 2, the modulation scheme 16 quadrature amplitude modulation (QAM) corresponds to the modulation order 4, the modulation scheme 64 QAM corresponds to the modulation order 6, and the modulation scheme 256QAM corresponds to the modulation order 8.

19. The apparatus according to claim 18, wherein a value range of a MCS index in the first MCS table is from 0 to 31, and is the same as a value range of a MCS index in a second MCS table.

20. The apparatus according to claim 19, wherein the first MCS table and the second MCS table meet at least one of the following relations:

value of the modulation order in an entry corresponding to MCS indices 1 to 5 in the first MCS table are the same with value of the modulation order in an entry corresponding to MCS indices 0, 2, 4, 6 and 8 in the second MCS table respectively;

value of the modulation order in an entry corresponding to MCS indices 5 to 9 in the first MCS table are the same with value of the modulation order in an entry corresponding to MCS indices 10, 12 and 14 to 16 in the second MCS table respectively; and value of the modulation order in an entry corresponding to MCS indices 10 to 20 in the first MCS table are the same with value of the modulation order in an entry corresponding to MCS indices 18 to 28 in the second MCS table respectively.

* * * * *